(12) United States Patent
Hashimoto et al.

(10) Patent No.: US 11,909,106 B2
(45) Date of Patent: Feb. 20, 2024

(54) V2X COMMUNICATION ANTENNA-MOUNTED LEANING VEHICLE

(71) Applicant: YAMAHA HATSUDOKI KABUSHIKI KAISHA, Iwata (JP)

(72) Inventors: Yasushi Hashimoto, Shizuoka (JP); Daisuke Asano, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 515 days.

(21) Appl. No.: 17/179,634

(22) Filed: Feb. 19, 2021

(65) Prior Publication Data
US 2021/0175614 A1 Jun. 10, 2021

Related U.S. Application Data

(63) Continuation-in-part of application No. PCT/JP2019/032930, filed on Aug. 23, 2019.

(30) Foreign Application Priority Data

Aug. 27, 2018 (JP) ................. 2018-158053

(51) Int. Cl.
*H01Q 1/24* (2006.01)
*H01Q 1/32* (2006.01)
(Continued)

(52) U.S. Cl.
CPC ............. *H01Q 1/3233* (2013.01); *H01Q 3/06* (2013.01); *H04W 4/40* (2018.02)

(58) Field of Classification Search
CPC ...... H01Q 1/3233; H01Q 3/06; H01Q 1/3291; H01Q 9/285; H04W 4/40; B62J 50/25; B62J 99/00; B62K 5/08; B62K 5/10
(Continued)

(56) References Cited

U.S. PATENT DOCUMENTS

2002/0003501 A1   1/2002  Kushida et al.
2014/0312587 A1*  10/2014 Lu ........................ B62K 9/00
                                               280/87.03

FOREIGN PATENT DOCUMENTS

CN    101682115 A    3/2010
JP    2005108008 A   4/2005
(Continued)

OTHER PUBLICATIONS

International Search Report of PCT/JP2019/032930.
(Continued)

*Primary Examiner* — Jean B Jeanglaude
(74) *Attorney, Agent, or Firm* — Rabin & Berdo, P.C.

(57) ABSTRACT

A leaning vehicle having a vehicle-to-everything (V2X) communication antenna mounted thereon, a body frame that leans in a vehicle leftward or rightward direction when the leaning vehicle turns left or right, and a V2X communication device configured to perform V2X communication. The V2X communication antenna has such a radiation pattern that a 3 dB beam width thereof in a horizontal mounting plane is larger than the 3 dB beam width thereof in a vertical mounting plane, the 3 dB beam width in the vertical mounting plane existing both in a vehicle upper region and in a vehicle lower region, and the 3 dB beam width in the horizontal mounting plane existing both in a vehicle left region and in a vehicle right region. The V2X communication device performs the V2X communication with another V2X communication device, at least when the leaning vehicle turns left or right and the body frame leans accordingly.

16 Claims, 20 Drawing Sheets

(51) Int. Cl.
*H04W 4/40* (2018.01)
*H01Q 3/06* (2006.01)

(58) Field of Classification Search
USPC .......................................................... 343/702
See application file for complete search history.

(56) References Cited

FOREIGN PATENT DOCUMENTS

| | | | |
|---|---|---|---|
| JP | 2006232181 A | 9/2006 |
| JP | 2012232657 A | 11/2012 |
| JP | 2016509444 A | 3/2016 |
| KR | 101477985 B1 | 1/2015 |
| WO | 2014136658 A1 | 9/2014 |
| WO | 2014157011 A1 | 10/2014 |
| WO | 2016035797 A1 | 3/2016 |
| WO | 2017213243 A1 | 12/2017 |

OTHER PUBLICATIONS

Lachlan B. Michael and Masao Nakagawa, "Interference Characteristics in Inter-Vehicle Communication from Oncoming Vehicles," Proceedings of IEICE, vol. J82-B, No. 11, pp. 2034-2042, in particular p. 2036, Nov. 25, 1999.

Taiwan Patent Office, 1st Office Action, Patent Application No. TW 108130672, dated Jun. 15, 2020.

Taiwan Patent Office, 2nd Office Action, Patent Application No. TW 108130672, dated Oct. 7, 2020.

Edited by the Institute of Electronics, Information, Communication Engineers, "Antenna Engineering Handbook (second edition)" (published on Jul. 25, 2008), p. 35 (documents showing well-known arts).

"Channel Models for eV2X Evaluation Methodology", Intel Corporation, 3GPP TSG RAN WGI Meeting #93, Busan, Korea, May 21-25, 2018, Discussion and Decision, R1-1806539.

\* cited by examiner

V2X COMMUNICATION ANTENNA-MOUNTED LEANING VEHICLE

CROSS-REFERENCE TO RELATED APPLICATIONS

This is a continuation-in-part application of International Application PCT/JP2019/032930 filed on Aug. 23, 2019, which claims priority from a Japanese Patent Application No. 2018-158053, filed on Aug. 27, 2018. The contents of the applications are incorporated herein by reference.

TECHNICAL FIELD

The present teaching relates to a Vehicle-to-everything (V2X) communication antenna-mounted leaning vehicle on which an antenna for V2X communication is mounted.

BACKGROUND ART

A leaning vehicle including a V2X communication device communicating with another nearby V2X communication device has been proposed. Such a leaning vehicle includes a V2X communication antenna which is electrically connected to the V2X communication device. For example, Patent Literature 1 proposes a leaning vehicle in which a nondirectional V2X communication antenna is mounted on a front portion of the vehicle whereas a directional V2X communication antenna is mounted on a rear portion of the vehicle. Meanwhile, Patent Literature 2 proposes a leaning vehicle in which a nondirectional V2X communication antenna is mounted on a rear portion of the vehicle.

CITATION LIST

Patent Citation

[Patent Literature 1] International Publication No. 2014/136658
[Patent Literature 2] International Publication No. 2016/035797

SUMMARY

Technical Problem

A leaning vehicle body frame of a leaning vehicle leans in a vehicle leftward direction when turning left and leans in a vehicle rightward direction when turning right. To put it differently, the leaning vehicle body frame leans when the leaning vehicle turns. A V2X communication antenna mounted on the leaning vehicle leans together with the leaning vehicle body frame when the leaning vehicle turns.

The inventors of the subject application reviewed transmission and reception characteristics of V2X communication when a nondirectional V2X communication antenna was mounted on a front portion of a vehicle. It was found that, when the nondirectional V2X communication antenna was mounted on the front portion of the vehicle, transmission and reception performances of the V2X communication varied depending on the mounting location of the nondirectional V2X communication antenna. The inventors of the subject application then reviewed transmission and reception characteristics of V2X communication when a directional V2X communication antenna was mounted on a front portion of a vehicle. It was found that, when the directional V2X communication antenna was mounted on the front portion of the vehicle, transmission and reception performances of the V2X communication were not so varied even if the mounting location of the nondirectional V2X communication antenna was changed. However, when the directional V2X communication antenna was mounted on the front portion of the vehicle, the transmission and reception performances of the V2X communication were different between a straight-traveling state and a turning state.

An object of the present teaching is to provide a leaning vehicle on which a V2X communication antenna is mounted to be able to suppress a difference in transmission and reception performances of V2X communication between a straight-traveling state and a turning state of the leaning vehicle, while suppressing a difference in transmission and reception performances of V2X communication due to different mounting locations of the V2X communication antenna.

Solution to Problem

The inventors of the subject application reviewed transmission and reception characteristics of V2X communication when a nondirectional V2X communication antenna was mounted on a front portion of a vehicle. It was found that, when the nondirectional V2X communication antenna was mounted on the front portion of the vehicle, transmission and reception performances of the V2X communication varied depending on the mounting location of the nondirectional V2X communication antenna. When a metal object is provided behind the nondirectional V2X communication antenna in the vehicle front-rear direction, an electromagnetic wave may be reflected on the metal object. For this reason, the transmission and reception performances of the V2X communication may be deteriorated in a region in front of the V2X communication antenna in the vehicle front-rear direction, as compared to a case where the V2X communication antenna is independently provided. In order to suppress the effect of the metal object provided behind the V2X communication antenna in the vehicle front-rear direction, a directional V2X communication antenna having directivity was tentatively mounted on a leaning vehicle. When the directional V2X communication antenna was mounted on the leaning vehicle, the effect of the metal object provided rearward of the V2X communication antenna in the vehicle front-rear direction was suppressed. In this way, when the directional V2X communication antenna was mounted on the leaning vehicle, the transmission and reception performances of the V2X communication antenna were not so different between different mounting locations of the directional V2X communication antenna.

Under this circumstance, a leaning vehicle on which a directional V2X communication antenna was mounted was tested in various running states. As a result of this, it was found that, when the directional V2X communication antenna was mounted on the front portion of the leaning vehicle, the transmission and reception performances of the V2X communication were different between a straight-traveling state and a turning state of the leaning vehicle. In particular, in the leaning vehicle in which the directional V2X communication antenna was mounted on the front portion, the transmission and reception performances of the V2X communication in the turning state may be worse than the performances in the straight-traveling state. Therefore, the transmission and reception performances of the V2X communication when the leaning vehicle in which the directional V2X communication antenna was mounted on the front portion was in the turning state were examined in a detailed manner.

The leaning vehicle body frame of the leaning vehicle leans in the vehicle leftward direction when turning left and leans in the vehicle rightward direction when turning right. To put it differently, the leaning vehicle body frame leans when the leaning vehicle turns. The directional V2X communication antenna mounted on the leaning vehicle leans together with the leaning vehicle body frame when the leaning vehicle turns. The V2X communication device performs the V2X communication at least while the leaning vehicle is turning left and leans leftward and while the leaning vehicle is turning right and leans rightward. In other words, the directional V2X communication antenna transmits and receives an electromagnetic wave at least while the antenna leans because the leaning vehicle leans in the vehicle left-right direction.

The vehicle turns left on a road which is curved left. The leaning vehicle which turns left moves in the vehicle forward direction and in the vehicle leftward direction. The smaller the turning radius of the road curved left is, the more the leaning vehicle moves in the vehicle leftward direction when turning left. It was found that, when the directional V2X communication antenna was mounted on the front portion of the leaning vehicle which turned left, the transmission and reception performances between the directional V2X communication antenna mounted on the front portion of the leaning vehicle and another V2X communication device in a vehicle forward leftward region which was forward of and leftward of the leaning vehicle in the vehicle front-rear direction and in the vehicle left-right direction were low as compared to a case where the leaning vehicle was in the straight-traveling state. It was also found that the larger the inclination angle of the leaning vehicle body frame of the leaning vehicle on which the directional V2X communication antenna was mounted at the front portion was in the vehicle leftward direction, the more the transmission and reception performances tended to deteriorate. It was also found that, in regard to the leaning vehicle which was turning left and another V2X communication device which was in the vehicle forward leftward region forward of and leftward of the leaning vehicle in the vehicle front-rear direction and in the vehicle left-right direction, the farther the another V2X communication device was from a vehicle vertical plane in the vehicle leftward direction, the more the transmission and reception performances tended to deteriorate. The vehicle vertical plane passed through the V2X communication antenna mounted on the leaning vehicle in which the leaning vehicle body frame was in the upright state, and was vertical to the vehicle left-right direction. To be more specific, when the leaning vehicle is in a left turning state, a vehicle on which another V2X communication device is mounted and is forward of the leaning vehicle when the leaning vehicle is in the straight-traveling state moves in the vehicle leftward direction as compared to the leaning vehicle. The smaller the turning radius of the road curved left is, the more the vehicle on which another V2X communication device is mounted and is forward of the leaning vehicle when the leaning vehicle is in the straight-traveling state moves in the vehicle leftward direction as compared to the leaning vehicle, when the leaning vehicle is in the left turning state. It was found that, when the directional V2X communication antenna was mounted on the front portion of the vehicle, the transmission and reception performances of the V2V communication between the directional V2X communication antenna mounted on the front portion of the leaning vehicle and a vehicle on which another V2X communication device was mounted and which was in a vehicle forward leftward region of the leaning vehicle when the leaning vehicle was in the left turning state were deteriorated as compared to a case where the leaning vehicle was in the straight-traveling state. It was also found that the larger the inclination angle of the leaning vehicle body frame of the leaning vehicle on which the directional V2X communication antenna was mounted on the front portion was in the vehicle leftward direction, the more the transmission and reception performances tended to deteriorate. It was also found that, in regard to the leaning vehicle which was in the left turning state and a vehicle having another V2X communication device which was in the vehicle forward leftward region forward of and leftward of the leaning vehicle in the vehicle front-rear direction and in the vehicle left-right direction, the farther the vehicle with the another V2X communication device was from a vehicle vertical plane in the vehicle leftward direction, the more the transmission and reception performances tended to deteriorate. The vehicle vertical plane passed through the V2X communication antenna mounted on the leaning vehicle in which the leaning vehicle body frame was in the upright state, and was vertical to the vehicle left-right direction.

A vehicle turns right on a road which is curved right. The leaning vehicle which turns right moves in the vehicle forward direction and in the vehicle rightward direction. The smaller the turning radius of the road curved right is, the more the leaning vehicle moves in the vehicle rightward direction when turning right. It was found that, when the directional V2X communication antenna was mounted on the front portion of the leaning vehicle which turned right, the transmission and reception performances between the directional V2X communication antenna mounted on the front portion of the leaning vehicle and another V2X communication device in a vehicle forward rightward region which was forward of and rightward of the leaning vehicle turning right in the vehicle front-rear direction and in the vehicle left-right direction were low as compared to a case where the leaning vehicle was in the straight-traveling state. It was also found that the larger the inclination angle of the leaning vehicle body frame of the leaning vehicle on which the directional V2X communication antenna was mounted on the front portion was in the vehicle rightward direction, the more the transmission and reception performances tended to decrease. It was also found that, in regard to the leaning vehicle which was turning right and another V2X communication device which was in the vehicle forward rightward region forward of and rightward of the leaning vehicle in the vehicle front-rear direction and in the vehicle left-right direction, the farther the another V2X communication device was from a vehicle vertical plane in the vehicle rightward direction, the more the transmission and reception performances tended to deteriorate. The vehicle vertical plane passed through the V2X communication antenna mounted on the leaning vehicle in which the leaning vehicle body frame was in the upright state, and was vertical to the vehicle left-right direction. To be more specific, in a right turning state, a vehicle on which another V2X communication device is mounted and is forward of the leaning vehicle when the leaning vehicle is in the straight-traveling state moves in the vehicle rightward direction as compared to the leaning vehicle. The smaller the turning radius of the road curved right is, the more the vehicle on which another V2X communication device is mounted and is forward of the leaning vehicle when the leaning vehicle is in the straight-traveling state moves in the vehicle rightward direction as compared to the leaning vehicle, when the leaning vehicle is in the right turning state. It was found that, when the directional V2X communication antenna was mounted on the front portion of the vehicle, the transmission and reception performances of the V2V communication between the directional V2X communication antenna mounted on the front portion of the leaning vehicle and the vehicle on which another V2X communication device was mounted and which was in a vehicle forward rightward region of the leaning vehicle when the leaning vehicle was in the right turning state were deteriorated as compared to a case where the leaning vehicle was in the straight-traveling state. It was also found that the larger the inclination angle of the leaning vehicle body frame of the leaning vehicle on which the directional V2X communication antenna was mounted at the front portion was in the vehicle rightward direction, the more the transmission and reception performances tended to deteriorate. It was also found that, in regard to the leaning vehicle which was in the right turning state and a vehicle having another V2X communication device which was in the vehicle forward leftward region forward of and rightward of the leaning vehicle in the vehicle front-rear direction and in the vehicle left-right direction, the farther the vehicle with the another V2X communication device was from a vehicle vertical plane in the vehicle rightward direction, the more the transmission and reception performances tended to deteriorate. The vehicle vertical plane passed through the V2X communication antenna mounted on the leaning vehicle in which the leaning vehicle body frame was in the upright state, and was vertical to the vehicle left-right direction.

As a result, it was found that a difference in the transmission and reception performances of V2X communication, which depended on a difference between the straight-traveling state and the turning state of the leaning vehicle, could be suppressed by arranging the directional V2X communication antenna mounted on the front portion of the vehicle, in the following manner. The technical idea was to adjust the 3 dB beam width of the directional V2X communication antenna mounted on the leaning vehicle, in consideration of the turning of the leaning vehicle.

The directional V2X communication antenna is arranged to have the following radiation characteristics when measurement is performed for the antenna that takes a posture of being mounted on the V2X communication antenna-mounted leaning vehicle in which the leaning vehicle body frame is in the upright state but that is not actually mounted on the V2X communication antenna-mounted leaning vehicle. To put it differently, the directional V2X communication antenna is arranged such that the 3 dB beam width on a vehicle-mounted horizontal plane (i.e., a horizontal mounting plane) is longer than the 3 dB beam width on a vehicle-mounted vertical plane (i.e., a vertical mounting plane). The vehicle-mounted horizontal plane is a horizontal plane passing through the V2X communication antenna when the directional V2X communication antenna is mounted on the V2X communication antenna-mounted leaning vehicle in which the leaning vehicle body frame is in the upright state. The vehicle-mounted vertical plane passes through the V2X communication antenna, is perpendicular to the vehicle-mounted horizontal plane, and is parallel to the vehicle front-rear direction, when the V2X communication antenna is mounted on the V2X communication antenna-mounted leaning vehicle in which the leaning vehicle body frame is in the upright state. In addition to this, the directional V2X communication antenna is arranged so that the 3 dB beam width on the vehicle-mounted vertical plane exists both in a vehicle upper region which is above the vehicle-mounted horizontal plane in the vehicle up-down direction and in a vehicle lower region which is below the vehicle-mounted horizontal plane in the vehicle up-down direction. Furthermore, the directional V2X communication antenna is arranged so that the 3 dB beam width on the vehicle-mounted horizontal plane exists both in a vehicle left region which is leftward of the vehicle-mounted vertical plane in the vehicle left-right direction and in a vehicle right region which is rightward of the vehicle-mounted vertical plane in the vehicle left-right direction.

For example, when turning left, the leaning vehicle tends to move in the vehicle forward direction and in the vehicle leftward direction and communicate with another V2X communication device which exists in a vehicle forward leftward region which is forward of and leftward of the leaning vehicle in the vehicle front-rear direction and in the vehicle left-right direction. To be more specific, when the leaning vehicle is in the left turning state, a vehicle which has another V2X communication device and is located in front of the leaning vehicle when the leaning vehicle is in the straight-traveling state tends to move in the vehicle leftward direction as compared to the leaning vehicle and exist in a vehicle forward leftward region which is forward of and leftward of the leaning vehicle in the vehicle front-rear direction and in the vehicle left-right direction. Because the directional V2X communication antenna is arranged in this manner, the V2X communication antenna-mounted leaning vehicle in which the directional V2X communication antenna is mounted on the front portion of the vehicle is able to achieve sufficient radiation characteristics in the vehicle forward leftward region, when the vehicle is in the left turning state. Therefore, when the directional V2X communication antenna arranged as described above is mounted on the front portion of the vehicle, the V2X communication antenna-mounted leaning vehicle is able to suppress deterioration of the transmission and reception performances of the V2X communication with another V2X communication device in the vehicle forward leftward region when the leaning vehicle is in the left turning state, as compared to a case where the leaning vehicle is in the straight-traveling state. Meanwhile, when turning right, the leaning vehicle tends to move in the vehicle forward direction and in the vehicle rightward direction and communicate with another V2X communication device which exists in a vehicle forward rightward region which is forward of and rightward of the leaning vehicle in the vehicle front-rear direction and in the vehicle left-right direction. To be more specific, when the leaning vehicle is in the right turning state, a vehicle which has another V2X communication device and is located in front of the leaning vehicle when the leaning vehicle is in the straight-traveling state tends to move in the vehicle rightward direction as compared to the leaning vehicle and exist in a vehicle forward rightward region which is forward of and rightward of the leaning vehicle in the vehicle front-rear direction and in the vehicle left-right direction. Because the directional V2X communication antenna is arranged in this manner, the V2X communication antenna-mounted leaning vehicle in which the directional V2X communication antenna is mounted on the front portion of the vehicle is able to achieve sufficient radiation characteristics in the vehicle forward rightward region, when the leaning vehicle is in the right turning state. Therefore, when the directional V2X communication antenna arranged as described above is mounted on the front portion of the vehicle, the V2X communication antenna-mounted leaning vehicle is able to suppress deterioration of the transmission and reception performances of the V2X communication with another V2X communication device in the vehicle forward rightward region when the leaning vehicle is in the right turning state, as compared to the transmission and reception performances of the leaning vehicle in the straight-traveling state.

In addition to the above, the inventors of the subject application found that effects similar to the effects achieved in the case where the directional V2X communication antenna were mounted on the front portion of the vehicle were achieved when a similarly arranged directional V2X communication antenna was mounted on a rear portion of the vehicle.

The vehicle turns left on a road which is curved left. The leaning vehicle which turns left moves in the vehicle forward direction and in the vehicle leftward direction. The smaller the turning radius of the road curved left is, the more the leaning vehicle turning left moves in the vehicle leftward direction. It was found that, when the directional V2X communication antenna was mounted on the rear portion of the leaning vehicle which turned left, the transmission and reception performances between the directional V2X communication antenna mounted on the rear portion of the leaning vehicle and another V2X communication device in a vehicle forward leftward region which was rearward of and leftward of the leaning vehicle in the vehicle front-rear direction and in the vehicle left-right direction were low as compared to the transmission and reception performances of the leaning vehicle in the straight-traveling state. It was also found that the larger the inclination angle of the leaning vehicle body frame of the leaning vehicle on which the directional V2X communication antenna was mounted at the rear portion was in the vehicle leftward direction, the more the transmission and reception performances tended to deteriorate. It was also found that, in regard to the leaning vehicle which was turning left and another V2X communication device which was in the vehicle rearward leftward region rearward of and leftward of the leaning vehicle in the vehicle front-rear direction and in the vehicle left-right direction, the farther the another V2X communication device was from a vehicle vertical plane in the vehicle leftward direction, the more the transmission and reception performances tended to deteriorate. The vehicle vertical plane passed through the V2X communication antenna mounted on the leaning vehicle in which the leaning vehicle body frame was in the upright state, and was vertical to the vehicle left-right direction. To be more specific, in a left turning state, a vehicle on which another V2X communication device is mounted and is rearward of the leaning vehicle when the leaning vehicle is in the straight-traveling state moves in the vehicle leftward direction as compared to the leaning vehicle. The smaller the turning radius of the road curved left is, the more the vehicle on which another V2X communication device is mounted and is rearward of the leaning vehicle in the vehicle front-rear direction when the leaning vehicle is in the straight-traveling state moves in the vehicle leftward direction as compared to the leaning vehicle, when the leaning vehicle is in the left turning state. It was found that, when the directional V2X communication antenna was mounted on the rear portion of the vehicle, the transmission and reception performances of the V2V communication between the directional V2X communication antenna mounted on the rear portion of the leaning vehicle and a vehicle on which another V2X communication device was mounted and which was in a vehicle rearward leftward region of the leaning vehicle when the leaning vehicle was in the left turning state were deteriorated as compared to the transmission and reception performances of the leaning vehicle in the straight-traveling state. It was also found that, the larger the inclination angle of the leaning vehicle body frame of the leaning vehicle on which the directional V2X communication antenna was mounted at the rear portion was in the vehicle leftward direction, the more the transmission and reception performances tended to deteriorate. It was also found that, in regard to the leaning vehicle which was in the left turning state and a vehicle having another V2X communication device which was in the vehicle rearward leftward region rearward of and rightward of the leaning vehicle in the vehicle front-rear direction and in the vehicle left-right direction, the farther the vehicle with the another V2X communication device was from a vehicle-mounted vertical plane in the vehicle rightward direction, the more the transmission and reception performances tended to deteriorate. The vehicle-mounted vertical plane passed through the V2X communication antenna mounted on the leaning vehicle in which the leaning vehicle body frame was in the upright state, was perpendicular to the vehicle-mounted horizontal plane, and was parallel to the vehicle front-rear direction.

A vehicle turns right on a road which is curved right. The leaning vehicle which turns right moves in the vehicle forward direction and in the vehicle rightward direction. The smaller the turning radius of the road curved right is, the more the leaning vehicle turning right moves in the vehicle rightward direction. It was found that, when the directional V2X communication antenna was mounted on the rear portion of the leaning vehicle which turned right, the transmission and reception performances between the directional V2X communication antenna mounted on the rear portion of the leaning vehicle and another V2X communication device in a vehicle rearward rightward region which was rearward of and rightward of the leaning vehicle turning right in the vehicle front-rear direction and in the vehicle left-right direction were low as compared to a case where the leaning vehicle was in the straight-traveling state. It was also found that the larger the inclination angle of the leaning vehicle body frame of the leaning vehicle on which the directional V2X communication antenna was mounted at the front portion was in the vehicle rightward direction, the more the transmission and reception performances tended to deteriorate. It was also found that, in regard to the leaning vehicle which was turning right and another V2X communication device which was in the vehicle rearward rightward region rearward of and rightward of the leaning vehicle in the vehicle front-rear direction and in the vehicle left-right direction, the farther the another V2X communication device was from a vehicle vertical plane in the vehicle rightward direction, the more the transmission and reception performances tended to deteriorate. The vehicle-d vertical plane passed through the V2X communication antenna mounted on the leaning vehicle in which the leaning vehicle body frame was in the upright state, and was vertical to the vehicle left-right direction. To be more specific, in a right turning state, a vehicle on which another V2X communication device is mounted and is rearward of the leaning vehicle in the vehicle front-rear direction when the leaning vehicle is in the straight-traveling state moves in the vehicle rightward direction as compared to the leaning vehicle. The smaller the turning radius of the road curved right is, the more the vehicle on which another V2X communication device is mounted and is rearward of the leaning vehicle in the vehicle front-rear direction when the leaning vehicle is in the straight-traveling state moves in the vehicle rightward direction as compared to the leaning vehicle, when the leaning vehicle is in the right turning state. It was found that, when the directional V2X communication antenna was mounted on the rear portion of the vehicle, the transmission and reception performances of the V2V communication between the directional V2X communication antenna mounted on the rear portion of the leaning vehicle and a vehicle on which another V2X communication device was mounted and which was in a vehicle rearward rightward region of the leaning vehicle when the leaning vehicle was in the right turning state were deteriorated as compared to a case where the leaning vehicle was in the straight-traveling state. It was also found that the larger the inclination angle of the leaning vehicle body frame of the leaning vehicle on which the directional V2X communication antenna was mounted at the rear portion was in the vehicle rightward direction, the more the transmission and reception performances tended to deteriorate. It was also found that, in regard to the leaning vehicle which was in the right turning state and a vehicle having another V2X communication device which was in the vehicle rearward leftward region rearward of and leftward of the leaning vehicle in the vehicle front-rear direction and in the vehicle left-right direction, the farther the vehicle with the another V2X communication device was from a vehicle-mounted vertical plane in the vehicle rightward direction, the more the transmission and reception performances tended to deteriorate. The vehicle-mounted vertical plane passed through the V2X communication antenna mounted on the leaning vehicle in which the leaning vehicle body frame was in the upright state, was perpendicular to the vehicle-mounted horizontal plane, and was parallel to the vehicle front-rear direction.

For example, when turning left, the leaning vehicle tends to move in the vehicle forward direction and in the vehicle leftward direction and communicate with another V2X communication device which exists in a vehicle rearward leftward region which is rearward of and leftward of the leaning vehicle in the vehicle front-rear direction and in the vehicle left-right direction. To be more specific, when the leaning vehicle is in the left turning state, a vehicle which has another V2X communication device and is located rearward of the leaning vehicle in the vehicle front-rear direction when the leaning vehicle is in the straight-traveling state tends to move in the vehicle leftward direction as compared to the leaning vehicle and exist in a vehicle rearward leftward region which is rearward of and leftward of the leaning vehicle in the vehicle front-rear direction and in the vehicle left-right direction. Because the directional V2X communication antenna is arranged in this manner, the V2X communication antenna-mounted leaning vehicle in which the directional V2X communication antenna is mounted on the rear portion of the vehicle is able to achieve sufficient radiation characteristics in the vehicle rearward leftward region, when the leaning vehicle is in the left turning state. Therefore, when the directional V2X communication antenna arranged as described above is mounted on the rear portion of the vehicle, the V2X communication antenna-mounted leaning vehicle is able to suppress deterioration of the transmission and reception performances of the V2X communication with another V2X communication device in the vehicle rearward leftward region when the leaning vehicle is in the left turning state, as compared to the transmission and reception performances of the leaning vehicle in the straight-traveling state. Meanwhile, when turning right, the leaning vehicle tends to move in the vehicle forward direction and in the vehicle rightward direction and communicate with another V2X communication device which exists in a vehicle rearward rightward region which is rearward of and rightward of the leaning vehicle in the vehicle front-rear direction and in the vehicle left-right direction. To be more specific, when the leaning vehicle is in the right turning state, a vehicle which has another V2X communication device and is located rearward of the leaning vehicle in the vehicle front-rear direction when the leaning vehicle is in the straight-traveling state tends to move in the vehicle rightward direction as compared to the leaning vehicle and exist in a vehicle rearward rightward region which is rearward of and rightward of the leaning vehicle in the vehicle front-rear direction and in the vehicle left-right direction. Because the directional V2X communication antenna is arranged in this manner, the leaning vehicle in which the directional V2X communication antenna is mounted on the rear portion of the vehicle is able to achieve sufficient radiation characteristics in the vehicle rearward rightward region, when the leaning vehicle is in the right turning state. Therefore, when the directional V2X communication antenna arranged as described above is mounted on the rear portion of the vehicle, the V2X communication antenna-mounted leaning vehicle is able to suppress deterioration of the transmission and reception performances of the V2X communication with another V2X communication device in the vehicle rearward rightward region when the leaning vehicle is in the right turning state, as compared to a case where the leaning vehicle is in the straight-traveling state.

Because of the above, the V2X communication antenna-mounted leaning vehicle is able to suppress a difference in transmission and reception performances of V2X communication between a straight-traveling state and a turning state of the leaning vehicle, while suppressing a difference in transmission and reception performances of V2X communication due to different mounting locations of the V2X communication antenna.

(1) A V2X communication antenna-mounted leaning vehicle of the present teaching includes: a leaning vehicle body frame which leans in a vehicle leftward direction when turning left and leans in a vehicle rightward direction when turning right; a V2X communication device which is used to perform V2X communication with another V2X communication device which is located around the leaning vehicle body frame; and a V2X communication antenna which is electrically connected to the V2X communication device and leans in the vehicle leftward direction or in the vehicle rightward direction together with the leaning vehicle body frame, the V2X communication antenna being a directional V2X communication antenna having directivity, and when measurement is performed for the V2X communication antenna that takes a posture of being mounted on the V2X communication antenna-mounted leaning vehicle in which the leaning vehicle body frame is in an upright state but that is not actually mounted on the V2X communication antenna-mounted leaning vehicle, the V2X communication antenna being arranged such that: (I) 3 dB beam width on a vehicle-mounted horizontal plane is longer than 3 dB beam width on a vehicle-mounted vertical plane, the vehicle-mounted horizontal plane being a horizontal plane passing through the V2X communication antenna when the directional V2X communication antenna takes the posture of being mounted on the V2X communication antenna-mounted leaning vehicle in which the leaning vehicle body frame is in the upright state, and the vehicle-mounted vertical plane passing through the V2X communication antenna, being perpendicular to the vehicle-mounted horizontal plane, and being parallel to the vehicle front-rear direction, when the V2X communication antenna takes the posture of being mounted on the V2X communication antenna-mounted leaning vehicle in which the leaning vehicle body frame is in the upright state; (II) the 3 dB beam width on the vehicle-mounted vertical plane existing both in a vehicle upper region which is above the vehicle-mounted horizontal plane in a vehicle up-down direction and in a vehicle lower region which is below the vehicle-mounted horizontal plane in the vehicle up-down direction; and (III) the 3 dB beam width on the vehicle-mounted horizontal plane existing both in a vehicle left region which is leftward of the vehicle-mounted vertical plane in a vehicle left-right direction and in a vehicle right region which is rightward of the vehicle-mounted vertical plane in the vehicle left-right direction, and the V2X communication device performing the V2X communication with the another V2X communication device around the leaning vehicle body frame at least when the leaning vehicle body frame turns left and leans in the vehicle leftward direction or when the leaning vehicle body frame turns right and leans in the vehicle rightward direction.

According to this arrangement, the leaning vehicle is the V2X communication antenna-mounted leaning vehicle which includes the V2X communication antenna which is arranged to lean in the vehicle leftward direction or in the vehicle rightward direction together with the leaning vehicle body frame. The V2X communication antenna mounted on the leaning vehicle is a directional V2X communication antenna with directivity. It is therefore possible to design the 3 dB beam width of the directional V2X communication antenna, with intension.

The directional V2X communication antenna is arranged to have the following three features when measurement is performed for the antenna that takes the posture of being mounted on the V2X communication antenna-mounted leaning vehicle in which the leaning vehicle body frame is in the upright state but that is not actually mounted on the V2X communication antenna-mounted leaning vehicle. The V2X communication antenna which is not actually mounted on the V2X communication antenna-mounted leaning vehicle indicates a single V2X communication antenna which is not mounted on the V2X communication antenna-mounted leaning vehicle and nothing is provided around the V2X communication antenna. The first feature is that (I) the 3 dB beam width on a vehicle-mounted horizontal plane is longer than the 3 dB beam width on a vehicle-mounted vertical plane. The vehicle-mounted horizontal plane is a horizontal plane passing through the V2X communication antenna when the directional V2X communication antenna is mounted on the V2X communication antenna-mounted leaning vehicle in which the leaning vehicle body frame is in the upright state. The vehicle-mounted vertical plane passes through the V2X communication antenna, is perpendicular to the vehicle-mounted horizontal plane, and is parallel to the vehicle front-rear direction, when the V2X communication antenna is mounted on the V2X communication antenna-mounted leaning vehicle in which the leaning vehicle body frame is in the upright state. The second feature is that (II) the 3 dB beam width on the vehicle-mounted vertical plane exists both in a vehicle upper region which is above the vehicle-mounted horizontal plane in the vehicle up-down direction and in a vehicle lower region which is below the vehicle-mounted horizontal plane in the vehicle up-down direction. The third feature is that (III) the 3 dB beam width on the vehicle-mounted horizontal plane exists both in a vehicle left region which is leftward of the vehicle-mounted vertical plane in the vehicle left-right direction and in a vehicle right region which is rightward of the vehicle-mounted vertical plane in the vehicle left-right direction. In addition to the above, the V2X communication device performs the V2X communication at least while the leaning vehicle body frame is turning left and leans in the vehicle leftward direction and while the leaning vehicle body frame is turning right and leans in the vehicle rightward direction.

For example, when turning left, the V2X communication antenna-mounted leaning vehicle tends to move in the vehicle forward direction and in the vehicle leftward direction and communicate with another V2X communication device which exists in a vehicle forward leftward region which is forward of and leftward of the V2X communication antenna-mounted leaning vehicle in the vehicle front-rear direction and in the vehicle left-right direction. To be more specific, when the V2X communication antenna-mounted leaning vehicle is in the left turning state, a vehicle which has another V2X communication device and is located in front of the leaning vehicle when the leaning vehicle is in the straight-traveling state tends to move in the vehicle leftward direction as compared to the leaning vehicle and exist in a vehicle forward leftward region which is forward of and leftward of the V2X communication antenna-mounted leaning vehicle in the vehicle front-rear direction and in the vehicle left-right direction. Because the directional V2X communication antenna is arranged in this manner, the V2X communication antenna-mounted leaning vehicle in which the directional V2X communication antenna is mounted on the front portion of the vehicle is able to achieve sufficient radiation characteristics in the vehicle forward leftward region, when the vehicle is in the left turning state. Therefore, when the directional V2X communication antenna arranged as described above is mounted on the front portion of the vehicle, the V2X communication antenna-mounted leaning vehicle is able to suppress deterioration of the transmission and reception performances of the V2X communication with another V2X communication device in the vehicle forward leftward region when the leaning vehicle is in the left turning state, as compared to the transmission and reception performances of the leaning vehicle in the straight-traveling state.

Furthermore, when turning right, the V2X communication antenna-mounted leaning vehicle tends to move in the vehicle forward direction and in the vehicle rightward direction and communicate with another V2X communication device which exists in a vehicle forward rightward region which is forward of and leftward of the V2X communication antenna-mounted leaning vehicle in the vehicle front-rear direction and in the vehicle left-right direction. To be more specific, when the V2X communication antenna-mounted leaning vehicle is in the right turning state, a vehicle which has another V2X communication device and is located in front of the leaning vehicle when the leaning vehicle is in the straight-traveling state tends to move in the vehicle rightward direction as compared to the V2X communication antenna-mounted leaning vehicle and exist in a vehicle forward rightward region which is forward of and rightward of the V2X communication antenna-mounted leaning vehicle in the vehicle front-rear direction and in the vehicle left-right direction. Because the directional V2X communication antenna is arranged in this manner, the V2X communication antenna-mounted leaning vehicle in which the directional V2X communication antenna is mounted on the front portion of the vehicle is able to achieve sufficient radiation characteristics in the vehicle forward rightward region, when the leaning vehicle is in the right turning state. Therefore, when the directional V2X communication antenna arranged as described above is mounted on the front portion of the vehicle, the V2X communication antenna-mounted leaning vehicle is able to suppress deterioration of the transmission and reception performances of the V2X communication with another V2X communication device in the vehicle forward rightward region when the leaning vehicle is in the right turning state, as compared to the transmission and reception performances of the leaning vehicle in the straight-traveling state.

In addition to the above, for example, when turning left, the V2X communication antenna-mounted leaning vehicle tends to move in the vehicle forward direction and in the vehicle leftward direction and communicate with another V2X communication device which exists in a vehicle rearward leftward region which is rearward of and leftward of the V2X communication antenna-mounted leaning vehicle in the vehicle front-rear direction and in the vehicle left-right direction. Similarly, when the V2X communication antenna-mounted leaning vehicle is in the left turning state, a vehicle which is behind the V2X communication antenna-mounted leaning vehicle in the straight-traveling state and has another V2X communication device tends to move in the vehicle leftward direction as compared to the V2X communication antenna-mounted leaning vehicle and to be located in a vehicle rearward leftward region which is rearward of and leftward of the V2X communication antenna-mounted leaning vehicle in the vehicle front-rear direction and in the vehicle left-right direction. Because the directional V2X communication antenna is arranged in this manner, the V2X communication antenna-mounted leaning vehicle in which the directional V2X communication antenna is mounted on the rear portion of the vehicle is able to achieve sufficient radiation characteristics in the vehicle rearward leftward region, when the leaning vehicle is in the left turning state. Therefore, when the directional V2X communication antenna arranged as described above is mounted on the rear portion of the vehicle, the V2X communication antenna-mounted leaning vehicle is able to suppress deterioration of the transmission and reception performances of the V2X communication with another V2X communication device in the vehicle rearward leftward region when the leaning vehicle is in the left turning state, as compared to the transmission and reception performances of the leaning vehicle in the straight-traveling state.

Furthermore, when turning right, the V2X communication antenna-mounted leaning vehicle tends to move in the vehicle forward direction and in the vehicle rightward direction and communicate with another V2X communication device which exists in a vehicle rearward rightward region which is rearward of and rightward of the V2X communication antenna-mounted leaning vehicle in the vehicle front-rear direction and in the vehicle left-right direction. To be more specific, when the V2X communication antenna-mounted leaning vehicle is in the right turning state, a vehicle which is behind the V2X communication antenna-mounted leaning vehicle in the straight-traveling state and has another V2X communication device tends to move in the vehicle rightward direction as compared to the V2X communication antenna-mounted leaning vehicle and to be located in a vehicle rearward rightward region which is rearward of and rightward of the V2X communication antenna-mounted leaning vehicle in the vehicle front-rear direction and in the vehicle left-right direction. Because the directional V2X communication antenna is arranged in this manner, the V2X communication antenna-mounted leaning vehicle in which the directional V2X communication antenna is mounted on the rear portion of the vehicle is able to achieve sufficient radiation characteristics in the vehicle rearward rightward region, when the leaning vehicle is in the right turning state. Therefore, when the directional V2X communication antenna arranged as described above is mounted on the rear portion of the vehicle, the V2X communication antenna-mounted leaning vehicle is able to suppress deterioration of the transmission and reception performances of the V2X communication with another V2X communication device in the vehicle rearward rightward region when the leaning vehicle is in the right turning state, as compared to a case where the leaning vehicle is in the straight-traveling state.

For these reasons, the V2X communication antenna-mounted leaning vehicle of the present teaching is able to suppress a difference in transmission and reception performances of V2X communication between the straight-traveling state and the turning state of the leaning vehicle, while suppressing a difference in transmission and reception performances of V2X communication due to different mounting locations of the V2X communication antenna.

(2) According to another aspect of the present teaching, the V2X communication antenna-mounted leaning vehicle of the present teaching preferably includes the following arrangement, in addition to the arrangement (1).

When measurement is performed for the directional V2X communication antenna that takes the posture of being mounted on the V2X communication antenna-mounted leaning vehicle in which the leaning vehicle body frame is in the upright state but that is not actually mounted on the V2X communication antenna-mounted leaning vehicle, 3 dB beam width in the vehicle upper region among the 3 dB beam width on the vehicle-mounted vertical plane is larger than 3 dB beam width in the vehicle lower region among the 3 dB beam width on the vehicle-mounted vertical plane.

The directional V2X communication antenna is provided on the leaning vehicle body frame so that, when measurement is performed for the directional V2X communication antenna that takes the posture of being mounted on the V2X communication antenna-mounted leaning vehicle in which the leaning vehicle body frame is in the upright state but that is not actually mounted on the V2X communication antenna-mounted leaning vehicle, 3 dB beam width in the vehicle upper region among the 3 dB beam width on the vehicle-mounted vertical plane is larger than 3 dB beam width in the vehicle lower region among the 3 dB beam width on the vehicle-mounted vertical plane.

For example, when the V2X communication antenna-mounted leaning vehicle in which the directional V2X communication antenna is mounted on the front portion of the vehicle is in the left turning state, the directional V2X communication antenna leans in the vehicle leftward direction, too. For this reason, the height from the road surface on which the V2X communication antenna-mounted leaning vehicle is grounded to the directional V2X communication antenna is low in the left turning state, as compared to the straight-traveling state. In other words, an electromagnetic wave which is radiated from the directional V2X communication antenna to the vehicle upper region in the vehicle forward leftward region when the V2X communication antenna-mounted leaning vehicle is in the straight-traveling state is radiated to a location closer to the road surface when the vehicle is in the left turning state. Because the directional V2X communication antenna is arranged in this manner, the V2X communication antenna-mounted leaning vehicle in which the directional V2X communication antenna is mounted on the front portion of the vehicle is able to achieve further sufficient radiation characteristics in the vehicle forward leftward region, when the vehicle is in the left turning state. Therefore, when the directional V2X communication antenna arranged as described above is mounted on the front portion of the vehicle, the V2X communication antenna-mounted leaning vehicle is able to further suppress deterioration of the transmission and reception performances of the V2X communication with another V2X communication device in the vehicle forward leftward region when the leaning vehicle is in the left turning state, as compared to the transmission and reception performances of the leaning vehicle in the straight-traveling state.

When the V2X communication antenna-mounted leaning vehicle in which the directional V2X communication antenna is mounted on the front portion of the vehicle is in the right turning state, the directional V2X communication antenna leans in the vehicle rightward direction, too. For this reason, the height from the road surface on which the V2X communication antenna-mounted leaning vehicle is grounded to the directional V2X communication antenna is low in the right turning state, as compared to the straight-traveling state. In other words, an electromagnetic wave which is radiated from the directional V2X communication antenna to the vehicle upper region in the vehicle forward rightward region when the V2X communication antenna-mounted leaning vehicle is in the straight-traveling state is radiated to a location closer to the road surface when the vehicle is in the right turning state. Because the directional V2X communication antenna is arranged in this manner, the V2X communication antenna-mounted leaning vehicle in which the directional V2X communication antenna is mounted on the front portion of the vehicle is able to achieve further sufficient radiation characteristics in the vehicle forward rightward region, when the leaning vehicle is in the right turning state. Therefore, when the directional V2X communication antenna arranged as described above is mounted on the front portion of the vehicle, the V2X communication antenna-mounted leaning vehicle is able to further suppress deterioration of the transmission and reception performances of the V2X communication with another V2X communication device in the vehicle forward rightward region when the leaning vehicle is in the right turning state, as compared to the transmission and reception performances of the leaning vehicle in the straight-traveling state.

For example, when the V2X communication antenna-mounted leaning vehicle in which the directional V2X communication antenna is mounted on the rear portion of the vehicle is in the left turning state, the directional V2X communication antenna leans in the vehicle leftward direction, too. For this reason, the height from the road surface on which the V2X communication antenna-mounted leaning vehicle is grounded to the directional V2X communication antenna is low in the left turning state, as compared to the straight-traveling state. In other words, an electromagnetic wave which is radiated from the directional V2X communication antenna to the vehicle upper region in the vehicle rearward leftward region when the V2X communication antenna-mounted leaning vehicle is in the straight-traveling state is radiated to a location closer to the road surface when the vehicle is in the left turning state. Because the directional V2X communication antenna is arranged in this manner, the V2X communication antenna-mounted leaning vehicle in which the directional V2X communication antenna is mounted on the rear portion of the vehicle is able to achieve further sufficient radiation characteristics in the vehicle rearward leftward region, when the leaning vehicle is in the left turning state. Therefore, when the directional V2X communication antenna arranged as described above is mounted on the rear portion of the vehicle, the V2X communication antenna-mounted leaning vehicle is able to further suppress deterioration of the transmission and reception performances of the V2X communication with another V2X communication device in the vehicle rearward leftward region when the leaning vehicle is in the left turning state, as compared to the transmission and reception performances of the leaning vehicle in the straight-traveling state.

When the V2X communication antenna-mounted leaning vehicle in which the directional V2X communication antenna is mounted on the rear portion of the vehicle is in the right turning state, the directional V2X communication antenna leans in the vehicle rightward direction, too. For this reason, the height from the road surface on which the V2X communication antenna-mounted leaning vehicle is grounded to the directional V2X communication antenna is low in the right turning state, as compared to the straight-traveling state. In other words, an electromagnetic wave which is radiated from the directional V2X communication antenna to the vehicle upper region in the vehicle rearward rightward region when the V2X communication antenna-mounted leaning vehicle is in the straight-traveling state is radiated to a location closer to the road surface when the vehicle is in the right turning state. Because the directional V2X communication antenna is arranged in this manner, the V2X communication antenna-mounted leaning vehicle in which the directional V2X communication antenna is mounted on the rear portion of the vehicle is able to achieve further sufficient radiation characteristics in the vehicle rearward rightward region, when the leaning vehicle is in the right turning state. Therefore, when the directional V2X communication antenna arranged as described above is mounted on the rear portion of the vehicle, the V2X communication antenna-mounted leaning vehicle is able to further suppress deterioration of the transmission and reception performances of the V2X communication with another V2X communication device in the vehicle rearward rightward region when the leaning vehicle is in the right turning state, as compared to a case where the leaning vehicle is in the straight-traveling state.

The V2X communication antenna-mounted leaning vehicle of the present teaching is therefore able to further suppress a difference in transmission and reception performances of V2X communication between a straight-traveling state and a turning state of the leaning vehicle, while suppressing a difference in transmission and reception performances of V2X communication due to different mounting locations of the V2X communication antenna.

(3) According to another aspect of the present teaching, the V2X communication antenna-mounted leaning vehicle of the present teaching preferably includes the following arrangement, in addition to the arrangement (1) or (2).

When measurement is performed for the directional V2X communication antenna that takes the posture of being mounted on the V2X communication antenna-mounted leaning vehicle in which the leaning vehicle body frame is in the upright state but that is not actually mounted on the V2X communication antenna-mounted leaning vehicle, the 3 dB beam width on the vehicle-mounted horizontal plane is larger than a total maximum bank angle when the V2X communication antenna-mounted leaning vehicle is viewed in a vehicle forward direction or in a vehicle rearward direction, the total maximum bank angle being sum total of a left maximum bank angle which is an angle between the vehicle up-down direction and an up-down direction of the leaning vehicle body frame which maximally leans in the vehicle leftward direction when turning left and a right maximum bank angle which is an angle between the vehicle up-down direction and an up-down direction of the leaning vehicle body frame which maximally leans in the vehicle rightward direction when turning right.

According to this arrangement, when measurement is performed for the directional V2X communication antenna that takes the posture of being mounted on the V2X communication antenna-mounted leaning vehicle in which the leaning vehicle body frame is in the upright state but that is not actually mounted on the V2X communication antenna-mounted leaning vehicle, the 3 dB beam width on the vehicle-mounted horizontal plane is arranged to be larger than the total maximum bank angle. It is therefore possible to design the 3 dB beam width on the vehicle-mounted horizontal plane of the directional V2X communication antenna in accordance with the total maximum bank angle.

For example, when the V2X communication antenna-mounted leaning vehicle is in a left turning state in which the vehicle turns left with the left maximum bank angle, the turning radius is short. On this account, when turning left in this way, the V2X communication antenna-mounted leaning vehicle moves more in the vehicle leftward direction. For this reason, when the V2X communication antenna-mounted leaning vehicle is in such a left turning state, a vehicle which has another V2X communication device and is located in front of the V2X communication antenna-mounted leaning vehicle in which the directional V2X communication antenna is mounted on the front portion, when the vehicle is in the straight-traveling state, moves more in the vehicle leftward direction as compared to the V2X communication antenna-mounted leaning vehicle. Because the directional V2X communication antenna is arranged in this manner, the V2X communication antenna-mounted leaning vehicle in which the directional V2X communication antenna is mounted on the front portion of the vehicle is able to achieve further sufficient radiation characteristics in the vehicle forward leftward region, when the vehicle is in the left turning state. Therefore, when the directional V2X communication antenna arranged as described above is mounted on the front portion of the vehicle, the V2X communication antenna-mounted leaning vehicle is able to further suppress deterioration of the transmission and reception performances of the V2X communication with another V2X communication device in the vehicle forward leftward region when the leaning vehicle is in the left turning state, as compared to the transmission and reception performances of the leaning vehicle in the straight-traveling state.

When the V2X communication antenna-mounted leaning vehicle is in a right turning state in which the vehicle turns right with the right maximum bank angle, the turning radius is short. On this account, when turning right in this way, the V2X communication antenna-mounted leaning vehicle moves more in the vehicle rightward direction. For this reason, when the V2X communication antenna-mounted leaning vehicle is in such a right turning state, a vehicle which has another V2X communication device and is located in front of the V2X communication antenna-mounted leaning vehicle in which the directional V2X communication antenna is mounted on the front portion, when the vehicle is in the straight-traveling state, moves more in the vehicle rightward direction as compared to the V2X communication antenna-mounted leaning vehicle. Because the directional V2X communication antenna is arranged in this manner, the V2X communication antenna-mounted leaning vehicle in which the directional V2X communication antenna is mounted on the front portion of the vehicle is able to achieve further sufficient radiation characteristics in the vehicle forward rightward region, when the leaning vehicle is in the right turning state. Therefore, when the directional V2X communication antenna arranged as described above is mounted on the front portion of the vehicle, the V2X communication antenna-mounted leaning vehicle is able to further suppress deterioration of the transmission and reception performances of the V2X communication with another V2X communication device in the vehicle forward rightward region when the leaning vehicle is in the right turning state, as compared to the transmission and reception performances of the leaning vehicle in the straight-traveling state.

When the V2X communication antenna-mounted leaning vehicle is in a left turning state in which the vehicle turns left with the left maximum bank angle, the turning radius is short. On this account, when turning left in this way, the V2X communication antenna-mounted leaning vehicle moves more in the vehicle leftward direction. For this reason, when the V2X communication antenna-mounted leaning vehicle is in such a left turning state, a vehicle which has another V2X communication device and is located behind the V2X communication antenna-mounted leaning vehicle in which the directional V2X communication antenna is mounted on the rear portion, when the vehicle is in the straight-traveling state, moves more in the vehicle leftward direction as compared to the V2X communication antenna-mounted leaning vehicle.

Because the directional V2X communication antenna is arranged in this manner, the V2X communication antenna-mounted leaning vehicle in which the directional V2X communication antenna is mounted on the rear portion of the vehicle is able to achieve further sufficient radiation characteristics in the vehicle rearward leftward region, when the leaning vehicle is in the left turning state. Therefore, when the directional V2X communication antenna arranged as described above is mounted on the rear portion of the vehicle, the V2X communication antenna-mounted leaning vehicle is able to further suppress deterioration of the transmission and reception performances of the V2X communication with another V2X communication device in the vehicle rearward leftward region when the leaning vehicle is in the left turning state, as compared to the transmission and reception performances of the leaning vehicle in the straight-traveling state.

When the V2X communication antenna-mounted leaning vehicle is in a right turning state in which the vehicle turns right with the right maximum bank angle, the turning radius is short. On this account, when turning right in this way, the V2X communication antenna-mounted leaning vehicle moves more in the vehicle rightward direction. For this reason, when the V2X communication antenna-mounted leaning vehicle is in such a right turning state, a vehicle which has another V2X communication device and is located behind the V2X communication antenna-mounted leaning vehicle in which the directional V2X communication antenna is mounted on the rear portion, when the vehicle is in the straight-traveling state, moves more in the vehicle rightward direction as compared to the V2X communication antenna-mounted leaning vehicle. Because the directional V2X communication antenna is arranged in this manner, the V2X communication antenna-mounted leaning vehicle in which the directional V2X communication antenna is mounted on the rear portion of the vehicle is able to achieve further sufficient radiation characteristics in the vehicle rearward rightward region, when the leaning vehicle is in the right turning state. Therefore, when the directional V2X communication antenna arranged as described above is mounted on the rear portion of the vehicle, the V2X communication antenna-mounted leaning vehicle is able to further suppress deterioration of the transmission and reception performances of the V2X communication with another V2X communication device in the vehicle rearward rightward region when the leaning vehicle is in the right turning state, as compared to a case where the leaning vehicle is in the straight-traveling state.

The V2X communication antenna-mounted leaning vehicle of the present teaching is therefore able to further suppress a difference in transmission and reception performances of V2X communication between a straight-traveling state and a turning state of the leaning vehicle, while suppressing a difference in transmission and reception performances of V2X communication due to different mounting locations of the V2X communication antenna.

(4) According to another aspect of the present teaching, the V2X communication antenna-mounted leaning vehicle of the present teaching preferably includes the following arrangement, in addition to any one of the arrangements (1) to (3).

When measurement is performed for the directional V2X communication antenna that takes the posture of being mounted on the V2X communication antenna-mounted leaning vehicle in which the leaning vehicle body frame is in the upright state but that is not actually mounted on the V2X communication antenna-mounted leaning vehicle, the 3 dB beam width on the vehicle-mounted vertical plane is larger than a half of a total maximum bank angle when the V2X communication antenna-mounted leaning vehicle is viewed in a vehicle forward direction or in a vehicle rearward direction, the total maximum bank angle being sum total of a left maximum bank angle which is an angle between the vehicle-mounted vertical plane and the up-down direction of the leaning vehicle body frame which maximally leans in the vehicle leftward direction when turning left and a right maximum bank angle which is an angle between the vehicle-mounted vertical plane and the up-down direction of the leaning vehicle body frame which maximally leans in the vehicle rightward direction when turning right.

According to this arrangement, when measurement is performed for the directional V2X communication antenna that takes the posture of being mounted on the V2X communication antenna-mounted leaning vehicle in which the leaning vehicle body frame is in the upright state but that is not actually mounted on the V2X communication antenna-mounted leaning vehicle, the 3 dB beam width on the vehicle-mounted vertical plane is arranged to be larger than a half of the total maximum bank angle. It is therefore possible to design the 3 dB beam width on the vehicle-mounted vertical plane of the directional V2X communication antenna in accordance with the total maximum bank angle.

For example, when the V2X communication antenna-mounted leaning vehicle in which the directional V2X communication antenna is mounted on the front portion of the vehicle is in the left turning state and turns left with a left maximum bank angle, the directional V2X communication antenna leans leftward by the left maximum bank angle. For this reason, the height from the road surface on which the V2X communication antenna-mounted leaning vehicle is grounded to the directional V2X communication antenna is low in the left turning state, as compared to the straight-traveling state. In other words, an electromagnetic wave which is radiated from the directional V2X communication antenna to the vehicle upper region in the vehicle forward leftward region when the V2X communication antenna-mounted leaning vehicle is in the straight-traveling state is radiated to a location closer to the road surface when the vehicle is in the left turning state. Because the directional V2X communication antenna is arranged in this manner, the V2X communication antenna-mounted leaning vehicle in which the directional V2X communication antenna is mounted on the front portion of the vehicle is able to achieve further sufficient radiation characteristics in the vehicle forward leftward region, when the vehicle is in the left turning state. Therefore, when the directional V2X communication antenna arranged as described above is mounted on the front portion of the vehicle, the V2X communication antenna-mounted leaning vehicle is able to further suppress deterioration of the transmission and reception performances of the V2X communication with another V2X communication device in the vehicle forward leftward region when the leaning vehicle is in the left turning state, as compared to the transmission and reception performances of the leaning vehicle in the straight-traveling state.

Furthermore, when the V2X communication antenna-mounted leaning vehicle in which the directional V2X communication antenna is mounted on the front portion of the vehicle is in the right turning state and turns right with a right maximum bank angle, the directional V2X communication antenna leans rightward by the right maximum bank angle. For this reason, the height from the road surface on which the V2X communication antenna-mounted leaning vehicle is grounded to the directional V2X communication antenna is low in the right turning state, as compared to the straight-traveling state. In other words, an electromagnetic wave which is radiated from the directional V2X communication antenna to the vehicle upper region in the vehicle forward rightward region when the V2X communication antenna-mounted leaning vehicle is in the straight-traveling state is radiated to a location closer to the road surface when the vehicle is in the right turning state. Because the directional V2X communication antenna is arranged in this manner, the V2X communication antenna-mounted leaning vehicle in which the directional V2X communication antenna is mounted on the front portion of the vehicle is able to achieve further sufficient radiation characteristics in the vehicle forward rightward region, when the leaning vehicle is in the right turning state. Therefore, when the directional V2X communication antenna arranged as described above is mounted on the front portion of the vehicle, the V2X communication antenna-mounted leaning vehicle is able to further suppress deterioration of the transmission and reception performances of the V2X communication with another V2X communication device in the vehicle forward rightward region when the leaning vehicle is in the right turning state, as compared to the transmission and reception performances of the leaning vehicle in the straight-traveling state.

For example, when the V2X communication antenna-mounted leaning vehicle in which the directional V2X communication antenna is mounted on the rear portion of the vehicle is in the left turning state and turns with a left maximum bank angle, the directional V2X communication antenna leans leftward by the left maximum bank angle. For this reason, the height from the road surface on which the V2X communication antenna-mounted leaning vehicle is grounded to the directional V2X communication antenna is low in the left turning state, as compared to the straight-traveling state. In other words, an electromagnetic wave which is radiated from the directional V2X communication antenna to the vehicle upper region in the vehicle rearward leftward region when the V2X communication antenna-mounted leaning vehicle is in the straight-traveling state is radiated to a location closer to the road surface when the vehicle is in the left turning state. Because the directional V2X communication antenna is arranged in this manner, the V2X communication antenna-mounted leaning vehicle in which the directional V2X communication antenna is mounted on the rear portion of the vehicle is able to achieve sufficient radiation characteristics in the vehicle rearward leftward region, when the leaning vehicle is in the left turning state. Therefore, when the directional V2X communication antenna arranged as described above is mounted on the rear portion of the vehicle, the V2X communication antenna-mounted leaning vehicle is able to further suppress deterioration of the transmission and reception performances of the V2X communication with another V2X communication device in the vehicle rearward leftward region when the leaning vehicle is in the left turning state, as compared to the transmission and reception performances of the leaning vehicle in the straight-traveling state.

When the V2X communication antenna-mounted leaning vehicle in which the directional V2X communication antenna is mounted on the rear portion of the vehicle is in the right turning state and turns right with a right maximum bank angle, the directional V2X communication antenna leans rightward by the right maximum bank angle. For this reason, the height from the road surface on which the V2X communication antenna-mounted leaning vehicle is grounded to the directional V2X communication antenna is low in the left turning state, as compared to the straight-traveling state. In other words, an electromagnetic wave which is radiated from the directional V2X communication antenna to the vehicle upper region in the vehicle rearward rightward region when the V2X communication antenna-mounted leaning vehicle is in the straight-traveling state is radiated to a location closer to the road surface when the vehicle is in the right turning state. Because the directional V2X communication antenna is arranged in this manner, the V2X communication antenna-mounted leaning vehicle in which the directional V2X communication antenna is mounted on the rear portion of the vehicle is able to achieve further sufficient radiation characteristics in the vehicle rearward rightward region, when the leaning vehicle is in the right turning state. Therefore, when the directional V2X communication antenna arranged as described above is mounted on the rear portion of the vehicle, the V2X communication antenna-mounted leaning vehicle is able to further suppress deterioration of the transmission and reception performances of the V2X communication with another V2X communication device in the vehicle rearward rightward region when the leaning vehicle is in the right turning state, as compared to a case where the leaning vehicle is in the straight-traveling state. The V2X communication antenna-mounted leaning vehicle of the present teaching is therefore able to further suppress a difference in transmission and reception performances of V2X communication between a straight-traveling state and a turning state of the leaning vehicle, while suppressing a difference in transmission and reception performances of V2X communication due to different mounting locations of the V2X communication antenna.

The V2X communication antenna-mounted leaning vehicle of the present teaching is therefore able to further suppress a difference in transmission and reception performances of V2X communication between a straight-traveling state and a turning state of the leaning vehicle, while suppressing a difference in transmission and reception performances of V2X communication due to different mounting locations of the V2X communication antenna.

(5) According to another aspect of the present teaching, the V2X communication antenna-mounted leaning vehicle of the present teaching preferably includes the following arrangement, in addition to any one of the arrangements (1) to (4).

When the directional V2X communication antenna is provided at a front portion of the V2X communication antenna-mounted leaning vehicle and the V2X communication antenna-mounted leaning vehicle in which the leaning vehicle body frame is in the upright state is viewed in the vehicle leftward direction or in the vehicle rightward direction, an upper end of a substrate constituting the directional V2X communication antenna is rearward of a lower end of the substrate constituting the directional V2X communication antenna in the vehicle front-rear direction, and when the directional V2X communication antenna is provided at a rear portion of the V2X communication antenna-mounted leaning vehicle and the V2X communication antenna-mounted leaning vehicle in which the leaning vehicle body frame is in the upright state is viewed in the vehicle leftward direction or in the vehicle rightward direction, the upper end of the substrate constituting the directional V2X communication antenna is forward of the lower end of the substrate constituting the directional V2X communication antenna in the vehicle front-rear direction.

According to this arrangement, when the directional V2X communication antenna is provided at a front portion of the V2X communication antenna-mounted leaning vehicle and the V2X communication antenna-mounted leaning vehicle in which the leaning vehicle body frame is in the upright state is viewed in the vehicle leftward direction or in the vehicle rightward direction, an upper end of a substrate constituting the directional V2X communication antenna is rearward of a lower end of the substrate constituting the directional V2X communication antenna in the vehicle front-rear direction. When the directional V2X communication antenna is provided at a rear portion of the V2X communication antenna-mounted leaning vehicle and the V2X communication antenna-mounted leaning vehicle in which the leaning vehicle body frame is in the upright state is viewed in the vehicle leftward direction or in the vehicle rightward direction, an upper end of a substrate constituting the directional V2X communication antenna is forward of a lower end of the substrate constituting the directional V2X communication antenna in the vehicle front-rear direction, and With this arrangement, when the V2X communication antenna-mounted leaning vehicle in which the leaning vehicle body frame is in the upright state is viewed in the vehicle leftward direction or in the vehicle rightward direction, the size of the 3 dB beam width on the vehicle-mounted vertical plane of the directional V2X communication antenna, which exists in the vehicle upper region, is large as compared to a case where the upper end of the substrate constituting the directional V2X communication antenna is at the same position as the lower end of the substrate constituting the directional V2X communication antenna in the vehicle front-rear direction.

When the V2X communication antenna-mounted leaning vehicle in which the directional V2X communication antenna is mounted on the front portion of the vehicle is in the left turning state, the directional V2X communication antenna leans in the vehicle leftward direction, too. For this reason, the height from the road surface on which the V2X communication antenna-mounted leaning vehicle is grounded to the directional V2X communication antenna is low in the left turning state, as compared to the straight-traveling state. In other words, an electromagnetic wave which is radiated from the directional V2X communication antenna to the vehicle upper region in the vehicle forward leftward region when the V2X communication antenna-mounted leaning vehicle is in the straight-traveling state is radiated to a location closer to the road surface when the vehicle is in the left turning state. Because the directional V2X communication antenna is arranged in this manner, the V2X communication antenna-mounted leaning vehicle in which the directional V2X communication antenna is mounted on the front portion of the vehicle is able to achieve further sufficient radiation characteristics in the vehicle forward leftward region, when the vehicle is in the left turning state. Therefore, when the directional V2X communication antenna arranged as described above is mounted on the front portion of the vehicle, the V2X communication antenna-mounted leaning vehicle is able to further suppress deterioration of the transmission and reception performances of the V2X communication with another V2X communication device in the vehicle forward leftward region when the leaning vehicle is in the left turning state, as compared to the transmission and reception performances of the leaning vehicle in the straight-traveling state.

When the V2X communication antenna-mounted leaning vehicle in which the directional V2X communication antenna is mounted on the front portion of the vehicle is in the right turning state, the directional V2X communication antenna leans in the vehicle rightward direction, too. For this reason, the height from the road surface on which the V2X communication antenna-mounted leaning vehicle is grounded to the directional V2X communication antenna is low in the right turning state, as compared to the straight-traveling state. In other words, an electromagnetic wave which is radiated from the directional V2X communication antenna to the vehicle upper region in the vehicle forward rightward region when the V2X communication antenna-mounted leaning vehicle is in the straight-traveling state is radiated to a location closer to the road surface when the vehicle is in the right turning state. Because the directional V2X communication antenna is arranged in this manner, the V2X communication antenna-mounted leaning vehicle in which the directional V2X communication antenna is mounted on the front portion of the vehicle is able to achieve further sufficient radiation characteristics in the vehicle forward rightward region, when the leaning vehicle is in the right turning state. Therefore, when the directional V2X communication antenna arranged as described above is mounted on the front portion of the vehicle, the V2X communication antenna-mounted leaning vehicle is able to further suppress deterioration of the transmission and reception performances of the V2X communication with another V2X communication device in the vehicle forward rightward region when the leaning vehicle is in the right turning state, as compared to the transmission and reception performances of the leaning vehicle in the straight-traveling state.

For example, when the V2X communication antenna-mounted leaning vehicle in which the directional V2X communication antenna is mounted on the rear portion of the vehicle is in the left turning state, the directional V2X communication antenna leans in the vehicle leftward direction, too. For this reason, the height from the road surface on which the V2X communication antenna-mounted leaning vehicle is grounded to the directional V2X communication antenna is low in the left turning state, as compared to the straight-traveling state. In other words, an electromagnetic wave which is radiated from the directional V2X communication antenna to the vehicle upper region in the vehicle rearward leftward region when the V2X communication antenna-mounted leaning vehicle is in the straight-traveling state is radiated to a location closer to the road surface when the vehicle is in the left turning state. Because the directional V2X communication antenna is arranged in this manner, the V2X communication antenna-mounted leaning vehicle in which the directional V2X communication antenna is mounted on the rear portion of the vehicle is able to achieve further sufficient radiation characteristics in the vehicle rearward leftward region, when the leaning vehicle is in the left turning state. Therefore, when the directional V2X communication antenna arranged as described above is mounted on the rear portion of the vehicle, the V2X communication antenna-mounted leaning vehicle is able to further suppress deterioration of the transmission and reception performances of the V2X communication with another V2X communication device in the vehicle rearward leftward region when the leaning vehicle is in the left turning state, as compared to the transmission and reception performances of the leaning vehicle in the straight-traveling state.

When the V2X communication antenna-mounted leaning vehicle in which the directional V2X communication antenna is mounted on the rear portion of the vehicle is in the right turning state and turning right, the directional V2X communication antenna leans in the vehicle rightward direction, too. For this reason, the height from the road surface on which the V2X communication antenna-mounted leaning vehicle is grounded to the directional V2X communication antenna is low in the right turning state, as compared to the straight-traveling state. In other words, an electromagnetic wave which is radiated from the directional V2X communication antenna to the vehicle upper region in the vehicle rearward rightward region when the V2X communication antenna-mounted leaning vehicle is in the straight-traveling state is radiated to a location closer to the road surface when the vehicle is in the right turning state. Because the directional V2X communication antenna is arranged in this manner, the V2X communication antenna-mounted leaning vehicle in which the directional V2X communication antenna is mounted on the rear portion of the vehicle is able to achieve further sufficient radiation characteristics in the vehicle rearward rightward region, when the leaning vehicle is in the right turning state. Therefore, when the directional V2X communication antenna arranged as described above is mounted on the rear portion of the vehicle, the V2X communication antenna-mounted leaning vehicle is able to further suppress deterioration of the transmission and reception performances of the V2X communication with another V2X communication device in the vehicle rearward rightward region when the leaning vehicle is in the right turning state, as compared to a case where the leaning vehicle is in the straight-traveling state.

The V2X communication antenna-mounted leaning vehicle of the present teaching is therefore able to further suppress a difference in transmission and reception performances of V2X communication between a straight-traveling state and a turning state of the leaning vehicle, while suppressing a difference in transmission and reception performances of V2X communication due to different mounting locations of the V2X communication antenna.

(6) According to another aspect of the present teaching, the V2X communication antenna-mounted leaning vehicle of the present teaching preferably includes the following arrangement, in addition to any one of the arrangements (1) to (4).

When the directional V2X communication antenna is provided at a front portion of the V2X communication antenna-mounted leaning vehicle and the V2X communication antenna-mounted leaning vehicle in which the leaning vehicle body frame is in the upright state is viewed in the vehicle leftward direction or in the vehicle rightward direction, an upper end of a substrate constituting the directional V2X communication antenna is identical in position with a lower end of the substrate constituting the directional V2X communication antenna in the vehicle front-rear direction, and when the directional V2X communication antenna is provided at a rear portion of the V2X communication antenna-mounted leaning vehicle and the V2X communication antenna-mounted leaning vehicle in which the leaning vehicle body frame is in the upright state is viewed in the vehicle leftward direction or in the vehicle rightward direction, the upper end of the substrate constituting the directional V2X communication antenna is identical in position with the lower end of the substrate constituting the directional V2X communication antenna in the vehicle front-rear direction.

According to this arrangement, when the directional V2X communication antenna is provided at a front portion of the V2X communication antenna-mounted leaning vehicle and the V2X communication antenna-mounted leaning vehicle in which the leaning vehicle body frame is in the upright state is viewed in the vehicle leftward direction or in the vehicle rightward direction, an upper end of a substrate constituting the directional V2X communication antenna is identical in position with a lower end of the substrate constituting the directional V2X communication antenna in the vehicle front-rear direction. Furthermore, when the directional V2X communication antenna is provided at a rear portion of the V2X communication antenna-mounted leaning vehicle and the V2X communication antenna-mounted leaning vehicle in which the leaning vehicle body frame is in the upright state is viewed in the vehicle leftward direction or in the vehicle rightward direction, an upper end of a substrate constituting the directional V2X communication antenna is identical in position with a lower end of the substrate constituting the directional V2X communication antenna in the vehicle front-rear direction.

Because the directional V2X communication antenna is arranged in this way, the 3 dB beam width on the vehicle-mounted vertical plane of the directional V2X communication antenna exists both in the vehicle upper region and the vehicle lower region even if the posture of the front portion or the rear portion of the V2X communication antenna-mounted leaning vehicle is changed in the vehicle up-down direction. Furthermore, even if the posture of the front portion or the rear portion of the V2X communication antenna-mounted leaning vehicle is changed in the vehicle up-down direction, the 3 dB beam width on the vehicle-mounted horizontal plane of the directional V2X communication antenna exists both in the vehicle left region and the vehicle right region. In other words, when the rear portion of the vehicle becomes relatively lower in height than the front portion or when the front portion of the vehicle becomes relatively lower in height than the rear portion, it is possible to suppress the difference in the transmission and reception performances between the directional V2X communication antennas.

For these reasons, the V2X communication antenna-mounted leaning vehicle of the present teaching is able to suppress a difference in transmission and reception performances of V2X communication between the straight-traveling state and the turning state of the leaning vehicle, while suppressing a difference in transmission and reception performances of V2X communication due to different mounting locations of the V2X communication antenna.

(7) According to another aspect of the present teaching, the V2X communication antenna-mounted leaning vehicle of the present teaching preferably includes the following arrangement, in addition to any one of the arrangements (1) to (6).

The directional V2X communication antenna is provided at least at the front portion of the vehicle or at the rear portion of the vehicle.

According to this arrangement, the directional V2X communication antenna may be provided at the front portion of the vehicle. In this case, the V2X communication antenna mounted on the V2X communication antenna-mounted leaning vehicle may be only a directional V2X communication antenna. When the directional V2X communication antenna is provided only at the front portion of the vehicle, for another V2X communication device in front of the V2X communication antenna-mounted leaning vehicle in the vehicle front-rear direction, the V2X communication antenna-mounted leaning vehicle is able to suppress a difference in transmission and reception performances of V2X communication between a straight-traveling state and a turning state of the leaning vehicle, while suppressing a difference in transmission and reception performances of V2X communication due to different mounting locations of the V2X communication antenna.

Alternatively, the directional V2X communication antenna may be provided at the rear portion of the vehicle. In this case, the V2X communication antenna mounted on the V2X communication antenna-mounted leaning vehicle may be only a directional V2X communication antenna. When the directional V2X communication antenna is provided only at the rear portion of the vehicle, for another V2X communication device behind the V2X communication antenna-mounted leaning vehicle in the vehicle front-rear direction, the V2X communication antenna-mounted leaning vehicle is able to suppress a difference in transmission and reception performances of V2X communication between a straight-traveling state and a turning state of the leaning vehicle, while suppressing a difference in transmission and reception performances of V2X communication due to different mounting locations of the V2X communication antenna.

In addition to the above, the directional V2X communication antennas may be provided at the front portion and the rear portion of the vehicle. When the directional V2X communication antennas are provided at the front portion and the rear portion of the vehicle, for another V2X communication device in front of the V2X communication antenna-mounted leaning vehicle in the vehicle front-rear direction and for another V2X communication device behind the V2X communication antenna-mounted leaning vehicle in the vehicle front-rear direction, the V2X communication antenna-mounted leaning vehicle is able to suppress a difference in transmission and reception performances of V2X communication between a straight-traveling state and a turning state of the leaning vehicle, while suppressing a difference in transmission and reception performances of V2X communication due to different mounting locations of the V2X communication antenna.

(8) According to another aspect of the present teaching, the V2X communication antenna-mounted leaning vehicle of the present teaching preferably includes the following arrangement, in addition to any one of the arrangements (1) to (6).

The directional V2X communication antenna is provided at the front portion of the vehicle and a nondirectional V2X communication antenna is provided at the rear portion of the vehicle, or the directional V2X communication antenna is provided at the rear portion of the vehicle and the nondirectional V2X communication antenna is provided at the front portion of the vehicle.

According to this arrangement, the directional V2X communication antenna may be provided at the front portion of the vehicle. The nondirectional V2X communication antenna is provided at the rear portion of the vehicle. When the directional V2X communication antenna is provided at the front portion of the vehicle, it is possible to design the directivity of the directional V2X communication antenna in consideration of the nondirectional V2X communication antenna provided at the rear portion of the vehicle. For another V2X communication device in front of the V2X communication antenna-mounted leaning vehicle in the vehicle front-rear direction, the V2X communication antenna-mounted leaning vehicle is able to suppress a difference in transmission and reception performances of V2X communication between a straight-traveling state and a turning state of the leaning vehicle, while suppressing a difference in transmission and reception performances of V2X communication due to different mounting locations of the V2X communication antenna. Furthermore, the V2X communication antenna-mounted leaning vehicle is able to perform V2X communication with another V2X communication device behind the leaning vehicle in the vehicle front-rear direction, by means of the nondirectional V2X communication antenna.

Alternatively, the directional V2X communication antenna may be provided at the rear portion of the vehicle. The nondirectional V2X communication antenna is provided at the front portion of the vehicle. When the directional V2X communication antenna is provided at the rear portion of the vehicle, it is possible to design the directivity of the directional V2X communication antenna in consideration of the nondirectional V2X communication antenna provided at the front portion of the vehicle. For another V2X communication device behind the V2X communication antenna-mounted leaning vehicle in the vehicle front-rear direction, the V2X communication antenna-mounted leaning vehicle is able to suppress a difference in transmission and reception performances of V2X communication between a straight-traveling state and a turning state of the leaning vehicle, while suppressing a difference in transmission and reception performances of V2X communication due to different mounting locations of the V2X communication antenna. Furthermore, the V2X communication antenna-mounted leaning vehicle is able to perform V2X communication with another V2X communication device in front of the leaning vehicle in the vehicle front-rear direction, by means of the nondirectional V2X communication antenna.

(9) According to another aspect of the present teaching, the V2X communication antenna-mounted leaning vehicle of the present teaching preferably includes the following arrangement, in addition to any one of the arrangements (1) to (6).

The directional V2X communication antenna is provided at the front portion of the vehicle and a directional V2X communication antenna which is different from the directional V2X communication antenna in radiation characteristics is provided at the rear portion of the vehicle, or the directional V2X communication antenna is provided at the rear portion of the vehicle and a directional V2X communication antenna which is different from the directional V2X communication antenna in radiation characteristics is provided at the front portion of the vehicle.

According to this arrangement, the directional V2X communication antenna may be provided at the front portion of the vehicle. The another directional V2X communication antenna which is different in radiation characteristics from the directional V2X communication antenna is provided at the rear portion of the vehicle. It is possible to design the directivity of the directional V2X communication antenna at the front portion of the vehicle in consideration of the directional V2X communication antenna provided at the rear portion of the vehicle. For another V2X communication device in front of the V2X communication antenna-mounted leaning vehicle in the vehicle front-rear direction, the V2X communication antenna-mounted leaning vehicle is able to suppress a difference in transmission and reception performances of V2X communication between a straight-traveling state and a turning state of the leaning vehicle, while suppressing a difference in transmission and reception performances of V2X communication due to different mounting locations of the V2X communication antenna. Furthermore, the V2X communication antenna-mounted leaning vehicle is able to perform V2X communication with another V2X communication device behind the leaning vehicle in the vehicle front-rear direction, by means of the directional V2X communication antenna at the rear portion of the vehicle.

Alternatively, the directional V2X communication antenna may be provided at the rear portion of the vehicle. The another directional V2X communication antenna which is different in radiation characteristics from the directional V2X communication antenna is provided at the front portion of the vehicle. It is possible to design the directivity of the directional V2X communication antenna at the rear portion of the vehicle in consideration of the directional V2X communication antenna provided at the front portion of the vehicle. For another V2X communication device behind the V2X communication antenna-mounted leaning vehicle in the vehicle front-rear direction, the V2X communication antenna-mounted leaning vehicle is able to suppress a difference in transmission and reception performances of V2X communication between a straight-traveling state and a turning state of the leaning vehicle, while suppressing a difference in transmission and reception performances of V2X communication due to different mounting locations of the V2X communication antenna. Furthermore, the V2X communication antenna-mounted leaning vehicle is able to perform V2X communication with another V2X communication device in front of the leaning vehicle in the vehicle front-forward direction, by means of the directional V2X communication antenna at the front portion of the vehicle.

(10) According to another aspect of the present teaching, the V2X communication antenna-mounted leaning vehicle of the present teaching preferably includes the following arrangement, in addition to any one of the arrangements (1) to (9).

The directional V2X communication antenna is provided at an upper portion of the V2X communication antenna-mounted leaning vehicle.

According to this arrangement, the directional V2X communication antenna is provided at an upper portion of the V2X communication antenna-mounted leaning vehicle. The upper portion of the V2X communication antenna-mounted leaning vehicle is not largely occupied by metal which affects the radiation characteristics of the antenna. On this account, the V2X communication antenna-mounted leaning vehicle is able to further suppress a difference in transmission and reception performances of V2X communication between the straight-traveling state and the turning state of the leaning vehicle, while further suppressing a difference in transmission and reception performances of V2X communication due to different mounting locations of the V2X communication antenna.

(11) According to another aspect of the present teaching, the V2X communication antenna-mounted leaning vehicle of the present teaching preferably includes the following arrangement, in addition to any one of the arrangements (1) to (10).

The V2X communication antenna-mounted leaning vehicle further includes at least one front wheel and at least one rear wheel, each of which is supported by the leaning vehicle body frame and includes a tire and a wheel, the directional V2X communication antenna being provided above the wheel in the vehicle up-down direction, in the V2X communication antenna-mounted leaning vehicle in which the leaning vehicle body frame is in the upright state.

According to this arrangement, the V2X communication antenna-mounted leaning vehicle further includes at least one front wheel and at least one rear wheel. The at least one front wheel and at least one rear wheel are supported by the leaning vehicle body frame and each includes a tire and a wheel. The wheel may be made of metal. Metal reflects electromagnetic waves from the antenna. In other words, metal effects on the radiation characteristics of the antenna. In the V2X communication antenna-mounted leaning vehicle in which the leaning vehicle body frame is in the upright state, the directional V2X communication antenna is provided above the wheel in the vehicle up-down direction. The directional V2X communication antenna is therefore provided at a location where the radiation characteristics of the antenna is less likely to be affected by the wheel. On this account, the V2X communication antenna-mounted leaning vehicle is able to further suppress a difference in transmission and reception performances of V2X communication between the straight-traveling state and the turning state of the leaning vehicle, while further suppressing a difference in transmission and reception performances of V2X communication due to different mounting locations of the V2X communication antenna.

(12) According to another aspect of the present teaching, the V2X communication antenna-mounted leaning vehicle of the present teaching preferably includes the following arrangement, in addition to any one of the arrangements (1) to (11).

The V2X communication antenna-mounted leaning vehicle further includes a link mechanism which is supported by the leaning vehicle body frame and connects at least two of the front wheels or at least two of the rear wheels, when the V2X communication antenna-mounted leaning vehicle in which the leaning vehicle body frame is in the upright state or in a lean state is viewed in the vehicle forward direction or in the vehicle rearward direction, (i) the directional V2X communication antenna being provided above or below the link mechanism in an up-down direction of the leaning vehicle body frame, (ii) when the directional V2X communication antenna is provided at the front portion of the vehicle, the directional V2X communication antenna being provided forward of the link mechanism in the vehicle front-rear direction on the vehicle-mounted horizontal plane when the antenna takes the posture of being mounted on the V2X communication antenna-mounted leaning vehicle in which the leaning vehicle body frame is in the upright state, or (iii) when the directional V2X communication antenna is provided at the rear portion of the vehicle, the directional V2X communication antenna being provided rearward of the link mechanism in the vehicle front-rear direction on the vehicle-mounted horizontal plane when the antenna takes the posture of being mounted on the V2X communication antenna-mounted leaning vehicle in which the leaning vehicle body frame is in the upright state.

According to this arrangement, the V2X communication antenna-mounted leaning vehicle further includes the link mechanism. The link mechanism is supported by the leaning vehicle body frame and connects at least two front wheels with each other. Alternatively, the link mechanism is supported by the leaning vehicle body frame and connects at least two rear wheels with each other. The link mechanism may be made of metal. Metal reflects electromagnetic waves from the antenna. For this reason, when the link mechanism is made of metal, the link mechanism affects the radiation characteristics of an antenna. The directional V2X communication antenna is provided above or below the link mechanism in the leaning vehicle body frame, when the V2X communication antenna-mounted leaning vehicle in which the leaning vehicle body frame is in the upright state or in the lean state is viewed in the vehicle forward direction or in the vehicle rearward direction. Furthermore, the directional V2X communication antenna is provided at one of the following two positions. When the directional V2X communication antenna is provided at the front portion of the vehicle, the directional V2X communication antenna is provided forward of the link mechanism in the vehicle front-rear direction, on the vehicle-mounted horizontal plane when the antenna is mounted on a V2X communication antenna-mounted leaning vehicle in which the leaning vehicle body frame is in the upright state. When the directional V2X communication antenna is provided at the rear portion of the vehicle, the directional V2X communication antenna is provided rearward of the link mechanism in the vehicle front-rear direction, on the vehicle-mounted horizontal plane when the antenna is mounted on a V2X communication antenna-mounted leaning vehicle in which the leaning vehicle body frame is in the upright state. The directional V2X communication antenna is therefore provided at a location where the radiation characteristics of the antenna is less likely to be affected by the link mechanism. On this account, the V2X communication antenna-mounted leaning vehicle is able to further suppress a difference in transmission and reception performances of V2X communication between the straight-traveling state and the turning state of the leaning vehicle, while further suppressing a difference in transmission and reception performances of V2X communication due to different mounting locations of the V2X communication antenna.

(13) According to another aspect of the present teaching, the V2X communication antenna-mounted leaning vehicle of the present teaching preferably includes the following arrangement, in addition to the arrangement (12).

When the directional V2X communication antenna is provided at the front portion of the vehicle, the directional V2X communication antenna is forward of the link mechanism and is separated from the link mechanism by an antenna metal distance in the vehicle-front-rear direction, on the vehicle-mounted horizontal plane when the antenna takes the posture of being mounted on the V2X communication antenna-mounted leaning vehicle in which the leaning vehicle body frame is in the upright state, and when the directional V2X communication antenna is provided at the rear portion of the vehicle, the directional V2X communication antenna is rearward of the link mechanism and is separated from the link mechanism by the antenna metal distance in the vehicle-front-rear direction, on the vehicle-mounted horizontal plane when the antenna takes the posture of being mounted on the V2X communication antenna-mounted leaning vehicle in which the leaning vehicle body frame is in the upright state.

According to this arrangement, when the directional V2X communication antenna is provided at the front portion of the vehicle, the directional V2X communication antenna is forward of the link mechanism and is separated from the link mechanism by an antenna metal distance in the vehicle-front-rear direction, on the vehicle-mounted horizontal plane when the antenna takes the posture of being mounted on the V2X communication antenna-mounted leaning vehicle in which the leaning vehicle body frame is in the upright state. The directional V2X communication antenna provided at the rear portion of the vehicle is provided rearward of the link mechanism in the vehicle front-rear direction and is separated from the link mechanism by an antenna metal distance, on the vehicle-mounted horizontal plane when the antenna is mounted on the V2X communication antenna-mounted leaning vehicle in which the leaning vehicle body frame is in the upright state. The antenna metal distance is a distance which is long enough so that the link mechanism does not affect the radiation characteristics of the directional V2X communication antenna. The antenna metal distance may be, for example, a distance with which the 3 dB beam width of the directional V2X communication antenna is not changed between a case where the link mechanism is provided and a case where the link mechanism is not provided. On this account, the V2X communication antenna-mounted leaning vehicle is able to further suppress a difference in transmission and reception performances of V2X communication between the straight-traveling state and the turning state of the leaning vehicle, while further suppressing a difference in transmission and reception performances of V2X communication due to different mounting locations of the V2X communication antenna.

(14) According to another aspect of the present teaching, the V2X communication antenna-mounted leaning vehicle of the present teaching preferably includes the following arrangement, in addition to any one of the arrangements (1) to (11).

When the directional V2X communication antenna is provided at the front portion of the vehicle, the directional V2X communication antenna is forward of the leaning vehicle body frame and is separated from the leaning vehicle body frame by an antenna metal distance in the vehicle-front-rear direction, on the vehicle-mounted horizontal plane when the antenna takes the posture of being mounted on the V2X communication antenna-mounted leaning vehicle in which the leaning vehicle body frame is in the upright state, and when the directional V2X communication antenna is provided at the rear portion of the vehicle, the directional V2X communication antenna is rearward of the leaning vehicle body frame and is separated from the leaning vehicle body frame by the antenna metal distance in the vehicle-front-rear direction, on the vehicle-mounted horizontal plane when the antenna takes the posture of being mounted on the V2X communication antenna-mounted leaning vehicle in which the leaning vehicle body frame is in the upright state.

According to this arrangement, when the directional V2X communication antenna is provided at the front portion of the vehicle, the directional V2X communication antenna is forward of the leaning vehicle body frame and is separated from the leaning vehicle body frame by an antenna metal distance in the vehicle-front-rear direction, on the vehicle-mounted horizontal plane when the antenna takes the posture of being mounted on the V2X communication antenna-mounted leaning vehicle in which the leaning vehicle body frame is in the upright state. When the directional V2X communication antenna is provided at the rear portion of the vehicle, the directional V2X communication antenna is rearward of the leaning vehicle body frame and is separated from the leaning vehicle body frame by an antenna metal distance in the vehicle-front-rear direction, on the vehicle-mounted horizontal plane when the antenna takes the posture of being mounted on the V2X communication antenna-mounted leaning vehicle in which the leaning vehicle body frame is in the upright state. The antenna metal distance is a distance which is long enough so that the leaning vehicle body frame does not affect the radiation characteristics of the directional V2X communication antenna. The antenna metal distance may be, for example, a distance with which the 3 dB beam width of the directional V2X communication antenna is not changed between a case where the leaning vehicle body frame is provided and a case where the leaning vehicle body frame is not provided. On this account, the V2X communication antenna-mounted leaning vehicle is able to further suppress a difference in transmission and reception performances of V2X communication between the straight-traveling state and the turning state of the leaning vehicle, while further suppressing a difference in transmission and reception performances of V2X communication due to different mounting locations of the V2X communication antenna.

(15) According to another aspect of the present teaching, the V2X communication antenna-mounted leaning vehicle of the present teaching preferably includes the following arrangement, in addition to the arrangement (13) or (14).

The antenna metal distance is at least twice as long as wavelength of an electromagnetic wave that the directional V2X communication antenna is able to send and receive.

According to this arrangement, the antenna metal distance is at least twice as long as wavelength of an electromagnetic wave that the directional V2X communication antenna is able to send and receive. It is therefore possible to arrange the distance between the directional V2X communication antenna and the leaning vehicle body frame to be long enough to prevent the link mechanism or the leaning vehicle body frame from influencing on the radiation characteristics of the directional V2X communication antenna. On this account, the V2X communication antenna-mounted leaning vehicle is able to further suppress a difference in transmission and reception performances of V2X communication between the straight-traveling state and the turning state of the leaning vehicle, while further suppressing a difference in transmission and reception performances of V2X communication due to different mounting locations of the V2X communication antenna.

Definition of V2X Communication

In the present teaching, V2X communication indicates transmission of information between a communication device mounted on a V2X communication antenna-mounted leaning vehicle and another communication device. For example, the V2X communication is Vehicle-to-Vehicle communication, Vehicle-to-Infrastructure communication, or Vehicle-to-Pedestrian communication. The Vehicle-to-Vehicle communication is communication between a V2X communication device mounted on a V2X communication antenna-mounted leaning vehicle and another V2X communication device mounted on another vehicle. The Vehicle-to-Infrastructure communication is communication between a V2X communication device mounted on a V2X communication antenna-mounted leaning vehicle and another V2X communication device mounted on a road. The Vehicle-to-Pedestrian communication is communication between a V2X communication device mounted on a V2X communication antenna-mounted leaning vehicle and another V2X communication device held by a pedestrian. In the present teaching, the V2X communication does not encompass GNSS.

Definition of 3 dB Beam Width

A 3 dB beam width of the present teaching indicates an angle which encompasses a direction at which the radiation strength of an electromagnetic wave radiated from a directional V2X communication antenna of the present teaching has the maximum gain and is between two directions at each of which the radiation strength of the electromagnetic wave is lower by 3 dB than the maximum gain. In short, the magnitude of the 3 dB beam width is indicated by an angle. When the 3 dB beam width exists in a region, at least one direction encompassed in the 3 dB beam width exists in the region.

Definition of Radiation Characteristics of Antenna

In the present teaching, radiation characteristics of an antenna encompasses both a radiation pattern and a receiving sensitivity. In other words, in the present teaching, the radiation characteristics of the antenna encompass transmission and reception performances which indicate both transmission performance and reception performance.

Definitions of Directional Antenna and Nondirectional Antenna

In the present teaching, a nondirectional antenna is an antenna without directivity, and has almost identical radiation strengths in all directions from the antenna, on a plane passing through the antenna. Meanwhile, a directional antenna is an antenna with directivity. Such an antenna does not have identical radiation strengths in all directions from the antenna and has a high radiation strength in a particular direction from the antenna, on a plane passing through the antenna.

Definition of Leaning Vehicle Body Frame

In the present teaching, a leaning vehicle body frame is a member which mainly receives stress in the vehicle. The leaning vehicle body frame may be a frame formed by combining a plurality of components, or may be an integrally molded frame. At least part of the leaning vehicle body frame may have a monocoque structure in which a plate member receives stress. The monocoque structure is also known as a frameless structure. In the present teaching, when a leaning vehicle body frame leans in a vehicle rightward direction, a leaning vehicle body frame leans in the vehicle rightward direction with respect to a vehicle up-down direction. When the leaning vehicle body frame leans in the vehicle rightward direction, the leaning vehicle body frame leans in the vehicle rightward direction with respect to a grounding point of the vehicle. In other words, when the leaning vehicle body frame leans in the vehicle rightward direction, an upper portion of the leaning vehicle body frame moves in the vehicle rightward direction relative to a lower portion of the leaning vehicle body frame.

<Definition of Maximum Bank Angle>

In the present teaching, a left maximum bank angle is an angle between the up-down direction of a leaning vehicle body frame which maximally leans in the vehicle leftward direction when turning left and the vehicle up-down direction, when the V2X communication antenna-mounted leaning vehicle is viewed in the vehicle forward direction or in the vehicle rearward direction. In the present teaching, a right maximum bank angle is an angle between the up-down direction of a leaning vehicle body frame which maximally leans in the vehicle rightward direction when turning right and the vehicle up-down direction, when the V2X communication antenna-mounted leaning vehicle is viewed in the vehicle forward direction or in the vehicle rearward direction. A total maximum bank angle is the sum total of the left maximum bank angle and the right maximum bank angle. A state in which the leaning vehicle body frame maximally leans in the vehicle leftward direction when turning left indicates that the V2X communication antenna-mounted leaning vehicle is able to maximally lean in the vehicle leftward direction when turning left. A state in which the leaning vehicle body frame maximally leans in the vehicle rightward direction when turning right indicates that the V2X communication antenna-mounted leaning vehicle is able to maximally lean in the vehicle rightward direction when turning right. To be more specific, the maximum bank angle indicates an angle between the up-down direction of the leaning vehicle body frame and the vehicle up-down direction when the V2X communication antenna-mounted leaning vehicle is viewed in the vehicle forward direction or in the vehicle rearward direction, in a state in which (i) no rider rides on the V2X communication antenna-mounted leaning vehicle, (ii) the V2X communication antenna-mounted leaning vehicle is not running, and (iii) the vehicle in the upright state leans leftward or rightward and a member of the vehicle, which is not a wheel, makes first contact with a horizontal road surface on which the vehicle is grounded. In the present teaching, the vehicle up-down direction is a direction orthogonal to a horizontal road surface on which a vehicle is grounded.

Definitions of Vehicle Up-Down Direction, Vehicle Left-Right Direction, and Vehicle Front-Rear Direction In the present teaching, a vehicle up-down direction is a direction orthogonal to a horizontal road surface on which a vehicle is grounded. In the present teaching, a vehicle left-right direction is a direction orthogonal to a plane which passes through the center in the width direction of a leaning vehicle body frame which is in the upright state and is mounted on a V2X communication antenna-mounted leaning vehicle. A vehicle front-rear direction is orthogonal to both the vehicle up-down direction and the vehicle left-right direction. When the leaning vehicle body frame is in the upright state, the plane passing through the center in the width direction of the leaning vehicle body frame is perpendicular to the horizontal road surface on which the vehicle is grounded.

Definitions of Front Portion and Rear Portion of Vehicle and Definitions of Upper Portion and Lower Portion of Vehicle In the present teaching, a front portion of a vehicle indicates a part which is forward of the center in the vehicle front-rear direction of the vehicle, in the vehicle front-rear direction. A rear portion of a vehicle indicates a part which is rearward of the center in the vehicle front-rear direction of the vehicle, in the vehicle front-rear direction. An upper portion of a vehicle indicates a part which is above the center of the vehicle in the vehicle up-down direction. A lower portion of a vehicle indicates a part which is below the center of the vehicle in the vehicle up-down direction.

Other Definitions

In the present teaching, an end portion of a member indicates a portion constituted by an end and its surroundings of the member.

In the present teaching, a direction along an A direction is not limited to the direction in parallel to the A direction. The direction along the A direction includes a direction which intersects with the A direction at an angle which falls within the range from −45 degrees to 45 degrees. The same definition applies to other expressions using "along". The other expressions using "along" are, for example, "direction along the A direction", "plural B are lined up along the A direction", and "a single B is provided along the A direction". The direction A does not indicate any specific direction. The direction A may be the horizontal direction or the front-rear direction.

In this specification, an expression "a member A is provided forward of a member B" indicates the following state. The member A is provided in front of a plane which passes the front-most end of the member B and is orthogonal to the front-rear direction. In this connection, the members A and B may or may not be lined up in the front-rear direction. This applies to expressions "a member A is provided rearward of a member B", "a member A is provided rightward of a member B", "a member A is provided leftward of a member B", "a member A is provided above a member B", and "a member is provided below a member B".

In the present teaching, an expression "members A and B are lined up in an X direction" indicates the following state. When the members A and B are viewed in a direction orthogonal to the X direction, the members A and B are both provided on a linear line which is parallel to the X direction. In the present teaching, an expression "members A and B are lined up in an X direction when viewed in a Y direction" indicates the following state. When the members A and B are viewed in the Y direction, the members A and B are both provided on a linear line which is parallel to the X direction. In this regard, when the members A and B are viewed in a W direction which is different from the Y direction, the member A or B may not be provided on the linear line which is parallel to the X direction. The members A and B may be in contact with each other. The members A and B may not be in contact with each other. A member C may be provided between the members A and B.

In this specification, an expression "a member A is provided in front of a member B" indicates the following state. The members A and B are lined up in the front-rear direction and a part of the member A, the part facing the member B, is provided forward of the member B. According to this definition, when a part of the front surface of the member B, the part facing the member A, is the front-most end of the member B, the member A is provided forward of the member B. According to the definition, when a part of the front surface of the member B, the part facing the member A, is not the front-most end of the member B, the member A may or may not be provided forward of the member B. This applies to the directions other than the front-rear direction (i.e., applies to the left-right direction and the up or down direction). The front surface of the member B is a surface which is viewable when the member B is viewed from the front side. Depending on the shape of the member B, the front surface of the member B may be formed of plural surfaces, instead of a single continuous surface.

In this specification, an expression "a member A is provided in front of a member B when viewed in a leftward direction or in a rightward direction" indicates the following state. The members A and B are lined up in the front-rear direction when viewed in a leftward direction or in a rightward direction and a part of the member A, the part facing the member B, is provided forward of the member B when viewed in the leftward direction or in the rightward direction. According to this definition, the members A and B may not be lined up in the front-rear direction in three dimensions. This applies to expressions "a member A is provided behind a member B", "a member A is provided to the right of a member B", "a member A is provided to the left of a member B", "a member A is provided directly above a member B", and "a member is provided directly below a member B".

In the present teaching, terms "including", "comprising", "having", and derivatives thereof are used to encompass not only listed items and equivalents thereof but also additional items. The terms "mounted", "connected", and "coupled" are used in broad sense. To be more specific, the terms encompass not only directly mounting, connection, and coupling but also indirect mounting, connection, and coupling. Furthermore, the terms "connected" and "coupled" do not merely indicate physical or mechanical connection and coupling. These terms encompass direct or indirect electric connection and coupling.

Unless otherwise defined, all terms (technical and scientific terms) used in this specification indicate meanings typically understood by a person with ordinary skill in the art in the technical field to which the present teaching belongs.

Terms defined in typical dictionaries indicate meanings used in related technologies and in the context of the present disclosure. The terms are not interpreted ideally or excessively formally.

In this specification, the term "preferable" is non-exclusive. The term "preferable" means "preferable but not limited to". In this specification, an arrangement which is "preferable" exerts at least the above-described effects of the arrangement (1) above. In this specification, the term "may" is non-exclusive. The term "may" indicate "may but not must". In this specification, an arrangement which is explained by using the term "may" exerts at least the above-described effects of the arrangement (1) above.

In the claims, when the number of a constituent feature is not clearly specified and the constituent feature is expressed in a singular form in English, the number of the constituent feature may be more than one in the present teaching. In the present teaching, the number of the constituent features may be only one.

In the present teaching, the arrangements of the above-described different aspects may be variously combined.

Before an embodiment of the present teaching is detailed, it is informed that the present teaching is not limited to the configurations and layout of elements described below and/or shown in drawings. The present teaching may be implemented as another embodiment, or as an embodiment with various changes. Furthermore, the present teaching may be implemented by suitably combining below-described modifications.

Advantageous Effects

A V2X communication antenna-mounted leaning vehicle of the present teaching is able to suppress a difference in transmission and reception performances of V2X communication between a straight-traveling state and a turning state of the leaning vehicle, while suppressing a difference in transmission and reception performances of V2X communication due to different mounting locations of the V2X communication antenna.

BRIEF DESCRIPTION OF DRAWINGS

Each of FIGS. 1A and 1B schematically shows a V2X communication antenna-mounted leaning vehicle of First Embodiment of the present teaching.

Each of FIGS. 2A to 2C schematically shows a vehicle in a straight-traveling state, on which a directional V2X communication antenna is mounted, and a neighboring vehicle on which another V2X communication device is mounted.

Each of FIGS. 3A to 3C schematically shows a vehicle in a right turning state, on which a directional V2X communication antenna is mounted, and a neighboring vehicle on which another V2X communication device is mounted.

Each of FIGS. 13A to 13C shows an example of a radiation pattern of the directional V2X communication antenna mounted on the motorcycle of FIG. 7.

FIG. 19A shows the structure of the directional V2X communication antenna. FIG. 19B shows a radiation pattern on a vehicle-mounted horizontal plane. FIG. 19C is a perspective view of the radiation pattern.

FIG. 20A shows the structure of the directional V2X communication antenna. FIG. 20B shows a radiation pattern on a vehicle-mounted horizontal plane. FIG. 20C is a perspective view of the radiation pattern.

FIG. 21A shows the structure of the directional V2X communication antenna. FIG. 21B shows a radiation pattern on a vehicle-mounted horizontal plane. FIG. 21C is a perspective view of the radiation pattern.

FIG. 22A shows the structure of the directional V2X communication antenna. FIG. 22B shows a radiation pattern on a vehicle-mounted horizontal plane. FIG. 22C is a perspective view of the radiation pattern.

DESCRIPTION OF EMBODIMENTS

First Embodiment

Figure 1B:
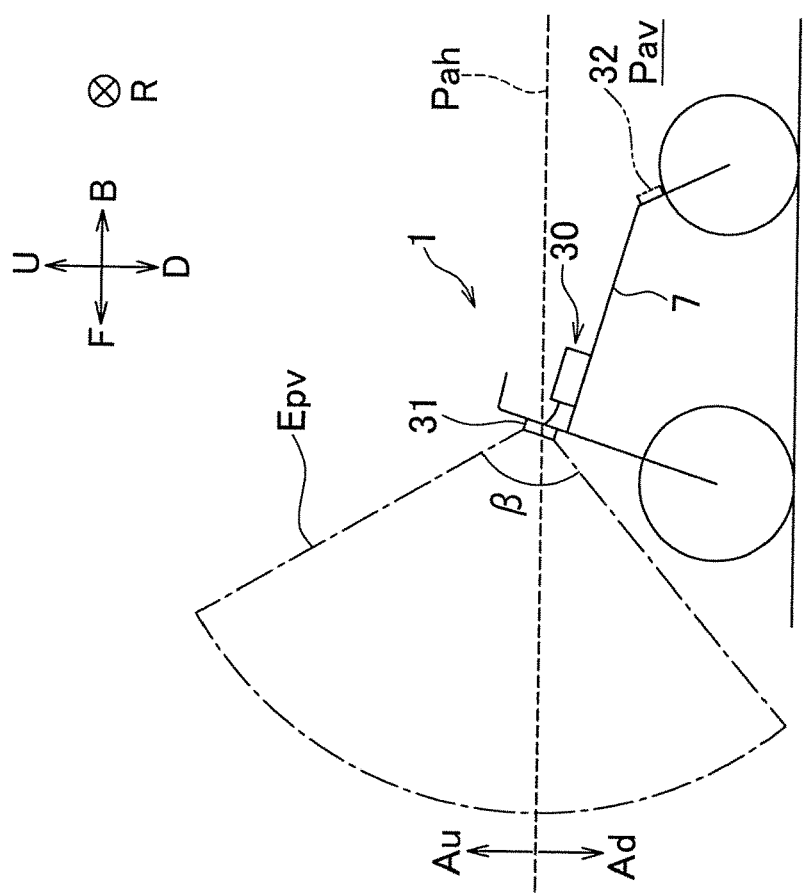
FIG. 1B is a side view in which the V2X communication antenna-mounted leaning vehicle is viewed in the vehicle rightward direction, in which the leaning vehicle body frame is in the upright state.
Figure 1A:
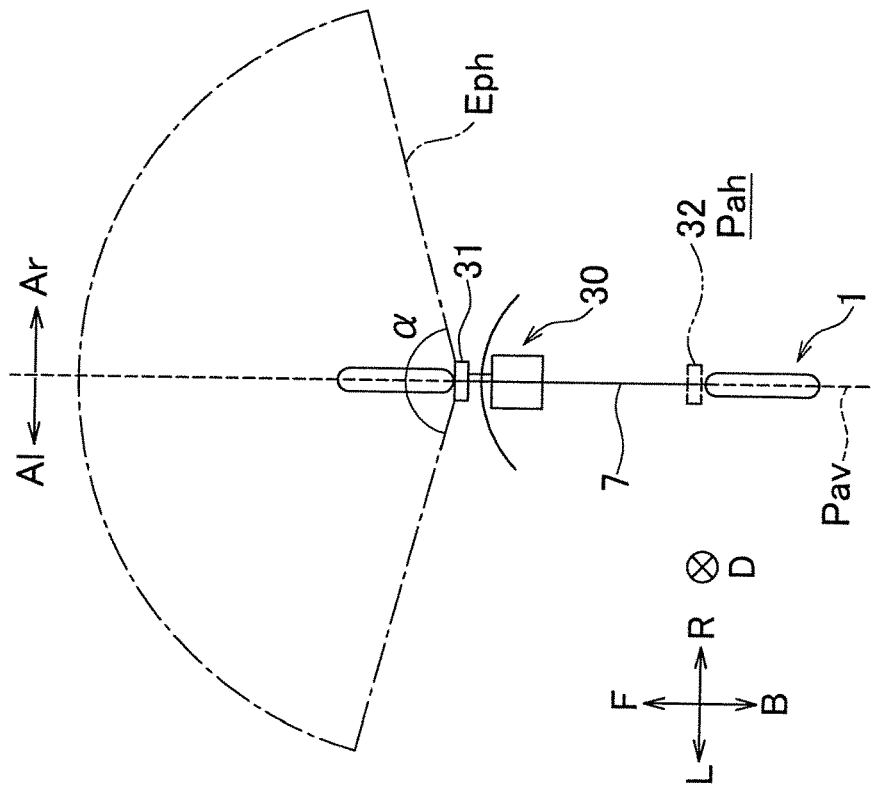
FIG. 1A is a plan view in which the V2X communication antenna-mounted leaning vehicle is viewed in the vehicle downward direction, and the leaning vehicle body frame is in an upright state.

The following will describe a V2X communication antenna-mounted leaning vehicle 1 of First Embodiment of the present teaching with reference to the schematic diagrams in FIGS. 1A and 1B. Arrows U and D in FIG. 1B indicate upward and downward in the vehicle up-down direction, respectively. Arrows F and B in FIGS. 1A and 1B indicate forward and rearward in the vehicle front-rear direction, respectively. Arrows L and R in FIG. 1A indicate leftward and rightward in the vehicle left-right direction, respectively. FIG. 1A is a schematic diagram showing the V2X communication antenna-mounted leaning vehicle 1 in which a leaning vehicle body frame 7 is in an upright state. The vehicle is viewed from the above in the vehicle downward direction. FIG. 1B is a schematic diagram showing the V2X communication antenna-mounted leaning vehicle 1 in which the leaning vehicle body frame 7 is in the upright state. The vehicle is viewed from the left side in the vehicle rightward direction in the figure.

As shown in FIG. 1A and FIG. 1B, the V2X communication antenna-mounted leaning vehicle 1 of the present embodiment includes the leaning vehicle body frame 7, a V2X communication device 30, and a V2X communication antenna 31. The leaning vehicle body frame 7 leans in the vehicle leftward direction when turning left and leans in the vehicle rightward direction when turning right. The V2X communication device 30 is used to perform V2X communication with another V2X communication device which is located around the leaning vehicle body frame 7. In other words, the V2X communication device 30 is used to perform V2X communication with another V2X communication device which is located around the V2X communication antenna-mounted leaning vehicle 1. The V2X communication antenna 31 is electrically connected to the V2X communication device 30. The V2X communication antenna 31 is arranged to lean in the vehicle leftward direction or in the vehicle rightward direction together with the leaning vehicle body frame 7. The V2X communication antenna 31 is provided at a front portion of the vehicle 1. The V2X communication antenna-mounted leaning vehicle 1 may include a V2X communication antenna 32 indicated by a two-dot chain line in FIG. 1. The V2X communication antenna 32 is provided at a rear portion of the vehicle 1.

The V2X communication antenna 31 is a directional V2X communication antenna with directivity. The communication range of the directional V2X communication antenna 31 is, for example, 100 to 500 meters. The directional V2X communication antenna 31 is arranged to have the following three features (I) to (III) when measurement is performed for the antenna 31 that takes a posture of being mounted on the V2X communication antenna-mounted leaning vehicle 1 in which the leaning vehicle body frame 7 is in the upright state but that is not actually mounted on the V2X communication antenna-mounted leaning vehicle 1. When the leaning vehicle body frame 7 is in the upright state, the V2X communication antenna-mounted leaning vehicle 1 is also in the upright state. In other words, when the leaning vehicle body frame 7 is in the upright state, a plane passing through the center in the width direction of the leaning vehicle body frame 7 is perpendicular to the horizontal road surface on which the V2X communication antenna-mounted leaning vehicle 1 is grounded. The V2X communication antenna 32 provided at the rear portion of the vehicle 1 has directivity. The V2X communication antenna 32 is arranged to be similar to the directional V2X communication antenna 31.

The first feature (I) of the directional V2X communication antenna 31 is that the directional V2X communication antenna 31 is arranged so that the 3 dB beam width Eph on a vehicle-mounted horizontal plane Pah of the directional V2X communication antenna 31 is longer than the 3 dB beam width Epv on a vehicle-mounted vertical plane Pav of the directional V2X communication antenna 31. The vehicle-mounted horizontal plane Pah is a horizontal plane passing through the directional V2X communication antenna 31 when the directional V2X communication antenna 31 is in a posture of being mounted on the V2X communication antenna-mounted leaning vehicle 1 in which the leaning vehicle body frame 7 is in the upright state. The vehicle-mounted vertical plane Pav is a plane which passes through the directional V2X communication antenna 31, is perpendicular to the vehicle-mounted horizontal plane Pah, and is parallel to the vehicle front-rear direction (FB direction) when the directional V2X communication antenna 31 is in a posture of being mounted on the V2X communication antenna-mounted leaning vehicle 1 in which the leaning vehicle body frame 7 is in the upright state. In this connection, as shown in FIG. 1A, an angle of the 3 dB beam width Eph on the vehicle-mounted horizontal plane Pah is α[°]. The 3 dB beam width Eph on the vehicle-mounted horizontal plane Pah indicates an angle on the vehicle-mounted horizontal plane Pah, which encompasses a direction at which the radiation strength of an electromagnetic wave radiated from a directional V2X communication antenna 31 has the maximum gain and is between two directions at each of which the radiation strength of the electromagnetic wave is lower by 3 dB than the maximum gain. As shown in FIG. 1B, an angle of the 3 dB beam width Epv on the vehicle-mounted vertical plane Pav is β[°]. The 3 dB beam width Epv on the vehicle-mounted vertical plane Pav indicates an angle on the vehicle-mounted vertical plane Pav, which encompasses a direction at which the radiation strength of an electromagnetic wave radiated from the directional V2X communication antenna 31 has the maximum gain and is between two directions at each of which the radiation strength of the electromagnetic wave is lower by 3 dB than the maximum gain. In short, the V2X communication antenna 31 is arranged so that α is larger than β. It is noted that α and β are any values as long as a is larger than β. α may be, for example, a value equal to or larger than 90 degrees, a value equal to or larger than 100 degrees, a value equal to or larger than 110 degrees, a value equal to or larger than 120 degrees, a value equal to or larger than 130 degrees, a value equal to or larger than 140 degrees, a value equal to or larger than 150 degrees, a value equal to or larger than 160 degrees, a value equal to or larger than 170 degrees, a value equal to or larger than 180 degrees, a value equal to or larger than 190 degrees, a value equal to or larger than 200 degrees, a value equal to or larger than 210 degrees, a value equal to or larger than 220 degrees, a value equal to or larger than 230 degrees, or a value equal to or larger than 240 degrees. β may be, for example, a value equal to or smaller than 110 degrees, a value equal to or smaller than 100 degrees, a value equal to or smaller than 90 degrees, a value equal to or smaller than 80 degrees, a value equal to or smaller than 70 degrees, or a value equal to or smaller than 60 degrees.

The second feature (II) of the directional V2X communication antenna 31 is that the directional V2X communication antenna 31 is arranged so that the 3 dB beam width Epv on the vehicle-mounted vertical plane Pav of the directional V2X communication antenna 31 exists in both a vehicle upper region Au and a vehicle lower region Ad. The vehicle upper region Au is a region which is above (i.e., on the side in the U direction of) the vehicle-mounted horizontal plane Pah in the vehicle up-down direction. The vehicle lower region Ad is a region which is below (i.e., on the side in the D direction of) the vehicle-mounted horizontal plane Pah, in the vehicle up-down direction.

The third feature (III) of the directional V2X communication antenna 31 is that the directional V2X communication antenna 31 is arranged such that the 3 dB beam width Eph on the vehicle-mounted horizontal plane Pah exists both in a vehicle left region Al and a vehicle right region Ar. The vehicle left region Al is a region which is leftward of (i.e., on the side in the L direction of) the vehicle-mounted vertical plane Pav in the vehicle left-right direction. The vehicle right region Ar is a region which is rightward of (i.e., on the side in the R direction of) the vehicle-mounted vertical plane Pav in the vehicle left-right direction.

The directional V2X communication antenna 31 is preferably arranged such that, in regard to the 3 dB beam width Eph on the vehicle-mounted horizontal plane Pah, a difference between the 3 dB beam width in the vehicle left region Al and the 3 dB beam width in the vehicle right region Ar is equal to or smaller than 10 degrees.

The V2X communication antenna 32 provided at the rear portion of the vehicle 1 is arranged to be similar to the V2X communication antenna 31. On this account, the directional V2X communication antenna 32 is arranged to have the above-described three features (I) to (III) when measurement is performed for the antenna 32 that takes a posture of being mounted on the V2X communication antenna-mounted leaning vehicle 1 in which the leaning vehicle body frame 7 is in the upright state but that is not actually mounted on the V2X communication antenna-mounted leaning vehicle 1.

The V2X communication device 30 performs the V2X communication at least while the leaning vehicle body frame 7 is turning left and leans in the vehicle leftward direction and while the leaning vehicle body frame 7 is turning right and leans vehicle rightward direction. The V2X communication device 30 performs the V2X communication while the leaning vehicle body frame 7 is in the upright state, too.

Because of the arrangements above, the V2X communication antenna-mounted leaning vehicle 1 of First Embodiment exerts the following effects.

The V2X communication antenna-mounted leaning vehicle 1 of First Embodiment includes the V2X communication antenna 31 or the V2X communication antenna 32 which is arranged to lean in the vehicle leftward direction or in the vehicle rightward direction together with the leaning vehicle body frame. On this account, the V2X communication antenna 31, 32 mounted on the V2X communication antenna-mounted leaning vehicle 1 is the directional V2X communication antenna 31, 32 with directivity. It is therefore possible to design the 3 dB beam width of the directional V2X communication antenna 31, 32, with intension. The directional V2X communication antenna 31, 32 is arranged to have the above-described three features (I) to (III) when measurement is performed for the antenna 31, 32 that takes a posture of being mounted on the V2X communication antenna-mounted leaning vehicle 1 in which the leaning vehicle body frame 7 is in the upright state but that is not actually mounted on the V2X communication antenna-mounted leaning vehicle 1.

Effects which are attained because the directional V2X communication antenna 31 is arranged as described above will be described with reference to Specific Example of FIG. 2. In FIG. 2, a leaning vehicle 1 is a V2X communication antenna-mounted leaning vehicle in which the directional V2X communication antenna 31 of First Embodiment is mounted on a front portion of the vehicle 1. A vehicle 501 is a leaning vehicle in which a V2X communication antenna having different radiation characteristics from the V2X communication antenna 31 of First Embodiment is mounted on a front portion of the vehicle 501. A vehicle 502 is a vehicle which is located around the leaning vehicle 1, 501 and includes another V2X communication device. The another V2X communication device mounted on the vehicle 502 is not illustrated. A road 510 is a linear road, whereas a road 511 is a road curved rightward in the vehicle left-right direction. A vehicle runs in the straight-traveling state on the road 510 and runs in the right turning state on the road 511.

Figure 2B:
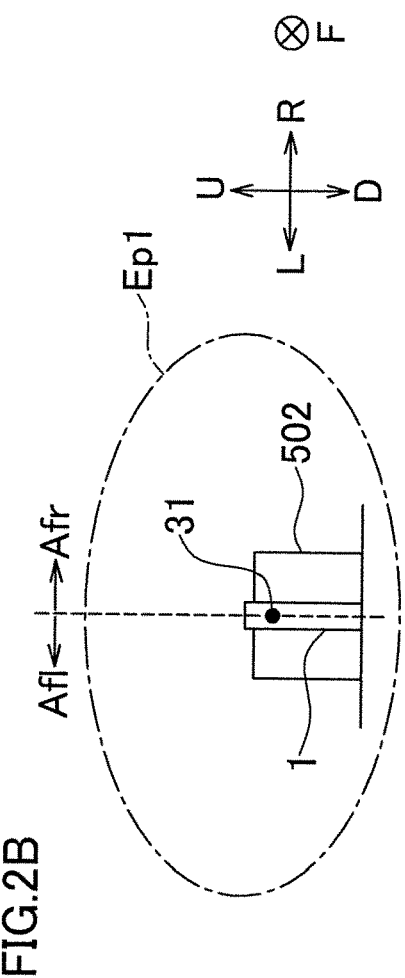
FIG. 2B is a front view in the vehicle forward direction of the vehicle on which the directional V2X communication antenna is mounted, when the vehicle is the V2X communication antenna-mounted leaning vehicle of First Embodiment.
Figure 2C:
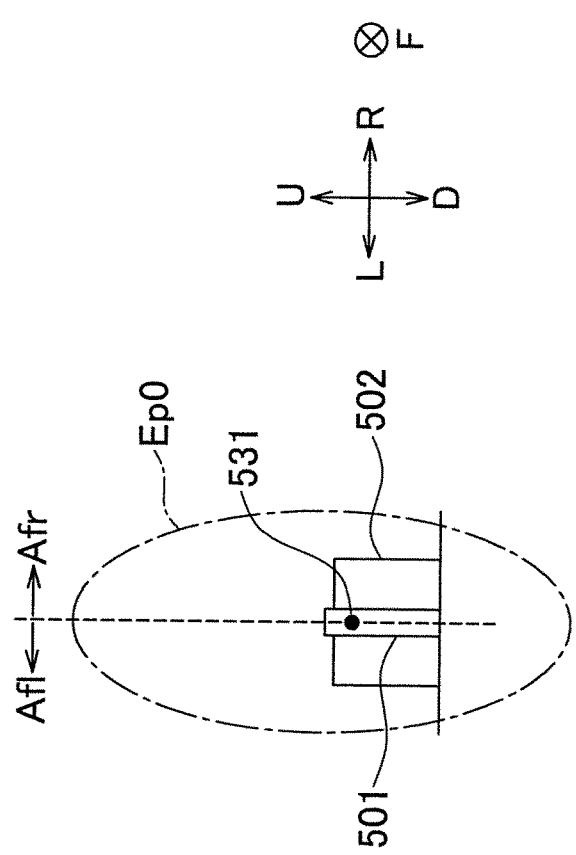
FIG. 2C is a front view in the vehicle forward direction of the vehicle on which the directional V2X communication antenna is mounted, when the vehicle is a leaning vehicle on which a directional V2X communication antenna having different radiation characteristics from the directional V2X communication antenna of First Embodiment is mounted.
Figure 2A:
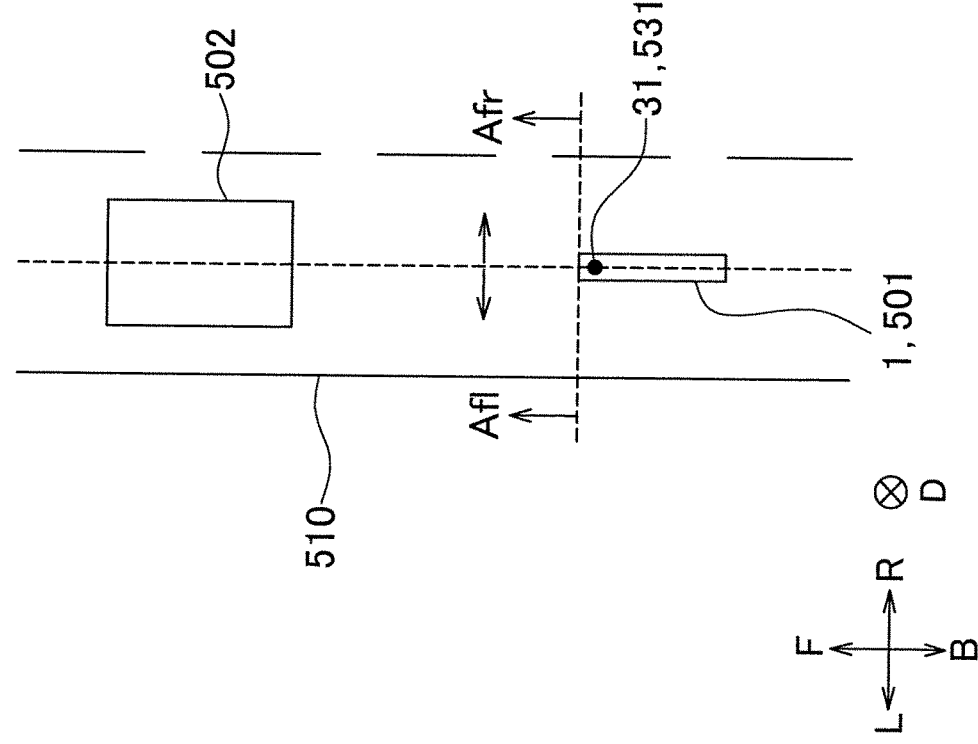
FIG. 2A is a plan view in which the vehicle is viewed in the vehicle downward direction.
Figure 3B:
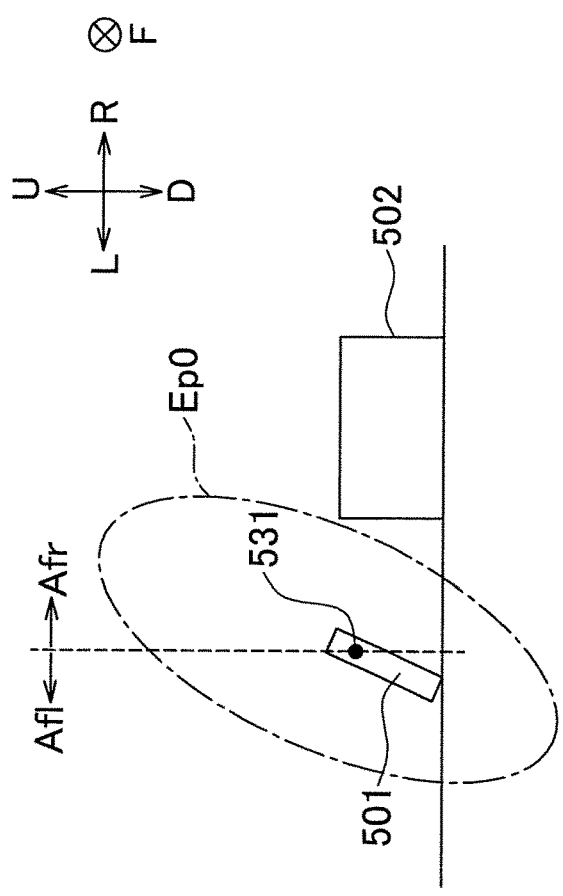
FIG. 3B is a front view in the vehicle forward direction of the vehicle on which the directional V2X communication antenna is mounted, when the vehicle is the V2X communication antenna-mounted leaning vehicle of First Embodiment.
Figure 3A:
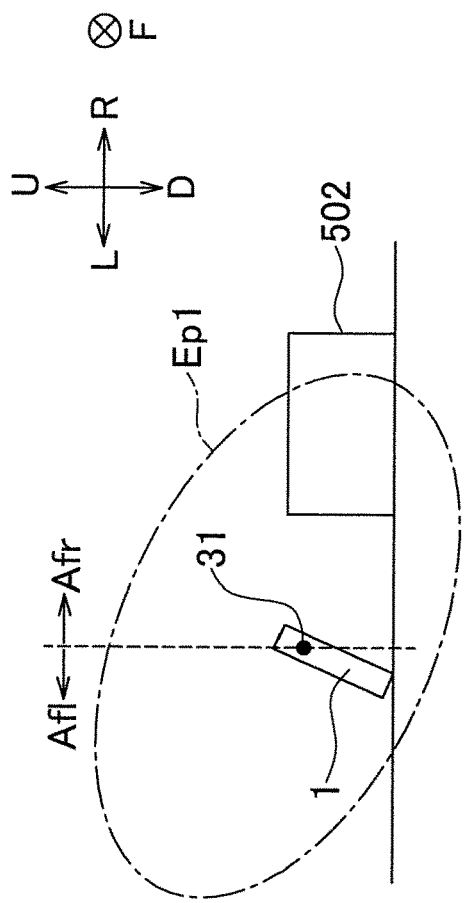
FIG. 3A is a plan view in which the vehicle is viewed in the vehicle downward direction.
Figure 3C:
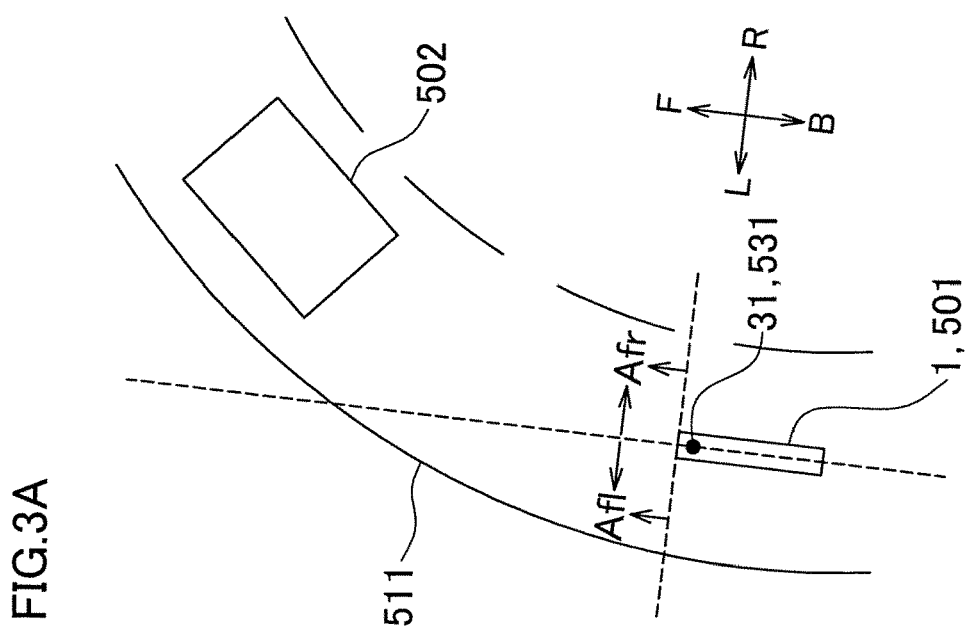
FIG. 3C is a front view in the vehicle forward direction of the vehicle on which the directional V2X communication antenna is mounted, when the vehicle is a leaning vehicle on which a directional V2X communication antenna having different radiation characteristics from the directional V2X communication antenna of First Embodiment is mounted.

The vehicle 502 which is in front of the leaning vehicle 1, 501 as shown in FIG. 2A when the leaning vehicle is in the straight-traveling state and includes the another V2X communication device moves, when the leaning vehicle is in the right turning state, rightward in the vehicle left-right direction as compared to the leaning vehicle 1, 501 and is located in a vehicle forward rightward region Afr which is forward and rightward of the leaning vehicle 1, 501 in the vehicle front-rear direction and in the vehicle left-right direction as shown in FIG. 3A. In this regard, a vehicle forward leftward region Afl is a region in the vehicle left region Al and is forward of (on the side in the F direction of) the leaning vehicle 1, 501 in the vehicle front-rear direction. Meanwhile, the vehicle forward rightward region Afr is a region in the vehicle right region Ar and is forward of (on the side in the F direction of) the leaning vehicle 1, 501 in the vehicle front-rear direction. FIG. 2B shows a 3 dB beam width Ep1 of the V2X communication antenna-mounted leaning vehicle 1 of First Embodiment in the straight-traveling state. FIG. 2C shows a 3 dB beam width Ep0 of the leaning vehicle 501 in the straight-traveling state. FIG. 3B shows the 3 dB beam width Ep1 of the V2X communication antenna-mounted leaning vehicle 1 of First Embodiment in the right turning state. FIG. 3C shows the 3 dB beam width Ep0 of the leaning vehicle 501 in the right turning state.

As shown in FIG. 2B and FIG. 3B, the 3 dB beam width Ep1 of the V2X communication antenna-mounted leaning vehicle 1 in which the directional V2X communication antenna 31 of First Embodiment is mounted on the front portion of the vehicle 1 has radiation characteristics which are relatively wide in the vehicle forward rightward region Mr. On this account, in the V2X communication antenna-mounted leaning vehicle 1 in which the directional V2X communication antenna 31 of First Embodiment is mounted on the front portion of the vehicle 1, the vehicle 502 on which the another V2X communication device is mounted is in the 3 dB beam width Ep1 of the vehicle 1, both in the straight-traveling state and in the right turning state.

Meanwhile, as shown in FIG. 2C and FIG. 3C, the 3 dB beam width Ep0 of the leaning vehicle 501 in which a V2X communication antenna having different radiation characteristics from the directional V2X communication antenna 31 of First Embodiment is mounted on the front portion of the vehicle 501 has radiation characteristics which are relatively narrow in the vehicle forward rightward region Mr. On this account, the leaning vehicle 501 in which a V2X communication antenna having different radiation characteristics from the directional V2X communication antenna 31 of First Embodiment is mounted on the front portion of the vehicle 501 is arranged so that, when the vehicle 501 is in the straight-traveling state, the vehicle 502 having the another V2X communication device is in the 3 dB beam width Ep0 of the vehicle 501, but when the vehicle 501 is in the right turning state, the vehicle 502 having the another V2X communication device is not in the 3 dB beam width Ep0 of the vehicle 501.

Because the directional V2X communication antenna 31 is arranged in this manner, the leaning vehicle 1 in which the directional V2X communication antenna 31 is mounted on the front portion of the vehicle 1 is able to achieve sufficient radiation characteristics in the vehicle forward rightward region Afr, when in the right turning state. Therefore, when the directional V2X communication antenna 31 arranged as described above is mounted on the front portion of the vehicle 1, the V2X communication antenna-mounted leaning vehicle 1 is able to suppress deterioration of the transmission and reception performances of the V2X communication with the vehicle 502 having the another V2X communication device in the vehicle forward rightward region Afr when the leaning vehicle 1 is in the right turning state, as compared to the transmission and reception performances of the leaning vehicle 1 in the straight-traveling state.

Similarly, when the V2X communication antenna-mounted leaning vehicle 1 is in the left turning state, a vehicle which is in front of the V2X communication antenna-mounted leaning vehicle 1 in the straight-traveling state and has another V2X communication device tends to move in the vehicle leftward direction as compared to the V2X communication antenna-mounted leaning vehicle 1 and to be located in a vehicle forward leftward region which is forward of and leftward of the V2X communication antenna-mounted leaning vehicle 1 in the vehicle front-rear direction and in the vehicle left-right direction. Because the directional V2X communication antenna 31 of First Embodiment is arranged in this manner, the V2X communication antenna-mounted leaning vehicle 1 in which the directional V2X communication antenna 31 is mounted on the front portion of the vehicle 1 is able to achieve sufficient radiation characteristics in the vehicle forward leftward region Afl, when the leaning vehicle is in the left turning state. Therefore, when the directional V2X communication antenna 31 arranged as described above is mounted on the front portion of the vehicle 1, the V2X communication antenna-mounted leaning vehicle 1 is able to suppress deterioration of the transmission and reception performances of the V2X communication with the vehicle having the another V2X communication device in the vehicle forward leftward region Afl when the leaning vehicle 1 is in the left turning state, as compared to the transmission and reception performances of the leaning vehicle 1 in the straight-traveling state.

Similarly, when the V2X communication antenna-mounted leaning vehicle 1 is in the left turning state, a vehicle which is behind the V2X communication antenna-mounted leaning vehicle 1 in the straight-traveling state and has another V2X communication device tends to move in the vehicle leftward direction as compared to the V2X communication antenna-mounted leaning vehicle 1 and to be located in a vehicle rearward leftward region which is rearward of and leftward of the V2X communication antenna-mounted leaning vehicle 1 in the vehicle front-rear direction and in the vehicle left-right direction. Because the directional V2X communication antenna 32 is arranged in this manner, the V2X communication antenna-mounted leaning vehicle 1 in which the directional V2X communication antenna 32 is mounted on the rear portion of the vehicle 1 is able to achieve sufficient radiation characteristics in the vehicle rearward leftward region, when the leaning vehicle is in the left turning state. Therefore, when the directional V2X communication antenna 32 arranged as described above is mounted on the rear portion of the vehicle 1, the V2X communication antenna-mounted leaning vehicle 1 is able to suppress deterioration of the transmission and reception performances of the V2X communication with the vehicle having the another V2X communication device in the vehicle rearward leftward region when the leaning vehicle 1 is in the left turning state, as compared to the transmission and reception performances of the leaning vehicle 1 in the straight-traveling state.

Similarly, when the V2X communication antenna-mounted leaning vehicle 1 is in the right turning state, a vehicle which is behind the V2X communication antenna-mounted leaning vehicle 1 in the straight-traveling state and has another V2X communication device tends to move in the vehicle rightward direction as compared to the V2X communication antenna-mounted leaning vehicle 1 and to be located in a vehicle rearward rightward region which is rearward of and rightward of the V2X communication antenna-mounted leaning vehicle 1 in the vehicle front-rear direction and in the vehicle left-right direction. Because the directional V2X communication antenna 32 is arranged in this manner, the V2X communication antenna-mounted leaning vehicle 1 in which the directional V2X communication antenna 32 is mounted on the rear portion of the vehicle 1 is able to achieve sufficient radiation characteristics in the vehicle rearward rightward region, when the leaning vehicle is in the right turning state. Therefore, when the directional V2X communication antenna 32 arranged as described above is mounted on the rear portion of the vehicle 1, the V2X communication antenna-mounted leaning vehicle 1 is able to suppress deterioration of the transmission and reception performances of the V2X communication with the vehicle having the another V2X communication device in the vehicle rearward rightward region when the leaning vehicle 1 is in the right turning state, as compared to the transmission and reception performances of the leaning vehicle 1 in the straight-traveling state.

In this way, the V2X communication antenna-mounted leaning vehicle 1 of the present teaching is able to suppress a difference in transmission and reception performances of V2X communication between the straight-traveling state and the turning state of the leaning vehicle 1, while suppressing a difference in transmission and reception performances of V2X communication due to different mounting locations of the V2X communication antenna 31, 32.

Second Embodiment

Figure 4:
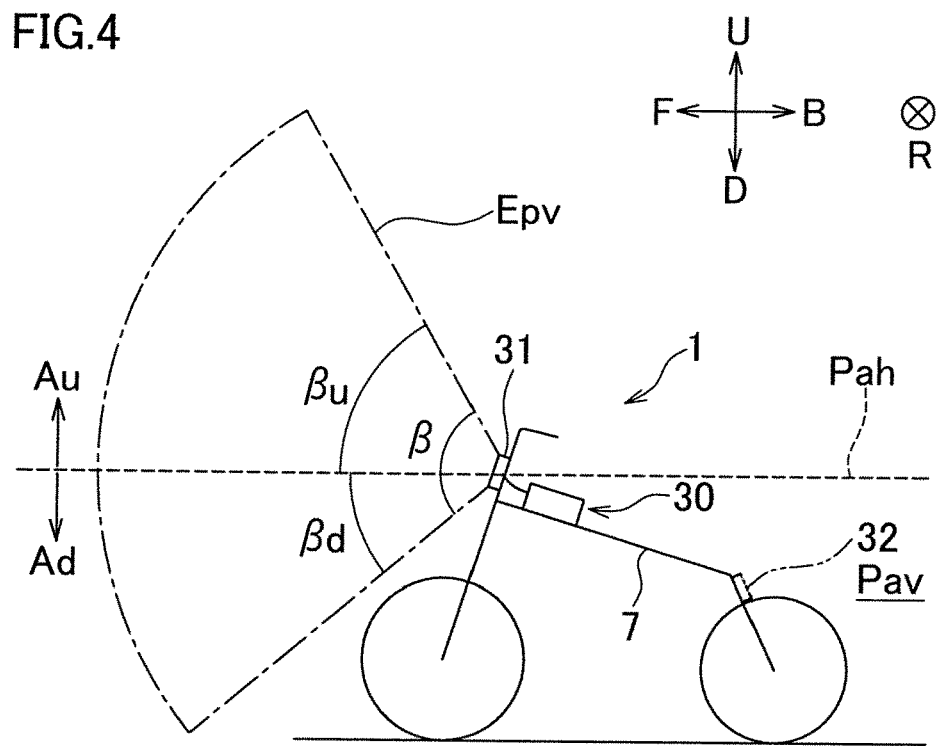
FIG. 4 schematically shows a V2X communication antenna-mounted leaning vehicle of Second Embodiment of the present teaching, and is a side view in which the vehicle is viewed in the vehicle rightward direction.
Figure 5A:
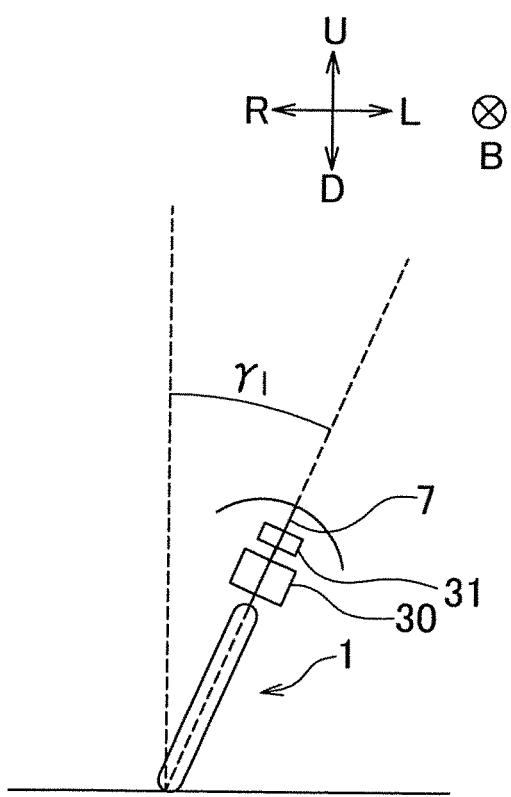
FIGS. 5A and 5B schematically show a V2X communication antenna-mounted leaning vehicle of Second Embodiment, and is a side view in which the vehicle is viewed in the vehicle rearward direction.
Figure 5B:
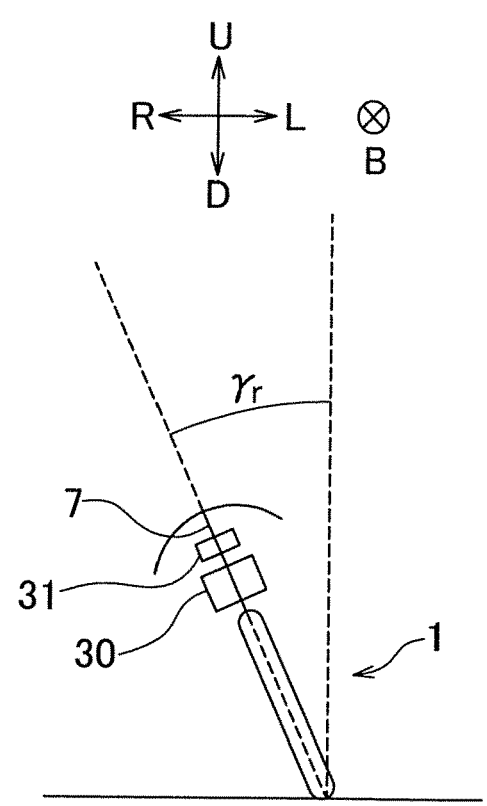
Figure 6:
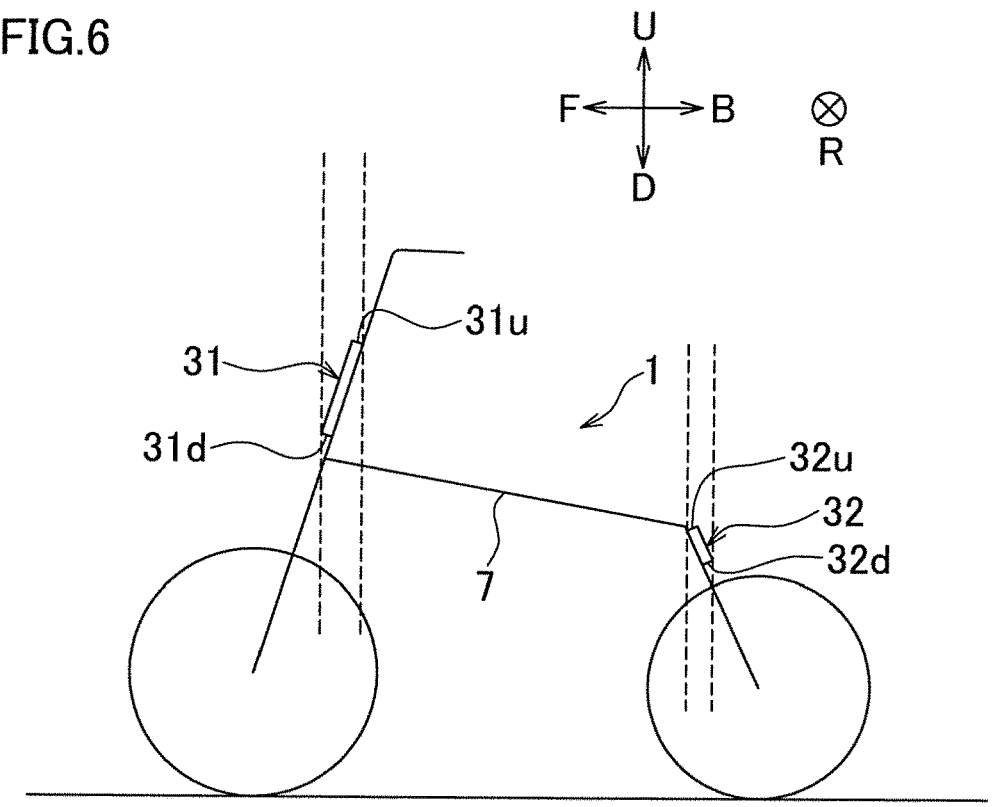
FIG. 6 schematically shows a directional V2X communication antenna of the V2X communication antenna-mounted leaning vehicle of Second Embodiment of the present teaching, and is a partial side view in which the vehicle is viewed in the vehicle rightward direction.

The following will describe a V2X communication antenna-mounted leaning vehicle 1 of Second Embodiment of the present teaching with reference to the schematic diagrams in FIG. 4 to FIG. 6. The V2X communication antenna-mounted leaning vehicle 1 of Second Embodiment encompasses all features of the V2X communication antenna-mounted leaning vehicle 1 of First Embodiment.

A directional V2X communication antenna 31 of the V2X communication antenna-mounted leaning vehicle 1 of Second Embodiment is arranged to have three features (IV), (V), and (VI) described below, in addition to the three features (I) to (III) of the directional V2X communication antenna 31 of First Embodiment, when measurement is performed for the antenna 31 that takes a posture of being mounted on the V2X communication antenna-mounted leaning vehicle 1 in which the leaning vehicle body frame 7 is in the upright state but that is not actually mounted on the V2X communication antenna-mounted leaning vehicle 1. The V2X communication antenna-mounted leaning vehicle 1 of Second Embodiment may include a V2X communication antenna 32 provided at a rear portion of the vehicle 1. The V2X communication antenna 32 is arranged to be similar to the V2X communication antenna 31 provided at the front portion of the vehicle 1.

The first feature (IV) which is an additional feature of the directional V2X communication antenna 31 is described below. The directional V2X communication antenna 31 is arranged such that, among the 3 dB beam width Epv on the vehicle-mounted vertical plane Pav, a 3 dB beam width in the vehicle upper region Au is larger than a 3 dB beam width in the vehicle lower region Ad among the 3 dB beam width on the vehicle-mounted vertical plane Pav. As shown in FIG. 4, the size of the 3 dB beam width Epv on the vehicle-mounted vertical plane Pav is β[°]. Among the 3 dB beam width Epv on the vehicle-mounted vertical plane Pav, the size of the 3 dB beam width in the vehicle upper region Au is βu[°]. Among the 3 dB beam width Epv on the vehicle-mounted vertical plane Pav, the size of the 3 dB beam width in the vehicle lower region Ad is βd[°]. β is therefore equal to βu+βd. When the directional V2X communication antenna 31 takes a posture of being mounted on the V2X communication antenna-mounted leaning vehicle 1 in which the leaning vehicle body frame 7 is in the upright state but is not actually mounted on the V2X communication antenna-mounted leaning vehicle 1, a measurement result of this directional V2X communication antenna 31 is βu>βd.

The second feature (V) which is an additional feature of the directional V2X communication antenna 31 is described below. The directional V2X communication antenna 31 is arranged so that the 3 dB beam width Eph on the vehicle-mounted horizontal plane Pah is larger than a total maximum bank angle which is the sum total of a left maximum bank angle ad a right maximum bank angle. As shown in FIG. 1A, an angle of the 3 dB beam width Eph on the vehicle-mounted horizontal plane Pah is α[°]. As shown in FIG. 5A, the left maximum bank angle γl[°] is an angle between the up-down direction of a leaning vehicle body frame 7 which maximally leans in the vehicle leftward direction when turning left and the vehicle up-down direction, when the V2X communication antenna-mounted leaning vehicle 1 is viewed in the vehicle forward direction or in the vehicle rearward direction. As shown in FIG. 5B, the right maximum bank angle γr[°] is an angle between the up-down direction of a leaning vehicle body frame 7 which maximally leans in the vehicle rightward direction when turning right and the vehicle up-down direction, when the V2X communication antenna-mounted leaning vehicle 1 is viewed in the vehicle forward direction or in the vehicle rearward direction. The left maximum bank angle γl and the right maximum bank angle γr are different between types of vehicles. Each of the left maximum bank angle γl and the right maximum bank angle γr is, for example, 40 degrees. A state in which the leaning vehicle body frame 7 maximally leans in the vehicle leftward direction when turning left indicates that the V2X communication antenna-mounted leaning vehicle 1 is able to maximally lean in the vehicle leftward direction when turning left. A state in which the leaning vehicle body frame 7 maximally leans in the vehicle rightward direction when turning right indicates that the V2X communication antenna-mounted leaning vehicle 1 is able to maximally lean in the vehicle rightward direction when turning right. The total maximum bank angle is therefore γl+γr=γ[°]. When measurement is performed for the directional V2X communication antenna 31 that takes a posture of being mounted on the V2X communication antenna-mounted leaning vehicle 1 in which the leaning vehicle body frame 7 is in the upright state but that is not actually mounted on the V2X communication antenna-mounted leaning vehicle 1, a measurement result of this directional V2X communication antenna 31 is α>γ.

The third feature (VI) which is an additional feature of the directional V2X communication antenna 31 is described below. The directional V2X communication antenna 31 is arranged so that the 3 dB beam width Epv on the vehicle-mounted vertical plane Pav is larger than a half of a total maximum bank angle which is the sum total of a left maximum bank angle and a right maximum bank angle. As shown in FIG. 1B, the size of the 3 dB beam width Epv on the vehicle-mounted vertical plane Pav is β[°]. When measurement is performed for the directional V2X communication antenna 31 that takes a posture of being mounted on the V2X communication antenna-mounted leaning vehicle 1 in which the leaning vehicle body frame 7 is in the upright state but that is not actually mounted on the V2X communication antenna-mounted leaning vehicle 1, a measurement result of this directional V2X communication antenna 31 is β>γ/2.

As shown in FIG. 6, the directional V2X communication antenna 31 provided at the front portion of the vehicle 1 is arranged such that, when the V2X communication antenna-mounted leaning vehicle 1 in which the leaning vehicle body frame 7 is in the upright state is viewed in the vehicle leftward direction or in the vehicle rightward direction, an upper end 31*u* of a substrate constituting the directional V2X communication antenna 31 is rearward of a lower end 31*d* of the substrate constituting the directional V2X communication antenna 31 in the vehicle front-rear direction. In FIG. 6, the substrate constituting the directional V2X communication antenna 31 is schematically shown. The directional V2X communication antenna 32 provided at the rear portion of the vehicle 1 is arranged such that, when a V2X communication antenna-mounted leaning vehicle 1 which takes the same posture as the V2X communication antenna-mounted leaning vehicle 1 in which the leaning vehicle body frame 7 is in the upright state is viewed in the vehicle leftward direction or in the vehicle rightward direction, an upper end 32*u* of a substrate constituting the directional V2X communication antenna 32 is forward of a lower end 32*d* of the substrate constituting the directional V2X communication antenna 32 in the vehicle front-rear direction. When the V2X communication antenna-mounted leaning vehicle 1 in which the leaning vehicle body frame 7 is in the upright state is viewed in the vehicle leftward direction or in the vehicle rightward direction, an angle formed between the vehicle up-down direction and a linear line passing through the upper end 31*u* and the lower end 31*d* of the directional V2X communication antenna 31 is any angle as long as the angle is smaller than 90 degrees (preferably smaller than 45 degrees).

Because of this structure, the V2X communication antenna-mounted leaning vehicle 1 of Second Embodiment exerts the following effects in addition to the effects of the V2X communication antenna-mounted leaning vehicle 1 of First Embodiment.

When measurement is performed for the directional V2X communication antenna 31 of Second Embodiment that takes a posture of being mounted on the V2X communication antenna-mounted leaning vehicle 1 in which the leaning vehicle body frame 7 is in the upright state but that is not actually mounted on the V2X communication antenna-mounted leaning vehicle 1, the directional V2X communication antenna 31 is arranged such that, in the 3 dB beam width Epv on the vehicle-mounted vertical plane Pav, the size βu of a 3 dB beam width existing in the vehicle upper region Au is larger than the size βd of a 3 dB beam width existing in the vehicle lower region Ad. In other words, the directional V2X communication antenna 31 of Second Embodiment has the additional feature (IV). The V2X communication antenna 32 provided at the rear portion of the vehicle 1 is arranged to be similar to the V2X communication antenna 31 provided at the front portion of the vehicle 1.

When the V2X communication antenna-mounted leaning vehicle 1 in which the directional V2X communication antenna 31 is mounted on the front portion of the vehicle 1 is in the left turning state, the directional V2X communication antenna 31 leans in the vehicle leftward direction, too. For this reason, the height from the road surface on which the V2X communication antenna-mounted leaning vehicle 1 is grounded to the directional V2X communication antenna 31 is low in the left turning state, as compared to the straight-traveling state. In other words, an electromagnetic wave which is radiated from the directional V2X communication antenna to the vehicle upper region Au in the vehicle forward leftward region Afl when the V2X communication antenna-mounted leaning vehicle 1 is in the straight-traveling state is radiated to a location closer to the road surface when the vehicle 1 is in the left turning state. Because the directional V2X communication antenna 31 is arranged to have the above-described feature (IV), the V2X communication antenna-mounted leaning vehicle 1 in which the directional V2X communication antenna 31 is mounted on the front portion of the vehicle 1 is able to achieve more sufficient radiation characteristics in the vehicle forward leftward region Afl, when in the left turning state. Therefore, when the directional V2X communication antenna 31 arranged as described above is mounted on the front portion of the vehicle 1, the V2X communication antenna-mounted leaning vehicle 1 is able to further suppress deterioration of the transmission and reception performances of the V2X communication with another V2X communication device in the vehicle forward leftward region Afl when the leaning vehicle 1 is in the left turning state, as compared to the transmission and reception performances of the leaning vehicle 1 in the straight-traveling state.

When the V2X communication antenna-mounted leaning vehicle 1 in which the directional V2X communication antenna 31 is mounted on the front portion of the vehicle 1 is in the right turning state, the directional V2X communication antenna 31 leans in the vehicle rightward direction, too. For this reason, the height from the road surface on which the V2X communication antenna-mounted leaning vehicle 1 is grounded to the directional V2X communication antenna 31 is low in the right turning state, as compared to the straight-traveling state. In other words, an electromagnetic wave which is radiated from the directional V2X communication antenna 31 to the vehicle upper region Au in the vehicle forward rightward region Afr when the V2X communication antenna-mounted leaning vehicle 1 is in the straight-traveling state is radiated to a location closer to the road surface when the vehicle 1 is in the right turning state. Because the directional V2X communication antenna 31 is arranged to have the above-described feature (IV), the to-vehicle communication antenna-mounted leaning vehicle 1 in which the directional V2X communication antenna 31 is mounted on the front portion of the vehicle 1 is able to achieve more sufficient radiation characteristics in the vehicle forward rightward region Afr, when in the right turning state. Therefore, when the directional V2X communication antenna 31 arranged as described above is mounted on the front portion of the vehicle 1, the V2X communication antenna-mounted leaning vehicle 1 is able to further suppress deterioration of the transmission and reception performances of the V2X communication with the vehicle having the another V2X communication device in the vehicle forward rightward region Afr when the leaning vehicle 1 is in the right turning state, as compared to the transmission and reception performances of the leaning vehicle 1 in the straight-traveling state.

When the V2X communication antenna-mounted leaning vehicle 1 in which the directional V2X communication antenna 32 is mounted on the rear portion of the vehicle 1 is in the left turning state, the directional V2X communication antenna 32 leans in the vehicle leftward direction, too. For this reason, the height from the road surface on which the V2X communication antenna-mounted leaning vehicle 1 is grounded to the directional V2X communication antenna 32 is low in the left turning state, as compared to the straight-traveling state. In other words, an electromagnetic wave which is radiated from the directional V2X communication antenna 32 to the vehicle upper region Au in the vehicle rearward leftward region when the V2X communication antenna-mounted leaning vehicle 1 is in the straight-traveling state is radiated to a location closer to the road surface when the vehicle 1 is in the left turning state. Because the directional V2X communication antenna 32 is arranged to have the above-described feature (IV), the V2X communication antenna-mounted leaning vehicle 1 in which the directional V2X communication antenna 32 is mounted on the rear portion of the vehicle 1 is able to achieve more sufficient radiation characteristics in the vehicle rearward leftward region, when the vehicle 1 is in the left turning state. Therefore, when the directional V2X communication antenna 32 arranged as described above is mounted on the rear portion of the vehicle 1, the V2X communication antenna-mounted leaning vehicle 1 is able to further suppress deterioration of the transmission and reception performances of the V2X communication with another V2X communication device in the vehicle rearward leftward region when the leaning vehicle 1 is in the left turning state, as compared to the transmission and reception performances of the leaning vehicle 1 in the straight-traveling state.

When the V2X communication antenna-mounted leaning vehicle 1 in which the directional V2X communication antenna 32 is mounted on the rear portion of the vehicle 1 is in the right turning state, the directional V2X communication antenna 32 leans in the vehicle rightward direction, too. For this reason, the height from the road surface on which the V2X communication antenna-mounted leaning vehicle 1 is grounded to the directional V2X communication antenna 32 is low in the right turning state, as compared to the straight-traveling state. In other words, an electromagnetic wave which is radiated from the directional V2X communication antenna 32 to the vehicle upper region Au in the vehicle rearward rightward region when the V2X communication antenna-mounted leaning vehicle 1 is in the straight-traveling state is radiated to a location closer to the road surface when the vehicle 1 is in the right turning state.

Because the directional V2X communication antenna 32 is arranged to have the above-described feature (IV), the V2X communication antenna-mounted leaning vehicle 1 in which the directional V2X communication antenna 32 is mounted on the rear portion of the vehicle 1 is able to achieve more sufficient radiation characteristics in the vehicle forward rightward region, when the vehicle 1 is in the right turning state. Therefore, when the directional V2X communication antenna 32 arranged as described above is mounted on the rear portion of the vehicle 1, the V2X communication antenna-mounted leaning vehicle 1 is able to further suppress deterioration of the transmission and reception performances of the V2X communication with the vehicle having the another V2X communication device in the vehicle rearward rightward region when the leaning vehicle 1 is in the right turning state, as compared to the transmission and reception performances of the leaning vehicle 1 in the straight-traveling state.

When measurement is performed for the directional V2X communication antenna 31 of Second Embodiment that takes a posture of being mounted on the V2X communication antenna-mounted leaning vehicle 1 in which the leaning vehicle body frame 7 is in the upright state but that is not actually mounted on the V2X communication antenna-mounted leaning vehicle 1, the size $\alpha$ of the 3 dB beam width Eph on the vehicle-mounted horizontal plane Pah is arranged to be larger than the total maximum bank angle $\gamma$. In other words, the directional V2X communication antenna 31 of Second Embodiment has the additional feature (V). It is therefore possible to design the size $\alpha$ of the 3 dB beam width Eph on the vehicle-mounted horizontal plane Pah of the directional V2X communication antenna 31 in accordance with the total maximum bank angle $\gamma$. The V2X communication antenna 32 provided at the rear portion of the vehicle is arranged to be similar to the V2X communication antenna 31 provided at the front portion of the vehicle.

When the V2X communication antenna-mounted leaning vehicle 1 is in a left turning state in which the vehicle turns left with the left maximum bank angle, the turning radius is short. For this reason, when the V2X communication antenna-mounted leaning vehicle 1 is in such a left turning state, a vehicle which has another V2X communication device and is located in front of the V2X communication antenna-mounted leaning vehicle 1 in which the directional V2X communication antenna 31 is mounted on the front portion, when the vehicle 1 is in the straight-traveling state, moves more in the vehicle leftward direction as compared to the V2X communication antenna-mounted leaning vehicle 1. Because the directional V2X communication antenna 31 is arranged to have the above-described feature (IV), the V2X communication antenna-mounted leaning vehicle 1 in which the directional V2X communication antenna 31 is mounted on the front portion of the vehicle 1 is able to achieve more sufficient radiation characteristics in the vehicle forward leftward region, when in the left turning state. Therefore, when the directional V2X communication antenna 31 arranged as described above is mounted on the front portion of the vehicle 1, the V2X communication antenna-mounted leaning vehicle 1 is able to further suppress deterioration of the transmission and reception performances of the V2X communication with another V2X communication device in the vehicle forward leftward region when the leaning vehicle 1 is in the left turning state, as compared to as compared to the transmission and reception performances of the leaning vehicle 1 in the straight-traveling state.

When the V2X communication antenna-mounted leaning vehicle 1 is in a right turning state in which the vehicle turns right with the right maximum bank angle, the turning radius is short. For this reason, when the V2X communication antenna-mounted leaning vehicle 1 is in such a right turning state, a vehicle which has another V2X communication device and is located in front of the V2X communication antenna-mounted leaning vehicle 1 in which the directional V2X communication antenna 31 is mounted on the front portion, when the vehicle 1 is in the straight-traveling state, moves more in the vehicle rightward direction as compared to the V2X communication antenna-mounted leaning vehicle 1. Because the directional V2X communication antenna 31 is arranged to have the above-described feature (V), the V2X communication antenna-mounted leaning vehicle 1 in which the directional V2X communication antenna 31 is mounted on the front portion of the vehicle 1 is able to achieve more sufficient radiation characteristics in the vehicle forward rightward region, when in the right turning state. Therefore, when the directional V2X communication antenna 31 arranged as described above is mounted on the front portion of the vehicle 1, the V2X communication antenna-mounted leaning vehicle 1 is able to further suppress deterioration of the transmission and reception performances of the V2X communication with the vehicle having the another V2X communication device in the vehicle forward rightward region when the leaning vehicle 1 is in the right turning state, as compared to the transmission and reception performances of the leaning vehicle 1 in the straight-traveling state.

When the V2X communication antenna-mounted leaning vehicle 1 is in a left turning state in which the vehicle turns left with the left maximum bank angle, the turning radius is short. On this account, when turning left in this way, the V2X communication antenna-mounted leaning vehicle 1 moves more in the vehicle leftward direction. For this reason, when the V2X communication antenna-mounted leaning vehicle 1 is in such a left turning state, a vehicle which has another V2X communication device and is located behind the V2X communication antenna-mounted leaning vehicle 1 in which the directional V2X communication antenna 32 is mounted on the rear portion, when the vehicle 1 is in the straight-traveling state, moves more in the vehicle leftward direction as compared to the V2X communication antenna-mounted leaning vehicle 1. Because the directional V2X communication antenna 32 is arranged to have the above-described feature (V), the V2X communication antenna-mounted leaning vehicle 1 in which the directional V2X communication antenna 32 is mounted on the rear portion of the vehicle 1 is able to achieve more sufficient radiation characteristics in the vehicle rearward leftward region, when the vehicle 1 is in the left turning state. Therefore, when the directional V2X communication antenna 32 arranged as described above is mounted on the rear portion of the vehicle 1, the V2X communication antenna-mounted leaning vehicle 1 is able to further suppress deterioration of the transmission and reception performances of the V2X communication with another V2X communication device in the vehicle rearward leftward region when the leaning vehicle 1 is in the left turning state, as compared to the transmission and reception performances of the leaning vehicle 1 in the straight-traveling state.

When the V2X communication antenna-mounted leaning vehicle 1 is in a right turning state in which the vehicle turns right with the right maximum bank angle, the turning radius is short. On this account, when turning right in this way, the V2X communication antenna-mounted leaning vehicle 1 moves more in the vehicle rightward direction. For this reason, when the V2X communication antenna-mounted leaning vehicle 1 is in such a right turning state, a vehicle which has another V2X communication device and is located behind the V2X communication antenna-mounted leaning vehicle 1 in which the directional V2X communication antenna 32 is mounted on the rear portion, when the vehicle 1 is in the straight-traveling state, moves more in the vehicle rightward direction as compared to the V2X communication antenna-mounted leaning vehicle 1. Because the directional V2X communication antenna 32 is arranged to have the above-described feature (V), the V2X communication antenna-mounted leaning vehicle 1 in which the directional V2X communication antenna 32 is mounted on the rear portion of the vehicle 1 is able to achieve more sufficient radiation characteristics in the vehicle rearward rightward region, when in the right turning state. Therefore, when the directional V2X communication antenna 32 arranged as described above is mounted on the rear portion of the vehicle 1, the V2X communication antenna-mounted leaning vehicle 1 is able to further suppress deterioration of the transmission and reception performances of the V2X communication with the vehicle having the another V2X communication device in the vehicle rearward rightward region when the leaning vehicle 1 is in the right turning state, as compared to the transmission and reception performances of the leaning vehicle 1 in the straight-traveling state.

When measurement is performed for the directional V2X communication antenna 31 of Second Embodiment that takes a posture of being mounted on the V2X communication antenna-mounted leaning vehicle 1 in which the leaning vehicle body frame 7 is in the upright state but that is not actually mounted on the V2X communication antenna-mounted leaning vehicle 1, the size β of the 3 dB beam width Epv on the vehicle-mounted vertical plane Pav is arranged to be larger than a half of the total maximum bank angle γ. In other words, the directional V2X communication antenna 31 of Second Embodiment has the additional feature (VI). It is therefore possible to design the size β of the 3 dB beam width Epv on the vehicle-mounted vertical plane Pav of the directional V2X communication antenna 31 in accordance with the total maximum bank angle γ. The V2X communication antenna 32 provided at the rear portion of the vehicle 1 is arranged to be similar to the V2X communication antenna 31 provided at the front portion of the vehicle 1.

When the V2X communication antenna-mounted leaning vehicle 1 in which the directional V2X communication antenna 31 is mounted on the front portion of the vehicle 1 is in the left turning state and turns left with a left maximum bank angle γl, the directional V2X communication antenna 31 leans leftward by the left maximum bank angle γl. For this reason, the height from the road surface on which the V2X communication antenna-mounted leaning vehicle 1 is grounded to the directional V2X communication antenna 31 is low in the left turning state, as compared to the straight-traveling state. In other words, an electromagnetic wave which is radiated from the directional V2X communication antenna 31 to the vehicle upper region in the vehicle forward leftward region when the V2X communication antenna-mounted leaning vehicle 1 is in the straight-traveling state is radiated to a location closer to the road surface when the vehicle 1 is in the left turning state. Because the directional V2X communication antenna 31 is arranged to have the above-described feature (VI), the V2X communication antenna-mounted leaning vehicle 1 in which the directional V2X communication antenna 31 is mounted on the front portion is able to achieve more sufficient radiation characteristics in the vehicle forward leftward region, when in the left turning state. Therefore, when the directional V2X communication antenna 31 arranged as described above is mounted on the front portion of the vehicle 1, the V2X communication antenna-mounted leaning vehicle 1 is able to further suppress deterioration of the transmission and reception performances of the V2X communication with another V2X communication device in the vehicle forward leftward region when the leaning vehicle 1 is in the left turning state, as compared to the transmission and reception performances of the leaning vehicle 1 in the straight-traveling state.

When the V2X communication antenna-mounted leaning vehicle 1 in which the directional V2X communication antenna 31 is mounted on the front portion of the vehicle 1 is in the right turning state and turns right with a right maximum bank angle γr, the directional V2X communication antenna 31 leans rightward by the right maximum bank angle γr. For this reason, the height from the road surface on which the V2X communication antenna-mounted leaning vehicle 1 is grounded to the directional V2X communication antenna 31 is low in the right turning state, as compared to the straight-traveling state. In other words, an electromagnetic wave which is radiated from the directional V2X communication antenna 31 to the vehicle upper region in the vehicle forward rightward region when the V2X communication antenna-mounted leaning vehicle 1 is in the straight-traveling state is radiated to a location closer to the road surface when the vehicle 1 is in the right turning state. Because the directional V2X communication antenna 31 is arranged to have the above-described feature (VI), the V2X communication antenna-mounted leaning vehicle 1 in which the directional V2X communication antenna 31 is mounted on the front portion is able to achieve more sufficient radiation characteristics in the vehicle forward rightward region, when in the right turning state. Therefore, when the directional V2X communication antenna 31 arranged as described above is mounted on the front portion of the vehicle 1, the V2X communication antenna-mounted leaning vehicle 1 is able to further suppress deterioration of the transmission and reception performances of the V2X communication with another V2X communication device in the vehicle forward rightward region when the leaning vehicle 1 is in the right turning state, as compared to the transmission and reception performances of the leaning vehicle 1 in the straight-traveling state.

When the V2X communication antenna-mounted leaning vehicle 1 in which the directional V2X communication antenna 32 is mounted on the rear portion of the vehicle 1 is in the left turning state and turns with a left maximum bank angle γl, the directional V2X communication antenna 32 leans leftward by the left maximum bank angle γl. For this reason, the height from the road surface on which the V2X communication antenna-mounted leaning vehicle 1 is grounded to the directional V2X communication antenna 32 is low in the left turning state, as compared to the straight-traveling state. In other words, an electromagnetic wave which is radiated from the directional V2X communication antenna 32 to the vehicle upper region in the vehicle rearward leftward region when the V2X communication antenna-mounted leaning vehicle 1 is in the straight-traveling state is radiated to a location closer to the road surface when the vehicle 1 is in the left turning state. Because the directional V2X communication antenna 32 is arranged to have the above-described feature (VI), the V2X communication antenna-mounted leaning vehicle 1 in which the directional V2X communication antenna 32 is mounted on the rear portion of the vehicle 1 is able to achieve more sufficient radiation characteristics in the vehicle rearward leftward region, when in the left turning state. Therefore, when the directional V2X communication antenna 32 arranged as described above is mounted on the rear portion of the vehicle 1, the V2X communication antenna-mounted leaning vehicle 1 is able to further suppress deterioration of the transmission and reception performances of the V2X communication with another V2X communication device in the vehicle rearward leftward region when the leaning vehicle 1 is in the left turning state, as compared to the transmission and reception performances of the leaning vehicle 1 in the straight-traveling state.

When the V2X communication antenna-mounted leaning vehicle 1 in which the directional V2X communication antenna 32 is mounted on the rear portion of the vehicle 1 is in the right turning state and turns right with a right maximum bank angle γr, the directional V2X communication antenna 32 leans rightward by the right maximum bank angle γr. For this reason, the height from the road surface on which the V2X communication antenna-mounted leaning vehicle 1 is grounded to the directional V2X communication antenna 32 is low in the right turning state, as compared to the straight-traveling state. In other words, an electromagnetic wave which is radiated from the directional V2X communication antenna 32 to the vehicle upper region in the vehicle rearward rightward region when the V2X communication antenna-mounted leaning vehicle 1 is in the straight-traveling state is radiated to a location closer to the road surface when the vehicle 1 is in the right turning state. Because the directional V2X communication antenna 32 is arranged to have the above-described feature (VI), the V2X communication antenna-mounted leaning vehicle 1 in which the directional V2X communication antenna 32 is mounted on the rear portion of the vehicle 1 is able to achieve more sufficient radiation characteristics in the vehicle rearward rightward region, when the vehicle 1 is in the right turning state. Therefore, when the directional V2X communication antenna 32 arranged as described above is mounted on the rear portion of the vehicle 1, the V2X communication antenna-mounted leaning vehicle 1 is able to further suppress deterioration of the transmission and reception performances of the V2X communication with another V2X communication device in the vehicle rearward rightward region when the leaning vehicle 1 is in the right turning state, as compared to the transmission and reception performances of the leaning vehicle 1 in the straight-traveling state.

Because of the above, according to the above-described features (IV), (V), and (VI), the V2X communication antenna-mounted leaning vehicle 1 of Second Embodiment is able to further suppress a difference in transmission and reception performances of V2X communication between a straight-traveling state and a turning state of the leaning vehicle 1, while suppressing a difference in transmission and reception performances of V2X communication due to different mounting locations of the V2X communication antenna.

The V2X communication antenna-mounted leaning vehicle of the present teaching may have at least one of the above-described features (IV), (V), and (VI).

The directional V2X communication antenna 31 is provided at the front portion of the vehicle 1 so that, when the V2X communication antenna-mounted leaning vehicle 1 in which the leaning vehicle body frame 7 is in the upright state is viewed in the vehicle leftward direction or in the vehicle rightward direction, an upper end 31u of a substrate constituting the directional V2X communication antenna 31 is rearward of a lower end 31d of the substrate constituting the directional V2X communication antenna 31 in the vehicle front-rear direction. With this arrangement, when the V2X communication antenna-mounted leaning vehicle 1 in which the leaning vehicle body frame 7 is in the upright state is viewed in the vehicle leftward direction or in the vehicle rightward direction, the size of the 3 dB beam width on the vehicle-mounted vertical plane of the directional V2X communication antenna 31, which exists in the vehicle upper region, is large as compared to a case where the upper end 31u of the substrate constituting the directional V2X communication antenna 31 is at the same position as the lower end 31d of the substrate constituting the directional V2X communication antenna 31 in the vehicle front-rear direction.

The directional V2X communication antenna 32 is provided at the rear portion of the vehicle 1 so that, when a V2X communication antenna-mounted leaning vehicle 1 which takes the same posture as the V2X communication antenna-mounted leaning vehicle 1 in which the leaning vehicle body frame 7 is in the upright state is viewed in the vehicle leftward direction or in the vehicle rightward direction, an upper end 32u of a substrate constituting the directional V2X communication antenna 32 is forward of a lower end 32d of the substrate constituting the directional V2X communication antenna 32 in the vehicle front-rear direction. With this arrangement, when the V2X communication antenna-mounted leaning vehicle 1 in which the leaning vehicle body frame 7 is in the upright state is viewed in the vehicle leftward direction or in the vehicle rightward direction, the size of the 3 dB beam width on the vehicle-mounted vertical plane of the directional V2X communication antenna 32, which exists in the vehicle upper region, is large as compared to a case where the upper end 32u of the substrate constituting the directional V2X communication antenna 32 is at the same position as the lower end 32d of the substrate constituting the directional V2X communication antenna 32 in the vehicle front-rear direction.

When the V2X communication antenna-mounted leaning vehicle 1 in which the directional V2X communication antenna 31 is mounted on the front portion of the vehicle 1 is in the left turning state, the directional V2X communication antenna 31 leans in the vehicle leftward direction, too. For this reason, the height from the road surface on which the V2X communication antenna-mounted leaning vehicle 1 is grounded to the directional V2X communication antenna 31 is low in the left turning state, as compared to the straight-traveling state. In other words, an electromagnetic wave which is radiated from the directional V2X communication antenna 31 to the vehicle upper region in the vehicle forward leftward region when the V2X communication antenna-mounted leaning vehicle 1 is in the straight-traveling state is radiated to a location closer to the road surface when the vehicle 1 is in the left turning state. Because the directional V2X communication antenna 31 is arranged in this manner, the V2X communication antenna-mounted leaning vehicle 1 in which the directional V2X communication antenna 31 is mounted on the front portion of the vehicle 1 is able to achieve sufficient radiation characteristics in the vehicle forward leftward region, when the vehicle 1 is in the left turning state. Therefore, when the directional V2X communication antenna 31 arranged as described above is mounted on the front portion of the vehicle 1, the V2X communication antenna-mounted leaning vehicle 1 is able to further suppress deterioration of the transmission and reception performances of the V2X communication with another V2X communication device in the vehicle forward leftward region when the leaning vehicle 1 is in the left turning state, as compared to the transmission and reception performances of the leaning vehicle 1 in the straight-traveling state.

When the V2X communication antenna-mounted leaning vehicle 1 in which the directional V2X communication antenna 31 is mounted on the front portion of the vehicle 1 is in the right turning state, the directional V2X communication antenna 31 leans in the vehicle rightward direction, too. For this reason, the height from the road surface on which the V2X communication antenna-mounted leaning vehicle 1 is grounded to the directional V2X communication antenna 31 is low in the right turning state, as compared to the straight-traveling state. In other words, an electromagnetic wave which is radiated from the directional V2X communication antenna 31 to the vehicle upper region in the vehicle forward rightward region when the V2X communication antenna-mounted leaning vehicle 1 is in the straight-traveling state is radiated to a location closer to the road surface when the vehicle 1 is in the right turning state. Because the directional V2X communication antenna 31 is arranged in this manner, the V2X communication antenna-mounted leaning vehicle 1 in which the directional V2X communication antenna 31 is mounted on the front portion of the vehicle 1 is able to achieve sufficient radiation characteristics in the vehicle forward rightward region, when the vehicle 1 is in the right turning state. Therefore, when the directional V2X communication antenna 31 arranged as described above is mounted on the front portion of the vehicle 1, the V2X communication antenna-mounted leaning vehicle 1 is able to further suppress deterioration of the transmission and reception performances of the V2X communication with another V2X communication device in the vehicle forward rightward region when the leaning vehicle 1 is in the right turning state, as compared to the transmission and reception performances of the leaning vehicle 1 in the straight-traveling state.

When the V2X communication antenna-mounted leaning vehicle 1 in which the directional V2X communication antenna 32 is mounted on the rear portion of the vehicle 1 is in the left turning state, the directional V2X communication antenna 32 leans in the vehicle leftward direction, too. For this reason, the height from the road surface on which the V2X communication antenna-mounted leaning vehicle 1 is grounded to the directional V2X communication antenna 32 is low in the left turning state, as compared to the straight-traveling state. In other words, an electromagnetic wave which is radiated from the directional V2X communication antenna 32 to the vehicle upper region in the vehicle rearward leftward region when the V2X communication antenna-mounted leaning vehicle 1 is in the straight-traveling state is radiated to a location closer to the road surface when the vehicle 1 is in the left turning state. Because the directional V2X communication antenna 32 is arranged in this manner, the V2X communication antenna-mounted leaning vehicle 1 in which the directional V2X communication antenna 32 is mounted on the rear portion of the vehicle 1 is able to achieve further sufficient radiation characteristics in the vehicle rearward leftward region, when in the left turning state. Therefore, when the directional V2X communication antenna 32 arranged as described above is mounted on the rear portion of the vehicle 1, the V2X communication antenna-mounted leaning vehicle 1 is able to further suppress deterioration of the transmission and reception performances of the V2X communication with another V2X communication device in the vehicle rearward leftward region when the leaning vehicle 1 is in the left turning state, as compared to the transmission and reception performances of the leaning vehicle 1 in the straight-traveling state.

When the V2X communication antenna-mounted leaning vehicle 1 in which the directional V2X communication antenna 32 is mounted on the rear portion of the vehicle 1 is in the right turning state, the directional V2X communication antenna 32 leans in the vehicle rightward direction, too. For this reason, the height from the road surface on which the V2X communication antenna-mounted leaning vehicle 1 is grounded to the directional V2X communication antenna 32 is low in the left turning state, as compared to the straight-traveling state. In other words, an electromagnetic wave which is radiated from the directional V2X communication antenna 32 to the vehicle upper region in the vehicle rearward rightward region when the V2X communication antenna-mounted leaning vehicle 1 is in the straight-traveling state is radiated to a location closer to the road surface when the vehicle 1 is in the right turning state. Because the directional V2X communication antenna 32 is arranged in this manner, the leaning vehicle 1 in which the directional V2X communication antenna 32 is mounted on the rear portion of the vehicle 1 is able to achieve further sufficient radiation characteristics in the vehicle rearward rightward region, when in the right turning state. Therefore, when the directional V2X communication antenna 32 arranged as described above is mounted on the rear portion of the vehicle 1, the V2X communication antenna-mounted leaning vehicle 1 is able to further suppress deterioration of the transmission and reception performances of the V2X communication with another V2X communication device in the vehicle rearward rightward region when the leaning vehicle 1 is in the right turning state, as compared to the transmission and reception performances of the leaning vehicle 1 in the straight-traveling state.

Modification of Second Embodiment

Figure 7:
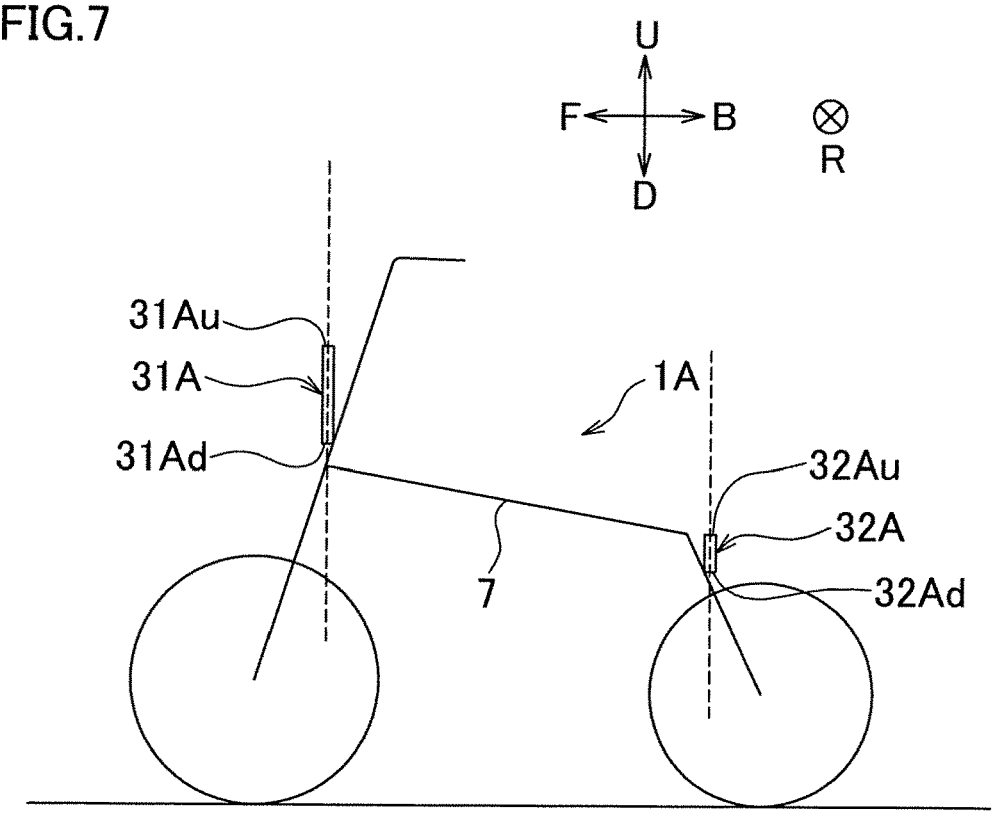
FIG. 7 schematically shows a directional V2X communication antenna of a V2X communication antenna-mounted leaning vehicle of a modification of Second Embodiment of the present teaching, and is a partial side view in which the vehicle is viewed in the vehicle rightward direction.

The following will describe a V2X communication antenna-mounted leaning vehicle 1 of a modification of Second Embodiment of the present teaching with reference to the schematic diagrams in FIG. 7. The V2X communication antenna-mounted leaning vehicle 1A of the modification of Second Embodiment encompasses all features of the V2X communication antenna-mounted leaning vehicle 1 of First Embodiment. Directional V2X communication antennas 31A and 32A of the V2X communication antenna-mounted leaning vehicle 1A are different from the directional V2X communication antennas 31 and 32 of Second Embodiment in the locations of upper ends and lower ends of substrates constituting the directional V2X communication antennas 31A and 32A. Apart from this difference, the directional V2X communication antennas 31A and 32A are identical with the directional V2X communication antennas 31 and 32 of Second Embodiment. In FIG. 7, the substrates constituting the directional V2X communication antennas 31A and 32A are schematically shown.

As shown in FIG. 7, a directional V2X communication antenna 131 provided at a front portion of the vehicle 1A is arranged such that, when the V2X communication antenna-mounted leaning vehicle 1A in which a leaning vehicle body frame 7 is in the upright state is viewed in the vehicle leftward direction or in the vehicle rightward direction, an upper end 31Au of a substrate constituting the directional V2X communication antenna 31A is at the same position as a lower end 31Ad of the substrate constituting the directional V2X communication antenna 31A in the vehicle front-rear direction. The directional V2X communication antenna 32A provided at a rear portion of the vehicle 1A is arranged such that, when the V2X communication antenna-mounted leaning vehicle 1A which takes the same posture as the V2X communication antenna-mounted leaning vehicle 1 in which the leaning vehicle body frame 7 is in the upright state is viewed in the vehicle leftward direction or in the vehicle rightward direction, an upper end 32Au of a substrate constituting the directional V2X communication antenna 32A is at the same position as a lower end 32Ad of the substrate constituting the directional V2X communication antenna 32A in the vehicle front-rear direction.

Because the directional V2X communication antennas 31A and 32A are arranged in this way, the 3 dB beam width Epv on the vehicle-mounted vertical plane Pav of each of the directional V2X communication antennas 31A and 32A exists both in the vehicle upper region Au and the vehicle lower region Ad even if the posture of the front portion or the rear portion of the V2X communication antenna-mounted leaning vehicle 1A is changed in the vehicle up-down direction. Furthermore, even if the posture of the front portion or the rear portion of the V2X communication antenna-mounted leaning vehicle 1A is changed in the vehicle up-down direction, the 3 dB beam width Eph on the vehicle-mounted horizontal plane Pah of each of the directional V2X communication antennas 31A and 32A exists both in the vehicle left region Al and the vehicle right region Ar. In other words, when the rear portion of the vehicle 1A becomes relatively lower in height than the front portion or when the front portion of the vehicle 1A becomes relatively lower in height than the rear portion, it is possible to suppress the difference in the transmission and reception performances between the directional V2X communication antennas 31A and 32A.

In this way, the V2X communication antenna-mounted leaning vehicle 1A of the modification of Second Embodiment is able to suppress the difference in transmission and reception performances of V2X communication between the straight-traveling state and the turning state of the leaning vehicle 1A, while suppressing the difference in transmission and reception performances of V2X communication due to different mounting locations of the V2X communication antennas 31A and 32A.

Specific Example 1 of First and Second Embodiments

The following will describe a V2X communication antenna-mounted leaning vehicle 1 of Specific Example 1 of First and Second Embodiments of the present teaching with reference to the schematic diagrams in FIG. 8 to FIG. 11. Specific Example 1 deals with a case where a V2X communication antenna-mounted leaning vehicle of the present teaching is applied to a motorcycle 1. Hereinafter, the vehicle front-rear direction, the vehicle left-right direction, and the vehicle up-down direction having been described above indicate a front-rear direction, a left-right direction, and an up-down direction for a driver 33 seated on a later-described seat 8 of the motorcycle 1, respectively.

(Structure of Motorcycle 1)

Figure 8:
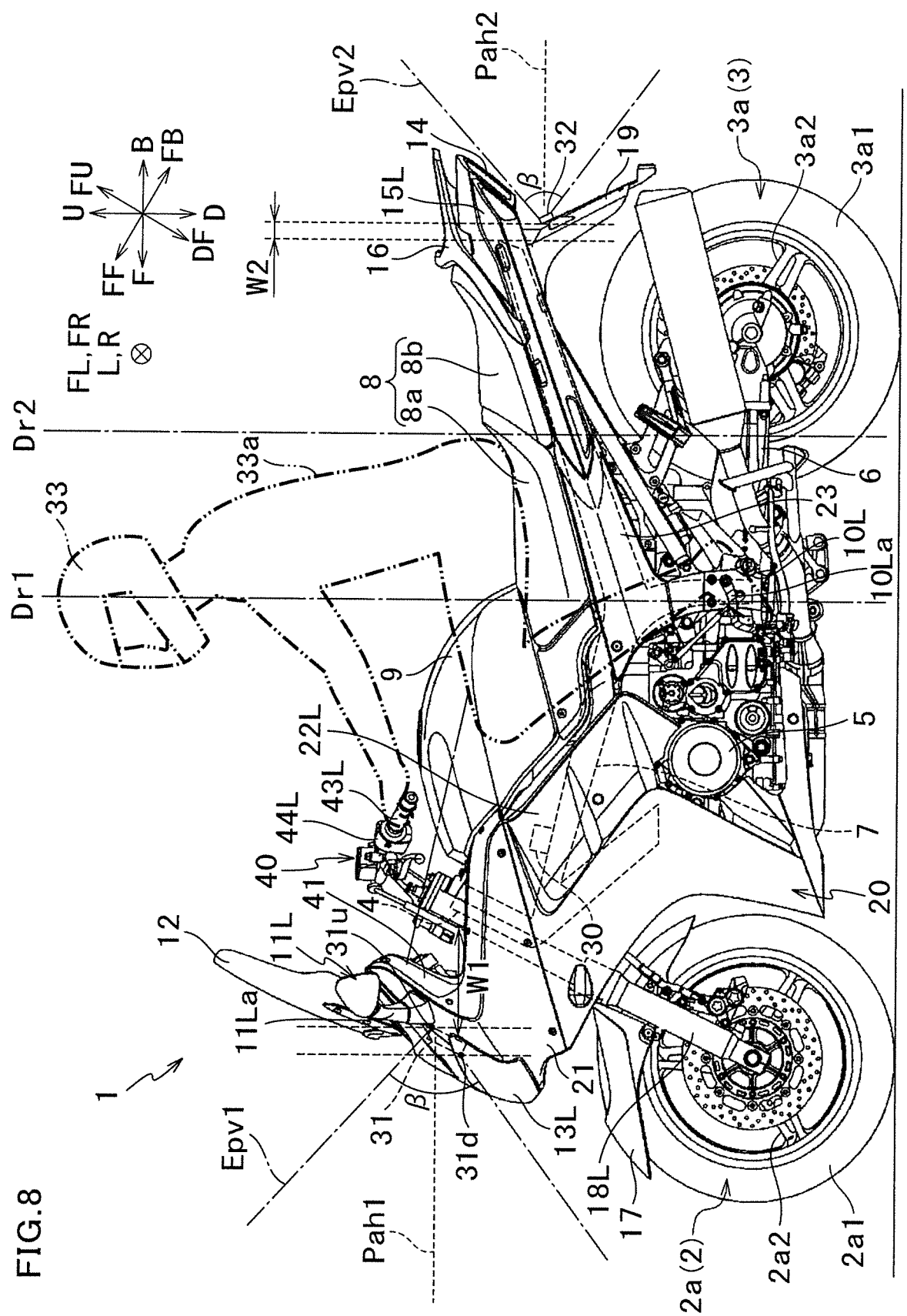
FIG. 8 is a side view showing a motorcycle of Specific Example 1 of the embodiment of the present teaching, in which the motorcycle is viewed in the vehicle rightward direction.
Figure 9:
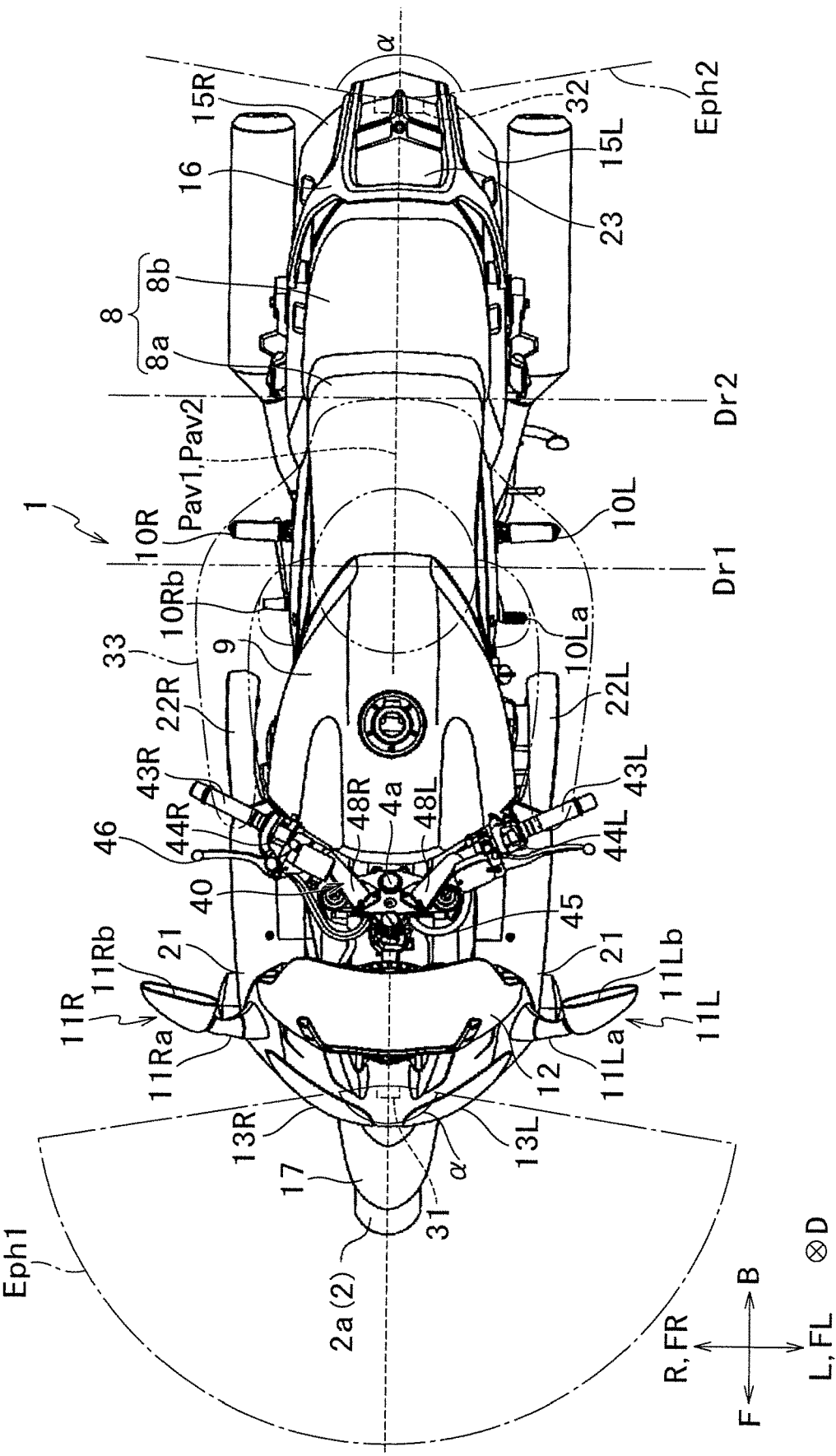
FIG. 9 is a plan view of the motorcycle of Specific Example 1, in which the motorcycle is viewed in the vehicle downward direction.
Figure 10:
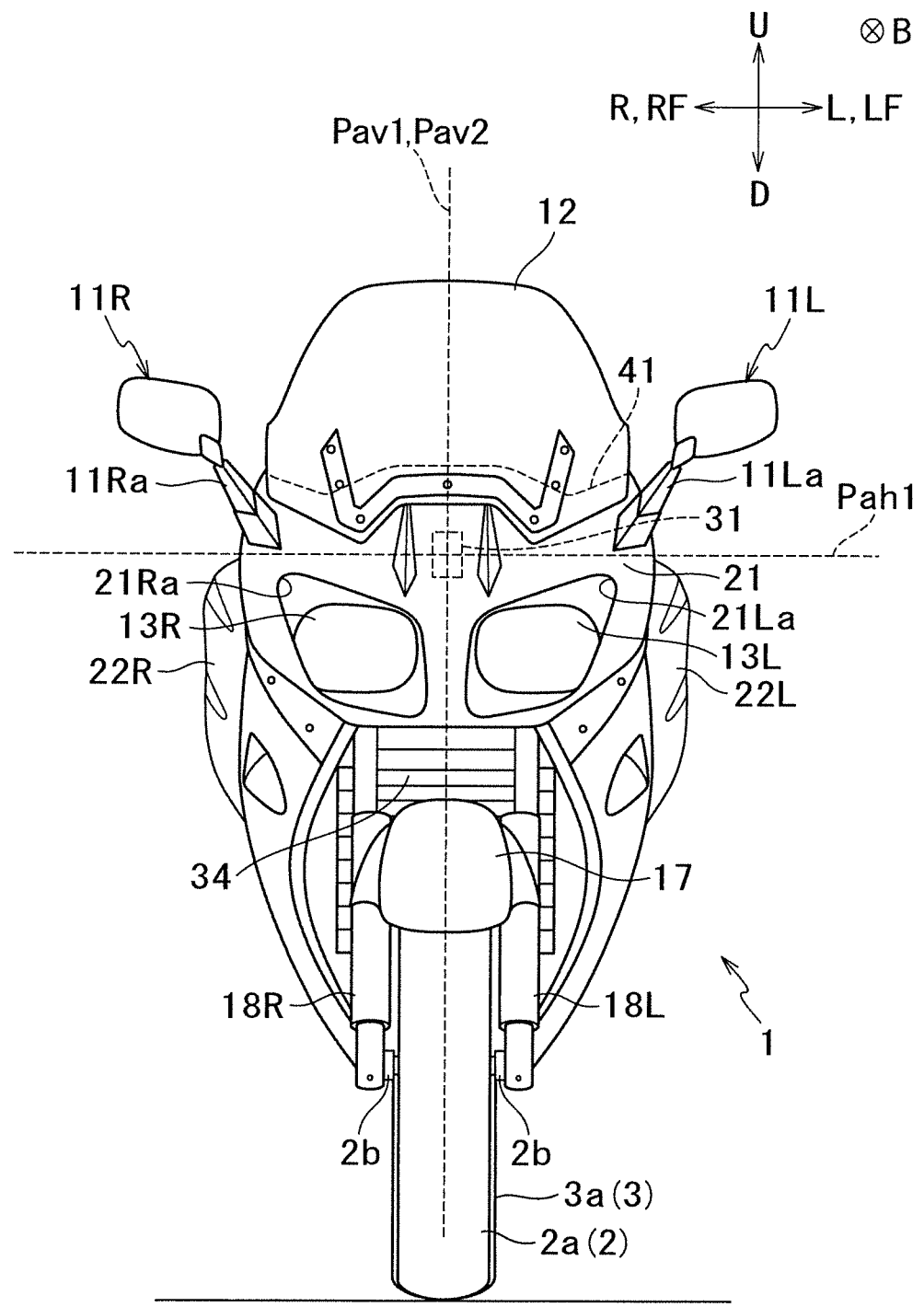
FIG. 10 is a front view of the motorcycle of Specific Example 1, in which the motorcycle is viewed in the vehicle rearward direction.
Figure 11:
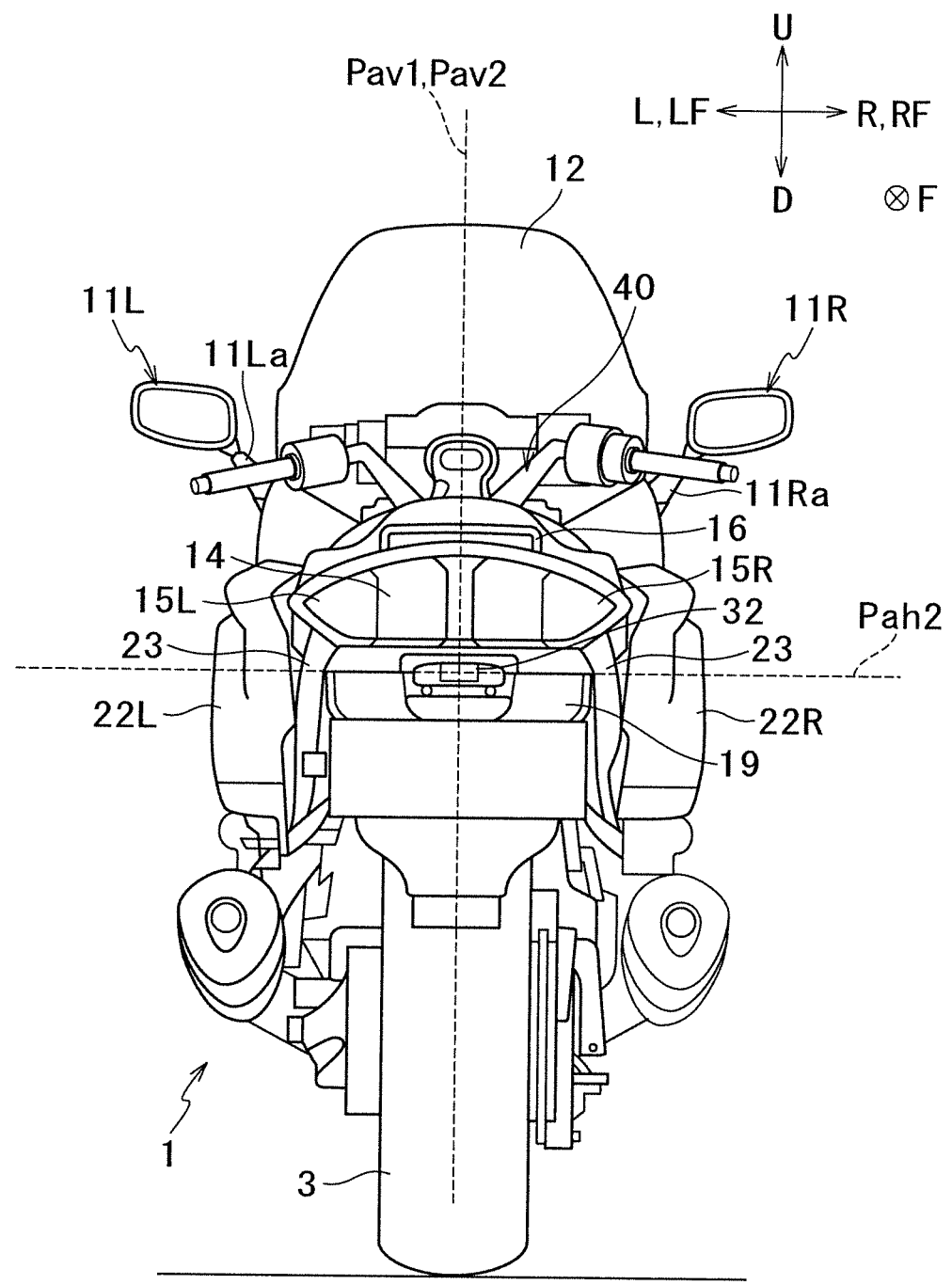
FIG. 11 is a rear view of the motorcycle of Specific Example 1, kin which the motorcycle is viewed in the vehicle forward direction.

FIG. 8 is a side view of the motorcycle 1 of Specific Example 1. FIG. 9 is a plan view of the motorcycle 1 of Specific Example 1. FIG. 10 is a front view of the motorcycle 1 of Specific Example 1. FIG. 11 is a rear view of the motorcycle 1 of Specific Example 1. FIG. 8 to FIG. 11 show the motorcycle 1 which is in an upright state on a horizontal road surface.

The V2X communication antenna-mounted leaning vehicle 1 includes a leaning vehicle body frame 7, a V2X communication device 30, a V2X communication antenna 31, and a V2X communication antenna 32. The vehicle 1 turns by leaning the leaning vehicle body frame 7 in the vehicle left-right direction relative to the vehicle up-down direction. The leaning vehicle body frame 7 leans in the vehicle rightward direction when turning right and leans in the vehicle leftward direction when turning left. In FIG. 8 to FIG. 11, an arrow FF indicates a forward direction from the leaning vehicle body frame 7. An arrow FB indicates a rearward direction from the leaning vehicle body frame 7. An arrow FU indicates an upward direction from the leaning vehicle body frame 7. An arrow FD indicates a downward direction from the leaning vehicle body frame 7. An arrow FR indicates a rightward direction from the leaning vehicle body frame 7. An arrow FL indicates a leftward direction from the leaning vehicle body frame 7. In FIG. 8 to FIG. 11, an up-down direction (UFDF direction) of the leaning vehicle body frame 7 is in parallel to the axial direction of a head pipe 4 of the leaning vehicle body frame 7. A left-right direction (LFRF direction) of the leaning vehicle body frame 7 is orthogonal to a plane which passes the center in the width direction of the leaning vehicle body frame 7. A front-rear direction (FFBF direction) of the leaning vehicle body frame 7 is orthogonal to both the up-down direction (UFDF direction) of the leaning vehicle body frame 7 and the left-right direction (LFRF direction) of the leaning vehicle body frame 7. In FIG. 8 to FIG. 11, the motorcycle 1 is in an upright state on a horizontal road surface. In other words, FIG. 8 to FIG. 11 show the motorcycle 1 in which the leaning vehicle body frame 7 is in the upright state. For this reason, the vehicle left-right direction of the motorcycle 1 coincides with the left-right direction of the leaning vehicle body frame 7 in FIG. 8 to FIG. 11.

The motorcycle 1 of Specific Example 1 is a so-called touring motorcycle 1. As shown in FIG. 8, the motorcycle 1 is provided with the leaning vehicle body frame 7. The leaning vehicle body frame 7 is made of metal. A head pipe 4 is provided at a front portion of the leaning vehicle body frame 7. A steering shaft 4a (see FIG. 9) is rotatably inserted into the head pipe 4. The head pipe 4 and the steering shaft 4a are made of metal. A handle unit (steering wheel unit) 40 is provided at an upper portion of the steering shaft 4a in the vehicle up-down direction.

The motorcycle 1 includes a front wheel unit 2 including one front wheel 2a. The motorcycle 1 includes a rear wheel unit 3 including one rear wheel 3a. The front wheel unit 2 is provided at a front portion of the motorcycle 1 in the vehicle front-rear direction. The front wheel unit 2 is provided forward of a later-described seat 8 in the vehicle front-rear direction. The rear wheel unit 3 is provided at a rear portion of the motorcycle 1 in the vehicle front-rear direction. The rear wheel unit 3 is provided partially rearward of the later-described seat 8 in the vehicle front-rear direction. The front wheel 2a includes a tire 2a1 and a wheel 2a2. The rear wheel 3a includes a tire 3a1 and a wheel 3a2. The wheel 2a2 of the front wheel 2a and the wheel 3a2 of the rear wheel 3a are made of metal. When the handle unit 40 is steered in the left-right direction, a plane, which passes the center in the width direction of the front wheel unit 2, leans relative to the vehicle front-rear direction (FB direction).

As shown in FIG. 9, the handle unit 40 is connected to the steering shaft 4a. Furthermore, as shown in FIG. 8 and FIG. 10, the handle unit 40 are supported by front forks 18L and 18R. Although not illustrated, the front forks 18L and 18R are indirectly connected to the steering shaft 4a. The front forks 18L and 18R are arranged to be symmetrical about the front wheel unit 2 in the left-right direction. The front forks 18L and 18R include front suspensions which are configured to absorb impact in the expansion/contraction direction. The expansion/contraction direction is identical with the up-down direction of the leaning vehicle body frame 7. As shown in FIG. 10, an axle shaft 2b is fixed to lower end portions of the front forks 18L and 18R. The front wheel unit 2 is rotatably attached to the axle shaft 2b. The front forks 18L and 18R support the front wheel unit 2 in the vehicle leftward direction and in the vehicle rightward direction. In other words, the front wheel unit 2 is supported by the leaning vehicle body frame 7 via the front forks 18L and 18R. A radiator 34 is provided behind the front forks 18L and 18R. The front forks 18L and 18R are made of metal.

As shown in FIG. 9, the handle unit 40 includes grip units 43L and 43R, handle switch units 44L and 44R, a handle crown 45, a brake lever 46, a main switch 47, and handlebars 48L and 48R. The handlebars 48L and 48R are fixed to the handle crown 45. The grip units 43L and 43R are connected to end portions of the handlebars 48L and 48R, respectively. The grip unit 43L is provided leftward of the grip unit 43R in the vehicle left-right direction. The handle crown 45 is connected to the steering shaft 4a. The handle crown 45 and the handlebars 48L and 48R of the handle unit 40 are made of metal.

The grip unit 43R is a throttle grip. The grip unit 43R is operated to adjust an output of the engine main body. To be more specific, the grip unit 43R is operated to adjust the opening degree of a throttle valve (not illustrated) of an engine unit 5. The brake lever 46 is provided in front of the grip unit 43R in the vehicle front-rear direction. The rotation of the front wheel unit 2 is slowed down as the driver 33 operates the brake lever 46.

As shown in FIG. 8, a front fender 17 is provided directly above the front wheel unit 2 in the vehicle up-down direction. The front fender 17 is provided to cover an upper portion of the front wheel unit 2.

The seat 8 is provided directly above the leaning vehicle body frame 7 in the vehicle up-down direction. The seat 8 includes a main seat 8a and a rear-portion seat 8b. A fuel tank 9 is provided directly above the leaning vehicle body frame 7 in the vehicle up-down direction. The fuel tank 9 is supported by the leaning vehicle body frame 7. The seat 8 is provided behind the fuel tank 9 in the vehicle front-rear direction. The rear-portion seat 8b is provided behind the main seat 8a in the vehicle front-rear direction. An upper surface of the rear-portion seat 8b is located above an upper surface of the main seat 8a in the vehicle up-down direction. The driver 33 is seated on the main seat 8a. A passenger (not illustrated) is seated on the rear-portion seat 8b.

A front portion of a rear arm 6 is connected to a lower end portion of the leaning vehicle body frame 7 via a pivot shaft (not illustrated). The rear arm 6 is swingable about the pivot shaft in the vehicle up-down direction. The rear wheel unit 3 is supported at a rear portion of the rear arm 6. The rear arm 6 is connected to the leaning vehicle body frame 7 via paired rear suspensions (not shown) which are lined up in the vehicle left-right direction and are configured to absorb impact in the expansion/contraction direction. The expansion/contraction direction is identical with the up-down direction of the leaning vehicle body frame 7. In other words, the rear wheel unit 3 is supported by the leaning vehicle body frame 7 via the rear suspensions and the rear arm 6.

The engine unit 5 is provided directly below the leaning vehicle body frame 7 in the vehicle up-down direction. The engine unit 5 is supported by the leaning vehicle body frame 7. The engine unit 5 of the motorcycle 1 is a water-cooled engine unit configured to cool the engine main body by water. The engine unit 5 includes an engine main body and a transmission which are not illustrated. Driving force output from the engine main body is transmitted to the rear wheel unit 3 via the transmission. The leaning vehicle body frame 7 supports a battery (not illustrated). The battery supplies electric power to electronic devices such as a controller and sensors.

As shown in FIG. 8 and FIG. 9, footrests 10L and 10R are provided at a lower left portion and a lower right portion of the motorcycle 1, respectively. The driver 33 puts his/her feet on the footrests 10L and 10R when driving the motorcycle. A shift pedal 10La is provided in front of the left footrest 10L in the vehicle front-rear direction. As the driver 33 operates the shift pedal 10La, the transmission ratio of the transmission is changed. A brake pedal 10Rb is provided in front of the right footrest 10R in the vehicle front-rear direction, as shown in FIG. 3. The rotation of the rear wheel unit 3 is slowed down as the driver 33 operates the brake pedal 10Rb.

The motorcycle 1 is provided with a vehicle body cover 20 which covers the leaning vehicle body frame 7, etc. The vehicle body cover 20 includes a front cover 21, side covers 22L and 22R, a rear cover 23, a front fender 17, a rear fender 19, and a dash panel 41. The vehicle body cover 20 is made of resin.

The front cover 21 is provided in front of the head pipe 4 in the vehicle front-rear direction. The front cover 21 is attached to the leaning vehicle body frame 7. In the vehicle left-right direction, the front cover 21 is symmetrical about the center in the vehicle left-right direction of the vehicle 1. The front cover 21 covers a front portion of the head pipe 4 from the front of the head pipe 4. Two headlight units 13L and 13R are attached to the front cover 21 (see FIG. 9 and FIG. 10). The headlight units 13L and 13R are supported by the leaning vehicle body frame 7. The headlight units 13L and 13R are, for example, halogen lamps or semiconductor light sources.

The headlight units 13L and 13R emit light in the vehicle forward direction from the vehicle 1. In the vehicle left-right direction, the headlight units 13L and 13R are symmetrical about the center in the vehicle left-right direction of the vehicle 1. The headlight unit 13L is provided at a left portion of the vehicle 1. The headlight unit 13R is provided at a right portion of the vehicle 1.

A screen 12 is provided at an upper portion of the front cover 21. The screen 12 is provided forward of the handle unit 40 in the vehicle front-rear direction. An upper portion of the front cover 21 is overlapped with the screen 12 when viewed in the vehicle forward direction or in the vehicle rearward direction. The part of the upper portion of the front cover 21, which overlaps the screen 12, is located rearward of the screen 12 in the vehicle front-rear direction. The screen 12 is made of, for example, transparent resin.

As shown in FIG. 9, the handle unit 40 is provided forward of the seat 8 in the vehicle front-rear direction. The handle unit 40 is a rod member and extends in the vehicle left-right direction. The handle unit 40 is provided at least partially forward of the fuel tank 9 in the vehicle front-rear direction. A central portion in the vehicle left-right direction of the handle unit 40 is provided forward of the fuel tank 9 in the vehicle front-rear direction.

As shown in FIG. 8, the dash panel 41 is provided in the vicinity of the handle unit 40. The dash panel 41 is provided rearward of the front cover 21 in the vehicle front-rear direction. The dash panel 41 is connected to an upper end portion of the front cover 21. The dash panel 41 is provided at least partially forward of the head pipe 4 in the vehicle front-rear direction. An unillustrated meter unit is provided in the dash panel 41. The meter unit includes an unillustrated display. The display is configured to display vehicle speed, engine rotation speed, warnings, and the like. The meter unit is at least partially made of metal.

As shown in FIG. 10, mirror stays 11La and 11Ra are provided at the front portion of the motorcycle 1. The mirror stays 11La and 11Ra are provided at an upper left portion and an upper right portion of the front cover 21, respectively, in the vehicle left-right direction. The mirror stays 11La and 11Ra are fixed to the front cover 21 at one ends. In the vehicle left-right direction, the mirror stays 11La and 11Ra are symmetrical about the center in the vehicle left-right direction of the vehicle 1. The mirror stays 11La and 11Ra are provided in the vicinity of left and right end portions of the screen 12, respectively. Each of the mirror stays 11La and 11Ra has an inner space. The mirror stays 11La and 11Ra are made of metal or resin. Back mirrors 11L and 11R are attached to the other ends of the mirror stays 11La and 11Ra, respectively. The back mirrors 11L and 11R are provided at an upper left portion and an upper right portion of the front cover 21, respectively, in the vehicle left-right direction. The back mirrors 11L and 11R are provided with mirror sections 11Lb and 11Rb (see FIG. 9). The mirror sections 11Lb and 11Rb are provided so that flat mirror surfaces face rearward in the vehicle front-rear direction. The driver 33 is able to see the rear side of the motorcycle 1 by the mirror sections 11Lb and 11Rb in the vehicle front-rear direction.

As shown in FIG. 8 and FIG. 9, the side covers 22L and 22R are provided at least partially rearward of the head pipe 4 in the vehicle front-rear direction. The side covers 22L and 22R are provided partially rearward of the front cover 21 in the vehicle front-rear direction. The side covers 22L and 22R are connected to a lower end portion of the front cover 21. The side covers 22L and 22R are attached to the leaning vehicle body frame 7. The side covers 22L and 22R cover at least part of the leaning vehicle body frame 7 from the left side and from the right side in the vehicle left-right direction. The side covers 22L and 22R cover a front portion of the fuel tank 9. In the vehicle left-right direction, the side covers 22L and 22R are symmetrical about the center in the vehicle left-right direction of the vehicle 1.

The rear cover 23 is provided at the rear portion of the motorcycle 1. The rear cover 23 is provided rearward of the side covers 22L and 22R in the vehicle front-rear direction. The rear cover 23 is provided directly below the seat 8 and behind the seat 8 in the vehicle front-rear direction and in the vehicle left-right direction. The rear cover 23 is provided directly above the rear wheel unit 3 in the vehicle up-down direction. The rear cover 23 covers part of the leaning vehicle body frame 7 from the rear side in the vehicle front-rear direction. The rear cover 23 is supported by the leaning vehicle body frame 7. In the vehicle left-right direction, the rear cover 23 is symmetrical about the center in the vehicle left-right direction of the vehicle 1.

A taillight 14 is attached to the rear cover 23. The taillight 14 is provided at the rear portion of the motorcycle 1. When viewed in the vehicle left-right direction, the surface of the taillight 14 obliquely extends such that the upper end is upward of and rearward of the lower end. The taillight 14 are, for example, a halogen lamp or a semiconductor light source.

Rear direction indicator lamp units 15L and 15R are provided at a rear portion of the rear cover 23. The rear direction indicator lamp units 15L and 15R are provided at a left portion and a right portion of the rear cover 23, as a pair. The rear direction indicator lamp units 15L and 15R are provided at the left portion and the right portion of the rear cover 23.

As shown FIG. 8, the rear fender 19 is attached to the rear cover 23. The rear fender 19 is provided directly below the taillight 14 in the vehicle up-down direction. The rear fender 19 is provided directly above the rear wheel unit 3 in the vehicle up-down direction. The rear fender 19 is provided to cover an upper portion of the rear wheel unit 3.

As shown in FIG. 10, paired headlight unit opening portions 21La and 21Ra are formed in the front cover 21. The headlight units 13L and 13R are inserted into the headlight unit opening portions 21La and 21Ra, respectively. The headlight units 13L and 13R are supported by the leaning vehicle body frame 7 via a supporter (not illustrated).

(V2X Communication Device)

The V2X communication device 30 is electrically connected to the V2X communication antenna 31 and the V2X communication antenna 32. The V2X communication device 30 performs the V2X communication at least while the leaning vehicle body frame 7 is turning left and leans in the vehicle leftward direction and while the leaning vehicle body frame 7 is turning right and leans in the vehicle rightward direction. The V2X communication device 30 performs the V2X communication while the leaning vehicle body frame 7 is in the upright state, too.

(Location of Directional V2X Communication Antenna 31)

The directional V2X communication antenna 31 is provided at a front portion of the vehicle 1. The directional V2X communication antenna 31 is provided forward of the body 33a of the driver 33 seated on the seat 8, in the vehicle front-rear direction. In FIG. 8, a plane Dr1 passing through the front end of the body 33a of the driver 33 and being perpendicular to the vehicle front-rear direction is indicated by a linear line. The directional V2X communication antenna 31 is provided forward of the plane Dr1 in the vehicle front-rear direction. The directional V2X communication antenna 31 is provided at an upper portion of the motorcycle 1. The directional V2X communication antenna 31 is provided behind the front cover 21. To be more specific, the directional V2X communication antenna 31 is attached, via a fixing tool, to a stay used for attaching the front cover 21. When the motorcycle 1 is viewed in the vehicle upward direction or in the vehicle downward direction, the directional V2X communication antenna 31 is provided substantially at the center in the vehicle left-right direction of the vehicle 1. In the V2X communication antenna-mounted leaning vehicle 1 in which the leaning vehicle body frame 7 is in the upright state, the directional V2X communication antenna 31 is provided above the wheel 2a2 of the front wheel 2a in the vehicle up-down direction. The directional V2X communication antenna 31 is provided at an upper portion of the vehicle 1. When the vehicle 1 is viewed in the vehicle leftward direction or in the vehicle rightward direction, the directional V2X communication antenna 31 is provided above the wheel 2a2 of the front wheel 2a and forward of the head pipe 4 made of metal, in the vehicle up-down direction and the vehicle front-rear direction. The directional V2X communication antenna 31 is provided rearward of the vehicle body cover 20 in the vehicle front-rear direction. The directional V2X communication antenna 31 is provided between the inner surface of the vehicle body cover 20 and the head pipe 4 which is provided inside the vehicle body cover 20 and made of metal. The directional V2X communication antenna 31 is provided between the headlight units 13L and 13R. When the directional V2X communication antenna 31 is in the posture of being mounted on the vehicle 1 in which the leaning vehicle body frame 7 is in the upright state, on the vehicle-mounted horizontal plane Pah, the directional V2X communication antenna 31 is provided in front of the leaning vehicle body frame 7 made of metal, in the vehicle front-rear direction. When the leaning vehicle body frame 7 is in the upright state or the lean state, the directional V2X communication antenna 31 is provided above the leaning vehicle body frame 7 in the up-down direction of the leaning vehicle body frame 7.

In addition to the above, when the directional V2X communication antenna 31 is in the posture of being mounted on the vehicle 1 in which the leaning vehicle body frame 7 is in the upright state, the directional V2X communication antenna 31 is provided on the vehicle-mounted horizontal plane so that the antenna metal distance W1 which is the distance between the head pipe 4 which is part of the leaning vehicle body frame 7 and the directional V2X communication antenna 31 is at least twice as long as the wavelength of an electromagnetic wave. The antenna metal distance W1 is a distance which is long enough so that the head pipe 4 does not affect the radiation characteristics of the directional V2X communication antenna 31. The antenna metal distance W1 may be, for example, a distance with which the 3 dB beam width of the directional V2X communication antenna 31 is not changed between a case where the leaning vehicle body frame 7 is provided and a case where the leaning vehicle body frame 7 is not provided.

(Location of Directional V2X Communication Antenna 32)

The V2X communication antenna 32 is a V2X communication antenna with directivity. The directional V2X communication antenna 32 has the same features as the above-described features (I) to (VI) of the directional V2X communication antenna 31. Among the above-described features (I) to (VI) of the directional V2X communication antenna 31, a feature regarding the vehicle forward direction corresponds to a feature regarding the vehicle rearward direction of the directional V2X communication antenna 32. The directional V2X communication antenna 32 is provided at a rear portion of the vehicle 1. The directional V2X communication antenna 32 is provided rearward of the rear end of the body 33a of the driver 33 seated on the seat 8 in the vehicle front-rear direction. In FIG. 8, a plane Dr2 passing through the rear end of the body 33a of the driver 33 and being perpendicular to the vehicle front-rear direction is indicated by a linear line. The directional V2X communication antenna 32 is provided rearward of the plane Dr2 in the vehicle front-rear direction. The directional V2X communication antenna 32 is attached to an upper end portion of the rear fender 19 which is a rear surface part of the vehicle 1. When the motorcycle 1 is viewed in the vehicle upward direction or in the vehicle downward direction, the directional V2X communication antenna 32 is provided substantially at the center in the vehicle left-right direction of the vehicle 1. Furthermore, the directional V2X communication antenna 32 is provided above the wheel 3a2 of the rear wheel 3a in the vehicle up-down direction. The directional V2X communication antenna 32 is provided at a upper portion of the vehicle 1. When the vehicle 1 is viewed in the vehicle leftward direction or in the vehicle rightward direction, the directional V2X communication antenna 32 is provided above the wheel 3a2 of the rear wheel 3a in the vehicle up-down direction. When the directional V2X communication antenna 32 is in the posture of being mounted on the vehicle 1 in which the leaning vehicle body frame 7 is in the upright state, the directional V2X communication antenna 32 is provided behind the leaning vehicle body frame 7 made of metal, on the vehicle-mounted horizontal plane Pah in the vehicle front-rear direction. When the leaning vehicle body frame 7 is in the upright state or the lean state, the directional V2X communication antenna 32 is provided above the leaning vehicle body frame 7 in the up-down direction of the leaning vehicle body frame 7.

In addition to the above, when the directional V2X communication antenna 32 is in the posture of being mounted on the vehicle 1 in which the leaning vehicle body frame 7 is in the upright state, the directional V2X communication antenna 32 is provided on the vehicle-mounted horizontal plane so that the antenna metal distance W2 which is the distance between the leaning vehicle body frame 7 and the directional V2X communication antenna 32 is at least twice as long as the wavelength of the electromagnetic wave. The antenna metal distance W2 is a distance which is long enough so that the leaning vehicle body frame 7 does not affect the radiation characteristics of the directional V2X communication antenna 31. The antenna metal distance W2 may be, for example, a distance with which the 3 dB beam width of the directional V2X communication antenna 32 is not changed between a case where the leaning vehicle body frame 7 is provided and a case where the leaning vehicle body frame 7 is not provided.

(3 dB Beam Width of Directional V2X Communication Antenna of Specific Example 1)

FIG. 8 is a schematic diagram of 3 dB beam width Epv1 on a vehicle-mounted vertical plane Pav1 of the directional V2X communication antenna 31 when measurement is performed for the directional V2X communication antenna 31 that takes a posture of being mounted on the V2X communication antenna-mounted leaning vehicle 1 in which the leaning vehicle body frame 7 is in the upright state but that is not actually mounted on the V2X communication antenna-mounted leaning vehicle 1. FIG. 8 further is a schematic diagram of 3 dB beam width Epv2 on a vehicle-mounted vertical plane Pav2 of the directional V2X communication antenna 32 when measurement is performed for the directional V2X communication antenna 32 that takes a posture of being mounted on the V2X communication antenna-mounted leaning vehicle 1 in which the leaning vehicle body frame 7 is in the upright state but that is not actually mounted on the V2X communication antenna-mounted leaning vehicle 1. FIG. 9 is a schematic diagram of 3 dB beam width Eph1 on a vehicle-mounted horizontal plane Pah1 of the directional V2X communication antenna 31 when measurement is performed for the directional V2X communication antenna 31 that takes a posture of being mounted on the V2X communication antenna-mounted leaning vehicle 1 in which the leaning vehicle body frame 7 is in the upright state but that is not actually mounted on the V2X communication antenna-mounted leaning vehicle 1. Further, FIG. 9 is a schematic diagram of 3 dB beam width Eph2 on a vehicle-mounted horizontal plane Pah2 of the directional V2X communication antenna 32 when measurement is performed for the directional V2X communication antenna 32 that takes a posture of being mounted on the V2X communication antenna-mounted leaning vehicle 1 in which the leaning vehicle body frame 7 is in the upright state but that is not actually mounted on the V2X communication antenna-mounted leaning vehicle 1. In Specific Example 1, the directional V2X communication antenna 31 and the directional V2X communication antenna 32 have the same features (I) to (VI). On this account, the size of the 3 dB beam width Eph1 on the vehicle-mounted horizontal plane Pah1 of the directional V2X communication antenna 31 and the size of the 3 dB beam width Eph2 on the vehicle-mounted horizontal plane Pah2 of the directional V2X communication antenna 32 are both $\alpha°$. Furthermore, the size of the 3 dB beam width Epv1 on the vehicle-mounted vertical plane Pav1 of the directional V2X communication antenna 31 and the size of the 3 dB beam width Epv2 on the vehicle-mounted vertical plane Pav2 of the directional V2X communication antenna 32 are both $\beta°$.

(Structure of Directional V2X Communication Antenna 31)

Figure 12:
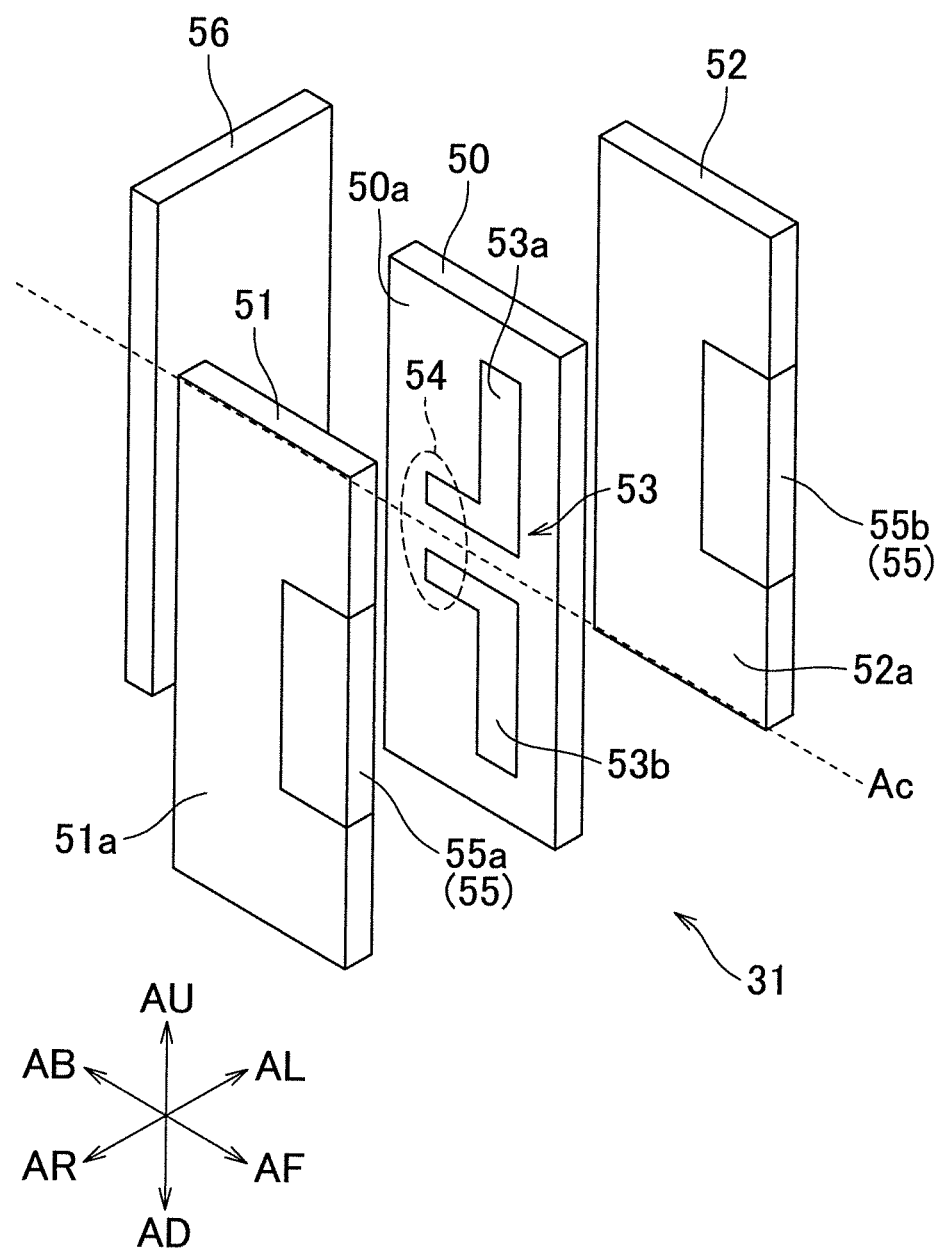
FIG. 12 is an perspective view showing an example of the directional V2X communication antenna mounted on the motorcycle of Specific Example 1.

FIG. 12 shows an example of the structure of the directional V2X communication antenna 31. Arrows AU and AD in FIG. 12 indicate an antenna upward direction and an antenna downward direction in an antenna up-down direction, respectively. Arrows AF and AB in FIG. 12 indicate an antenna forward direction and an antenna rearward direction in an antenna front-rear direction, respectively. Arrows AL and AR in FIG. 12 indicate an antenna leftward direction and an antenna rightward direction in an antenna left-right direction, respectively. The antenna up-down direction, the antenna left-right direction, and the antenna front-rear direction are orthogonal to one another. The following will describe an example of the directional V2X communication antenna 31 with reference to FIG. 12. The V2X communication antenna 32 may be structurally identical with the directional V2X communication antenna 31.

The directional V2X communication antenna 31 is provided so that, when the leaning vehicle body frame 7 is in the upright state, the antenna left-right direction is along the vehicle left-right direction, the antenna front-rear direction is along the vehicle front-rear direction, and the antenna up-down direction is along the vehicle up-down direction. The directional V2X communication antenna 31 is provided so that, when the leaning vehicle body frame 7 is in the upright state, the antenna leftward direction is identical with the vehicle leftward direction and the antenna rightward direction is identical with the vehicle rightward direction. In Specific Example 1, when the V2X communication antenna-mounted leaning vehicle 1 in which the leaning vehicle body frame 7 is in the upright state is viewed in the vehicle leftward direction or in the vehicle rightward direction, the upper end 31*u* is positioned rearward of the lower end 31*d* in the vehicle front-rear direction. In other words, the directional V2X communication antenna 31 is provided so that the antenna front-rear direction does not correspond to the vehicle up-down direction and the antenna up-down direction does not correspond to the vehicle up-down direction. In Specific Example 1, when the V2X communication antenna-mounted leaning vehicle 1 in which the leaning vehicle body frame 7 is in the upright state is viewed in the vehicle leftward direction or in the vehicle rightward direction, an angle formed between the vehicle up-down direction and a linear line passing through an upper end 31*u* and a lower end 31*d* of a substrate constituting the directional V2X communication antenna 31 is, for example, 10 degrees.

The following description is based on the assumption that the directional V2X communication antenna 32 has the same configuration as the directional V2X communication antenna 31 shown in FIG. 12. The directional V2X communication antenna 32 is provided so that, when the leaning vehicle body frame 7 is in the upright state, the antenna left-right direction is along the vehicle left-right direction, the antenna front-rear direction is along the vehicle front-rear direction, and the antenna up-down direction is along the vehicle up-down direction. The directional V2X communication antenna 32 is provided so that, when the leaning vehicle body frame 7 is in the upright state, the antenna leftward direction is identical with the vehicle rightward direction and the antenna rightward direction is identical with the vehicle leftward direction. When the V2X communication antenna-mounted leaning vehicle 1 in which the leaning vehicle body frame 7 is in the upright state is viewed in the vehicle leftward direction or in the vehicle rightward direction, the upper end of the substrate constituting the directional V2X communication antenna 32 is positioned forward of the lower end in the vehicle front-rear direction. In other words, the directional V2X communication antenna 32 is provided so that the antenna front-rear direction does not correspond to the vehicle up-down direction and the antenna up-down direction does not correspond to the vehicle up-down direction.

As shown in FIG. 12, the directional V2X communication antenna 31 includes one power-supply radiating element 53, a pair of non-power-supply radiating elements 55, and a metal plate 56 provided behind in the antenna front-rear direction of the one power-supply radiating element 53. The directional V2X communication antenna 31 includes a substrate 50, a substrate 51, and a substrate 52. The substrate 50, the substrate 51, and the substrate 52 constitute the directional V2X communication antenna 31. The substrate 50 is provided along the antenna up-down direction. The substrate 50 is rectangular in shape and is elongated in the antenna up-down direction. At least one side of the rectangular substrate 50 extends along the antenna up-down direction. The substrate 50 is arranged such that directions orthogonal to a top surface 50*a* and a bottom surface (not illustrated) correspond to the antenna left-right direction. On the top surface 50*a* and the bottom surface of the substrate 50, the power-supply radiating element 53 is provided to extend along the antenna up-down direction. The power-supply radiating element 53 is a patch antenna formed of a pair of power-supply radiating elements 53*a* and 53*b*. The power-supply radiating elements 53*a* and 53*b* are provided at an upper portion and a lower portion of the substrate 50 in the antenna up-down direction, respectively. Each of the power-supply radiating elements 53*a* and 53*b* are formed in an L-shaped along the antenna front-rear direction and the antenna up-down direction. Each of the power-supply radiating elements 53*a* and 53*b* are formed in an L-shaped so that a part extending along the antenna up-down direction is longer than a part extending along the antenna front-rear direction. The power-supply radiating elements 53*a* and 53*b* are provided to be line-symmetrical with respect to a linear line AC which passes through the center in the antenna up-down direction of the substrate 50 and is parallel to the antenna front-rear direction. Power is supplied to the power-supply radiating elements 53*a* and 53*b* from a power-supplying unit 54. The power-supply radiating element 53 is excited by the power supplied from the power-supplying unit 54. The power-supply radiating element 53 functions as an antenna. The substrate 50 is, for example, disposed to extend along the vertical direction with respect to the horizontal plane which is horizontal when the leaning vehicle body frame 7 is in a posture of being in the upright state and mounted on the V2X communication antenna-mounted leaning vehicle 1. To be more specific, when the V2X communication antenna-mounted leaning vehicle 1 in which the leaning vehicle body frame 7 is in the upright state is viewed in the vehicle leftward direction or in the vehicle rightward direction, the upper end of the substrate 50 constituting the directional V2X communication antenna 31 is positioned rearward of the lower end in the vehicle front-rear direction.

The substrates 51 and 52 are provided to extend along the substrate 50. In other words, the substrates 51 and 52 are provided to extend along the antenna up-down direction. The substrate 51 is provided to the right of the substrate 50 in the antenna left-right direction, when the V2X communication antenna 31 is viewed in the antenna rearward direction. The substrate 52 is provided to the left of the substrate 50 in the antenna left-right forward direction, when the directional V2X communication antenna 31 is viewed in the antenna forward direction or in the antenna rearward direction. The substrate 51 and the substrate 52 are formed to be identical in shape. Each of the substrate 51 and the substrate 52 is rectangular in shape and elongated in the antenna up-down direction. At least one side of each of the substrate 51 and the substrate 52 extends along the antenna up-down direction. The substrate 51 is arranged such that directions orthogonal to a top surface 51a and a bottom surface (not illustrated) corresponds to the antenna left-right direction. The substrate 52 is arranged such that directions orthogonal to a top surface 52a and a bottom surface (not illustrated) corresponds to the antenna left-right direction. The top surface 50a of the substrate 50, the bottom surface of the substrate 50, the top surface 51a of the substrate 51, the bottom surface of the substrate 51, the top surface 52a of the substrate 52, and the bottom surface of the substrate 52 are parallel to or substantially parallel to one another. The pair of non-power-supply radiating elements 55 are constituted by a pair of non-power-supply radiating elements 55a and 55b. The non-power-supply radiating elements 55a and 55b are rectangular in shape and are provided on the substrates 51 and 52. The non-power-supply radiating element 55a is provided on a surface of a part of the substrate 51 in the antenna up-down direction, which is a surface of a front-end portion in the antenna front-rear direction of the substrate 51. The non-power-supply radiating element 55b is provided on a surface of a part of the substrate 52 in the antenna up-down direction, which is a surface of a front-end portion in the antenna front-rear direction of the substrate 52. The pair of non-power-supply radiating elements 55a and 55b are provided to extend along the substrate 50. The non-power-supply radiating element 55a is provided to the right of the power-supply radiating element 53 in the antenna right-left direction, when the V2X communication antenna 31 is viewed in the antenna forward direction or in the antenna rearward direction. The non-power-supply radiating element 55b is provided to the left of the power-supply radiating element 53 in the antenna right-left direction, when the directional V2X communication antenna 31 is viewed in the antenna forward direction or in the antenna rearward direction. The paired non-power-supply radiating elements 55a and 55b are dipole antennas. The paired non-power-supply radiating elements 55a and 55b are excited as the power-supply radiating element 53 is excited by the power-supplying unit 54. The paired non-power-supply radiating elements 55a and 55b therefore function as antennas. The substrates 51 and 52 are, for example, provided to extend along the perpendicular direction relative to the horizontal plane. To be more specific, when the V2X communication antenna-mounted leaning vehicle 1 in which the leaning vehicle body frame 7 is in the upright state is viewed in the vehicle leftward direction or in the vehicle rightward direction, the upper end of each of the substrates 51 and 52 constituting the directional V2X communication antenna 31 is positioned rearward of the lower end in the vehicle front-rear direction.

The metal plate 56 which is a substrate made of metal is provided behind the power-supply radiating element 53 in the antenna front-rear direction. The metal plate 56 is independent from the substrate 50. The metal plate 56 constitutes the directional V2X communication antenna 31. The metal plate 56 is provided so that a direction orthogonal to the top surface (front surface) corresponds to the antenna front-rear direction. The metal plate 56 is provided so that its top surface (front surface) is orthogonal to the top surface 50a and the bottom surface of the substrate 50. The top surface (front surface) of the metal plate 56 may be a flat surface or a curved surface, or may have both a flat surface and a curved surface. The metal plate 56 reflects electromagnetic waves. The metal plate 56 prevents an electromagnetic wave of the power-supply radiating element 53 from being radiated in the antenna rearward direction. With this arrangement, the directional V2X communication antenna 31 suppresses radiation of an electromagnetic wave in the antenna rearward direction and radiates the electromagnetic wave in the antenna forward direction, the antenna leftward direction, and the antenna rightward direction. The metal plate 56 may not be independent from the substrate 50. The metal plate 56 may be provided at a rear end portion in the antenna front-rear direction of the substrate 50 and integrated with the substrate 50. The substrate 50 is, for example, provided to extend along the perpendicular direction relative to the horizontal plane. To be more specific, when the V2X communication antenna-mounted leaning vehicle 1 in which the leaning vehicle body frame 7 is in the upright state is viewed in the vehicle leftward direction or in the vehicle rightward direction, the upper end of the metal plate 56 constituting the directional V2X communication antenna 31 is positioned rearward of the lower end in the vehicle front-rear direction.

(Result of Simulation of Radiation Pattern of Directional V2X Communication Antenna 31)

Figure 13A:
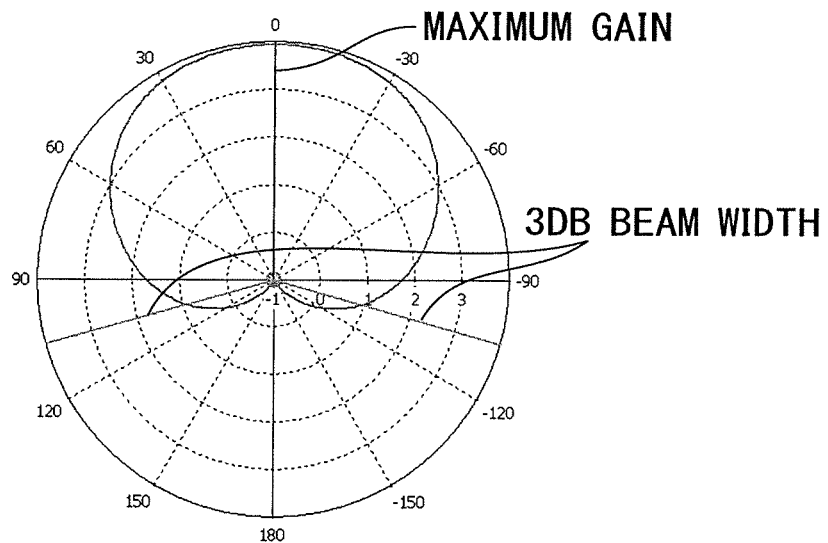
FIG. 13A shows a radiation pattern on a vehicle-mounted horizontal plane.
Figure 13B:
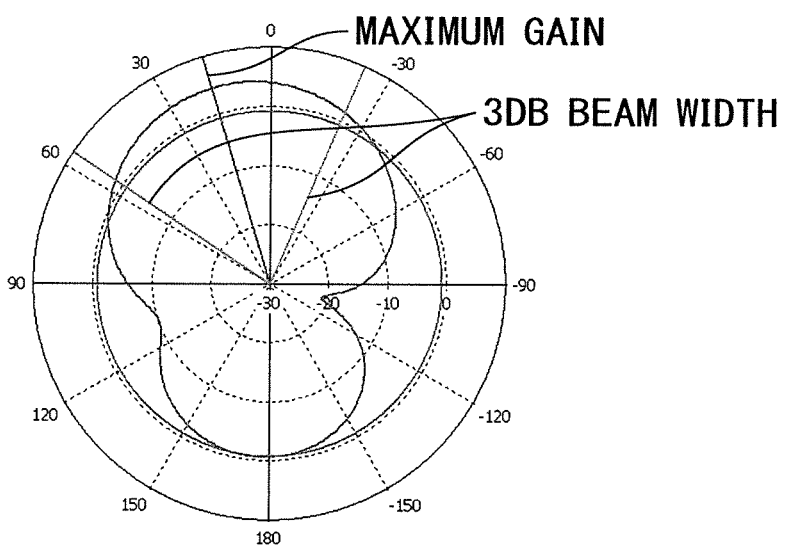
FIG. 13B shows a radiation pattern on a vehicle-mounted vertical plane.

Each of FIG. 13A and FIG. 13B shows an example of a result of simulation of a radiation pattern of the directional V2X communication antenna 31. Each of FIG. 13A and FIG. 13B shows a result of simulation of a radiation pattern of the directional V2X communication antenna 31 when measurement is performed for the directional V2X communication antenna 31 that takes a posture of being mounted on the V2X communication antenna-mounted leaning vehicle 1 in which the leaning vehicle body frame 7 is in the upright state but that is not actually mounted on the V2X communication antenna-mounted leaning vehicle 1. In FIG. 13A and FIG. 13B, the simulation was done with the assumption that the directional V2X communication antenna 31 shown in FIG. 8 was employed. The directional V2X communication antenna 31 shown in FIG. 8 is provided at a front portion of the vehicle 1. The directional V2X communication antenna 31 shown in FIG. 8 is provided so that, when the V2X communication antenna-mounted leaning vehicle 1 in which the leaning vehicle body frame 7 is in the upright state is viewed in the vehicle leftward direction or in the vehicle rightward direction, an upper end of a substrate constituting the directional V2X communication antenna 31 is rearward of a lower end of the substrate constituting the directional V2X communication antenna 31.

Figure 13C:
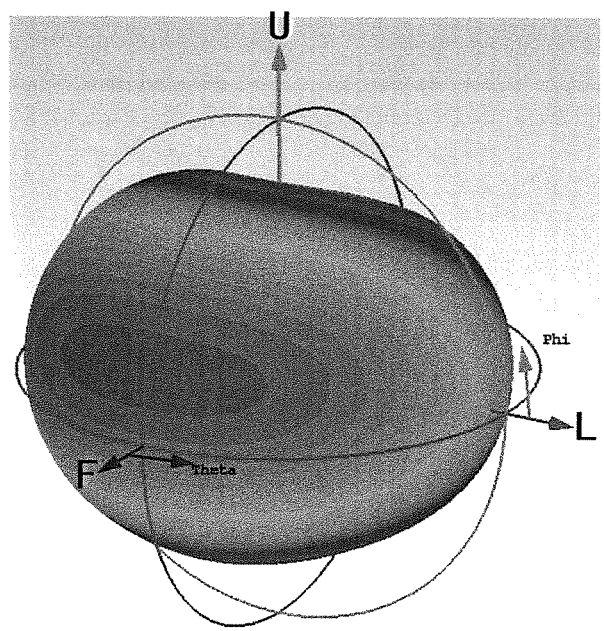
FIG. 13C is a perspective view.

FIG. 13A shows the 3 dB beam width Eph on the vehicle-mounted horizontal plane Pah of the directional V2X communication antenna 31. FIG. 13B shows the 3 dB beam width on the vehicle-mounted vertical plane Pav of the directional V2X communication antenna 31. FIG. 13C is a perspective view of the 3 dB beam width of the directional V2X communication antenna 31. In FIG. 13A, on the vehicle-mounted horizontal plane Pah, the vehicle forward direction corresponds to 0 degree, the vehicle leftward direction corresponds to 90 degrees, the vehicle rearward direction corresponds to 180 degrees, and the vehicle rightward direction corresponds to −90 degrees. In other words, the vehicle left region Al on the vehicle-mounted horizontal plane Pah shown in FIG. 13A is a range including 90 degrees and directions between 0 degree and 180 degrees. Meanwhile, the vehicle right region Ar on the vehicle-mounted horizontal plane Pah is a range including −90 degrees and directions between 0 degree and 180 degrees. In FIG. 13B, on the vehicle-mounted vertical plane Pav, the vehicle forward direction corresponds to 0 degree, the vehicle upward direction corresponds to 90 degrees, the vehicle rearward direction corresponds to 180 degrees, and the vehicle downward direction corresponds to −90 degrees. In other words, the vehicle upper region Au on the vehicle-mounted vertical plane Pav shown in FIG. 13B is a range including 90 degrees and directions between 0 degree and 180 degrees. Meanwhile, the vehicle lower region Ad on the vehicle-mounted horizontal plane Pah is a range including −90 degrees and directions between 0 degree and 180 degrees. In FIG. 13C, the vehicle upward direction is indicated by an arrow U, the vehicle leftward direction is indicated by an arrow L, and the vehicle forward direction is indicated by an arrow F. FIG. 13C shows the 3 dB beam width in a spherical coordinate system of the directional V2X communication antenna 31. In FIG. 13C a vehicle horizontal plane is indicated as Theta in the spherical coordinate system and a vehicle vertical plane is indicated as Phi in the spherical coordinate system. It is noted that color density is not related to the magnitude of radiant gain in FIG. 13C.

As shown in FIG. 13A, in the directional V2X communication antenna 31, the 3 dB beam width Eph on the vehicle-mounted horizontal plane Pah of the V2X communication antenna 31 encompasses 0 degree and is a range between +110 degrees and −110 degrees. In other words, the size α of the 3 dB beam width Eph on the vehicle-mounted horizontal plane Pah of the V2X communication antenna 31 is about 220 degrees. On the vehicle-mounted horizontal plane Pah, the maximum gain of the V2X communication antenna 31 is obtained in the direction of 0 degree. As shown in FIG. 13B, the 3 dB beam width Epv on the vehicle-mounted vertical plane Pav of the directional V2X communication antenna 31 encompasses 0 degree and is a range between about −20 degrees and 55 degrees. The size f of the 3 dB beam width Epv on the vehicle-mounted vertical plane Pav of the directional V2X communication antenna 31 is therefore about 75 degrees. On the vehicle-mounted vertical plane Pav, the maximum gain of the V2X communication antenna 31 is obtained in the direction of +20 degrees.

On this account, as shown in FIG. 13A to FIG. 13C, in the directional V2X communication antenna 31, the size α of the 3 dB beam width Eph on the vehicle-mounted horizontal plane Pah of the V2X communication antenna 31 is larger than the size β of the 3 dB beam width Epv on the vehicle-mounted vertical plane Pav of the directional V2X communication antenna 31. In other words, the directional V2X communication antenna 31 has the above-described feature (I).

As shown in FIG. 13B and FIG. 13C, the 3 dB beam width Epv on the vehicle-mounted vertical plane Pav of the directional V2X communication antenna 31 exists in both the vehicle upper region Au and the vehicle lower region Ad. In other words, the directional V2X communication antenna 31 has the above-described feature (II).

As shown in FIG. 13A and FIG. 13C, the 3 dB beam width Eph on the vehicle-mounted horizontal plane Pah of the directional V2X communication antenna 31 exists in both the vehicle left region Al and the vehicle right region Ar. In other words, the directional V2X communication antenna 31 has the above-described feature (III).

As shown in FIG. 13B and FIG. 13C, the directional V2X communication antenna 31 is arranged such that, among the 3 dB beam width Epv on the vehicle-mounted vertical plane Pav, the size (about 75 degrees) of a 3 dB beam width in the vehicle upper region Au is larger than the size (about 20 degrees) of a 3 dB beam width in the vehicle lower region Ad. In other words, the directional V2X communication antenna 31 has the above-described feature (IV).

Because of this structure, the V2X communication antenna-mounted leaning vehicle 1 of Specific Example 1 exerts the following effects in addition to the effects of the V2X communication antenna-mounted leaning vehicle 1 of First Embodiment and Second Embodiment.

The directional V2X communication antenna 31 is provided at an upper portion of the V2X communication antenna-mounted leaning vehicle 1. The upper portion of the V2X communication antenna-mounted leaning vehicle 1 is not largely occupied by metal which affects the radiation characteristics of the antenna. On this account, the V2X communication antenna-mounted leaning vehicle 1 is able to further suppress a difference in transmission and reception performances of V2X communication between the straight-traveling state and the turning state of the leaning vehicle 1, while further suppressing a difference in transmission and reception performances of V2X communication due to different mounting locations of the V2X communication antenna 31.

The V2X communication antenna-mounted leaning vehicle 1 includes one front wheel 2a. The front wheel 2a is supported by the leaning vehicle body frame 7 and includes a tire 2a1 and a wheel 2a2. The wheel 2a2 may be made of metal. Metal reflects electromagnetic waves from the antenna. In other words, metal affects the radiation characteristics of the antenna. In the V2X communication antenna-mounted leaning vehicle 1 in which the leaning vehicle body frame 7 is in the upright state, the directional V2X communication antenna 31 is provided above the wheel 2a2 in the vehicle up-down direction. The directional V2X communication antenna 31 is therefore provided at a location where the radiation characteristics of the antenna 31 is less likely to be affected by the wheel 2a2. On this account, the V2X communication antenna-mounted leaning vehicle 1 is able to further suppress a difference in transmission and reception performances of V2X communication between the straight-traveling state and the turning state of the leaning vehicle 1, while further suppressing a difference in transmission and reception performances of V2X communication due to different mounting locations of the V2X communication antenna 31.

The V2X communication antenna-mounted leaning vehicle 1 includes one rear wheel 3a. The rear wheel 3a is supported by the leaning vehicle body frame 7 and includes a tire 3a1 and a wheel 3a2. The wheel 3a2 may be made of metal. Metal reflects electromagnetic waves from the antenna. In other words, metal affects the radiation characteristics of the antenna. In the V2X communication antenna-mounted leaning vehicle 1 in which the leaning vehicle body frame 7 is in the upright state, the directional V2X communication antenna 32 is provided above the wheel 3a2 in the vehicle up-down direction. The directional V2X communication antenna 32 is therefore provided at a location where the radiation characteristics of the antenna 32 is less likely to be affected by the wheel 3a2. On this account, the V2X communication antenna-mounted leaning vehicle 1 is able to further suppress a difference in transmission and reception performances of V2X communication between the straight-traveling state and the turning state of the leaning vehicle 1, while further suppressing a difference in transmission and reception performances of V2X communication due to different mounting locations of the V2X communication antenna 32.

When the directional V2X communication antenna 31 provided at the front portion of the vehicle 1 is in the posture of being mounted on the vehicle 1 in which the leaning vehicle body frame 7 is in the upright state, the directional V2X communication antenna 31 is forward of the leaning vehicle body frame 7 (to be more specific, the head pipe 4) in the vehicle front-rear direction and is distanced from the leaning vehicle body frame 7 (to be more specific, the head pipe 4) by the antenna metal distance W1, on the vehicle-mounted horizontal plane Pah. When the directional V2X communication antenna 32 provided at the rear portion of the vehicle 1 is in the posture of being mounted on the vehicle 1 in which the leaning vehicle body frame 7 is in the upright state, the directional V2X communication antenna 32 is rearward of the leaning vehicle body frame 7 in the vehicle front-rear direction and is distanced from the leaning vehicle body frame 7 by the antenna metal distance W2, on the vehicle-mounted horizontal plane Pah. The antenna metal distances W1 and W2 are distances which are long enough so that the leaning vehicle body frame 7 does not affect the radiation characteristics of the directional V2X communication antennas 31 and 32. On this account, the V2X communication antenna-mounted leaning vehicle 1 is able to further suppress a difference in transmission and reception performances of V2X communication between the straight-traveling state and the turning state of the leaning vehicle 1, while further suppressing a difference in transmission and reception performances of V2X communication due to different mounting locations of the V2X communication antenna 31, 32.

The antenna metal distance W1, W2 is at least twice as long as the wavelengths of electromagnetic waves that the directional V2X communication antenna 31, 32 is able to transmit and receive. It is therefore possible to arrange the distance between the directional V2X communication antenna 31, 32 and the leaning vehicle body frame 7 to be long enough to prevent the leaning vehicle body frame 7 from influencing on the radiation characteristics of the directional V2X communication antenna 31, 32. On this account, the V2X communication antenna-mounted leaning vehicle 1 is able to further suppress a difference in transmission and reception performances of V2X communication between the straight-traveling state and the turning state of the leaning vehicle 1, while further suppressing a difference in transmission and reception performances of V2X communication due to different mounting locations of the V2X communication antenna 31, 32.

Specific Example 2 of First and Second Embodiments

The following will describe a V2X communication antenna-mounted leaning vehicle 1 of Specific Example 2 of First and Second Embodiments of the present teaching with reference to the schematic diagrams in FIG. 14 to FIG. 17. Specific Example 2 deals with a case where a V2X communication antenna-mounted leaning vehicle of the present teaching is applied to a motor tricycle 101. Hereinafter, the vehicle front-rear direction, the vehicle left-right direction, and the vehicle up-down direction having been described above indicate a front-rear direction, a left-right direction, and an up-down direction for a driver 133 seated on a later-described seat 108 of the motor tricycle 101, respectively. In Specific Example 2, only a directional V2X communication antenna 131 is provided at a front portion of a vehicle 1, as a V2X communication antenna.

(Structure of Motor Tricycle 101)

Figure 14:
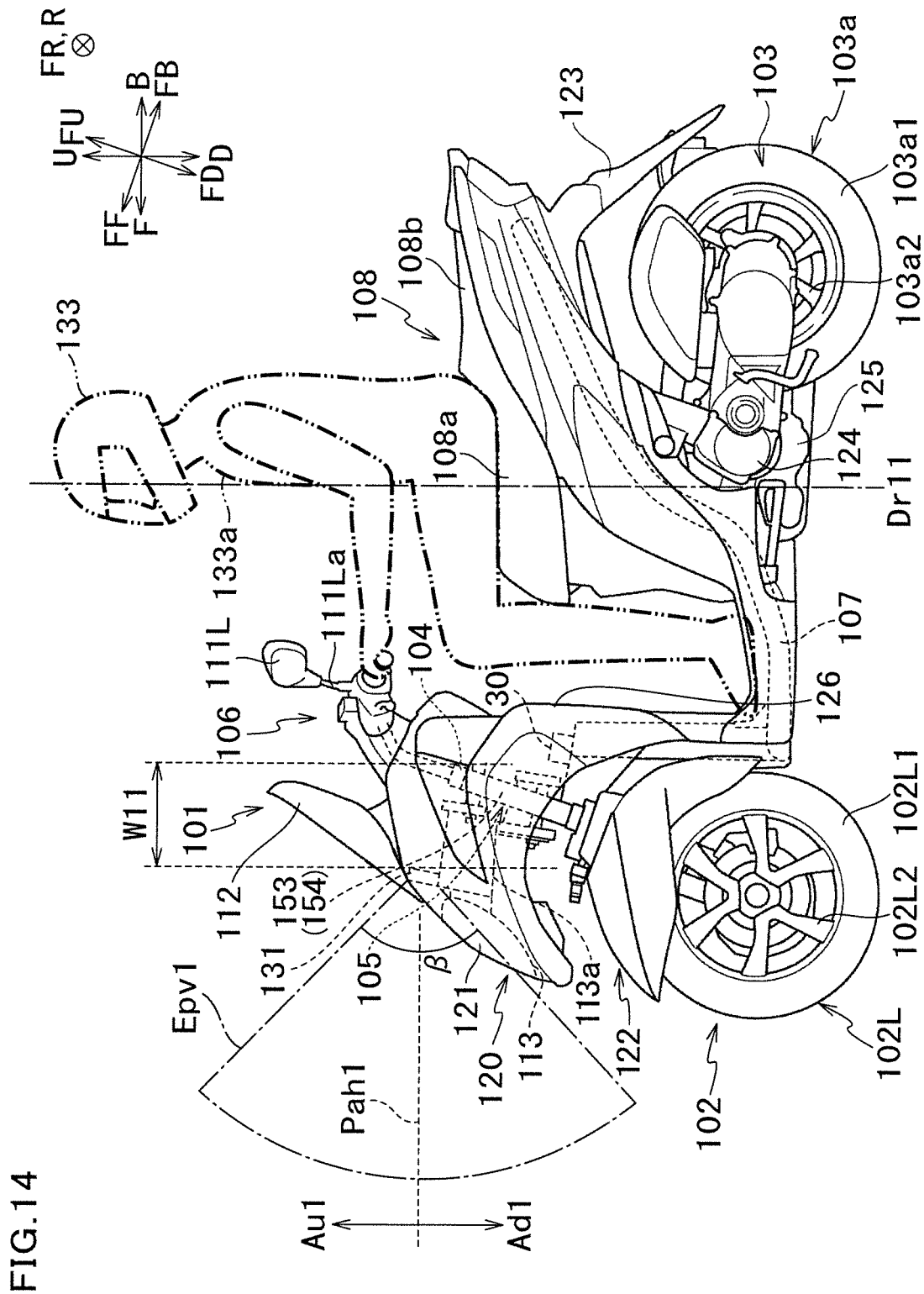
FIG. 14 is a side view showing a motor tricycle of Specific Example 2 of the embodiment of the present teaching, in which the motorcycle is viewed in the vehicle rightward direction.
Figure 15:
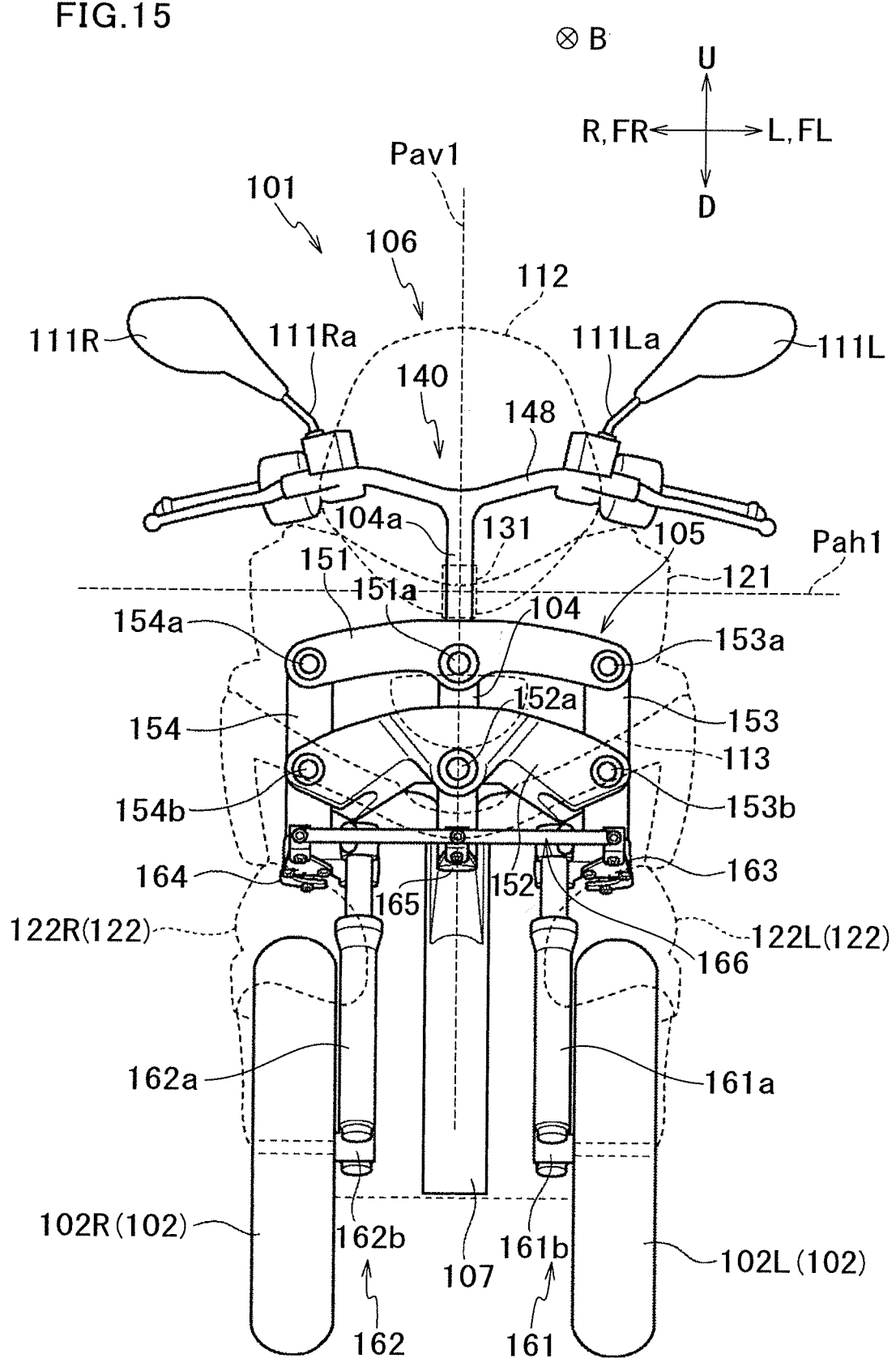
FIG. 15 is a front view of the motor tricycle of Specific Example 2, in which the motor tricycle is viewed in the vehicle rearward direction.
Figure 16:
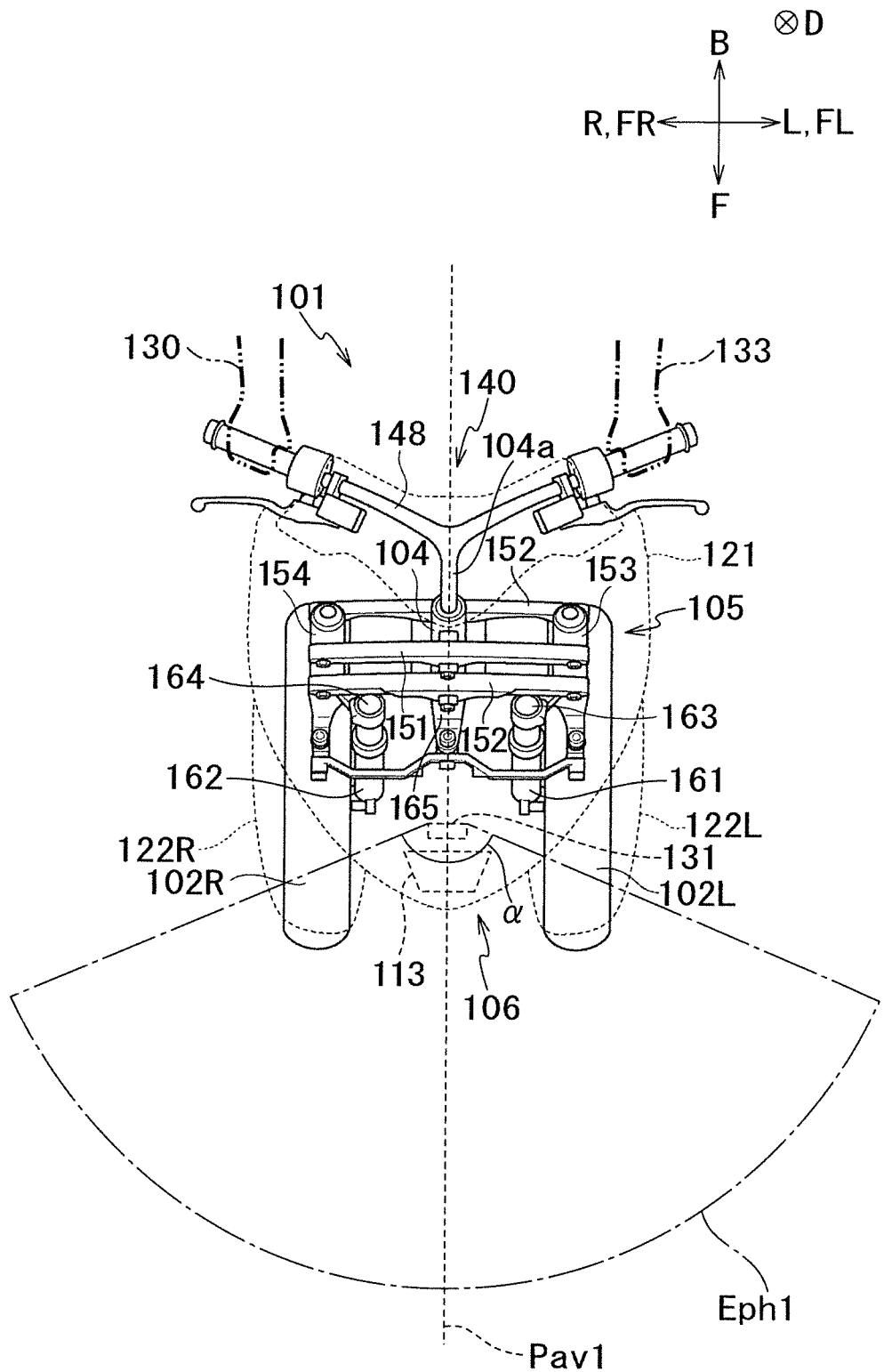
FIG. 16 is a plan view of a front portion of the motor tricycle of Specific Example 2, in which the front portion is viewed in the vehicle downward direction.
Figure 17:
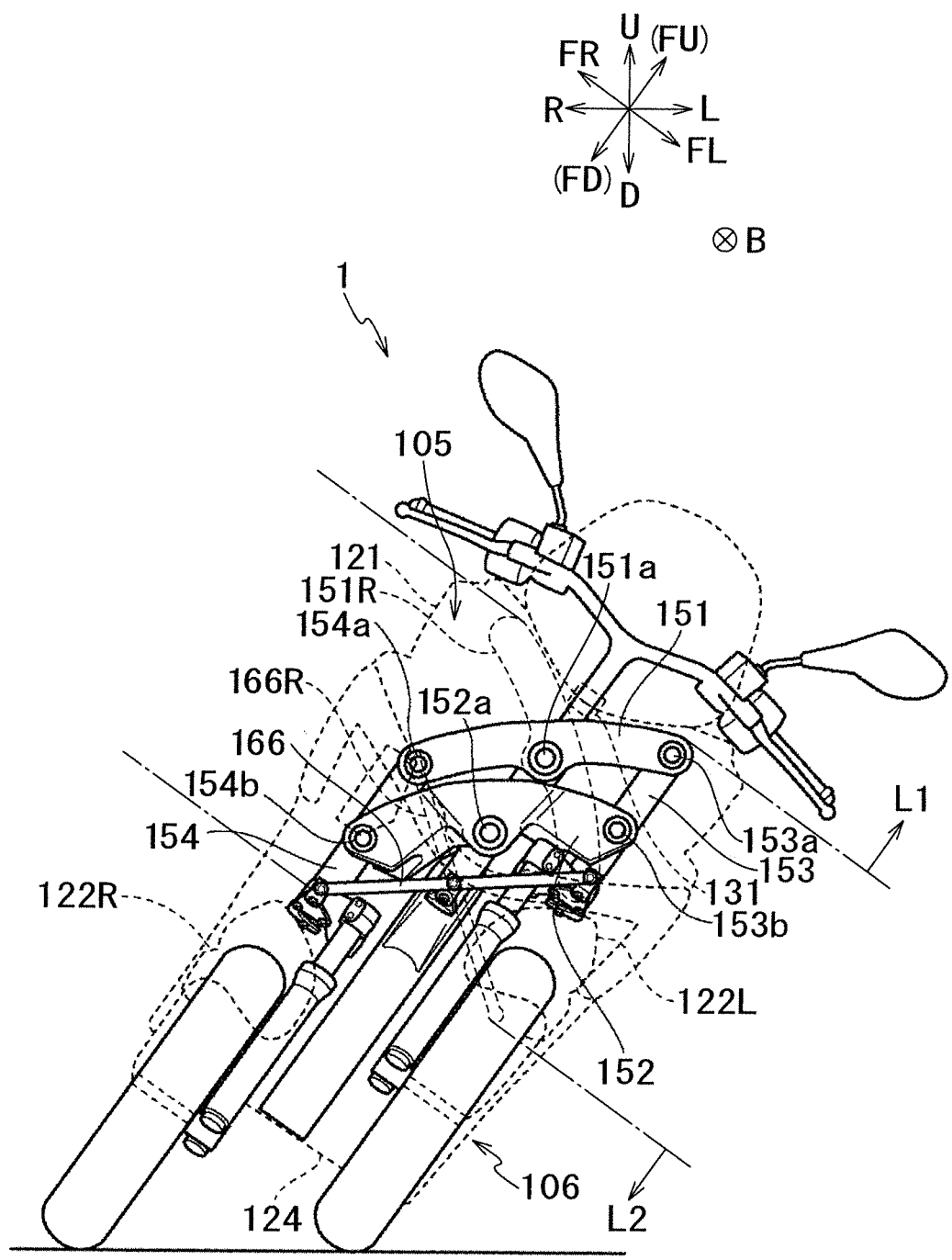
FIG. 17 is a front view in the vehicle front-rear direction of a front portion of the motor tricycle of Specific Example 2 in a left turning state.

FIG. 14 is a side view of the motor tricycle 101 of Specific Example 2. FIG. 15 is a plan view of the motor tricycle of Specific Example 2. FIG. 16 is a front view of the motor tricycle 101 of Specific Example 2. FIG. 17 is a front view of the motor tricycle 101 of Specific Example 2, which is in a turning state. In FIG. 14 to FIG. 16, the motor tricycle 101 is in an upright state on a horizontal road surface. In other words, FIG. 14 to FIG. 16 show the motor tricycle 101 in which a leaning vehicle body frame 107 is in the upright state.

The motor tricycle 101 of Specific Example 2 is a motor tricycle 101 which is able to lean. To put it differently, the motor tricycle 101 is a vehicle including the leaning vehicle body frame 107 which is able to lean and two front wheels 102L and 102R which are provided to the left of and to the right of the leaning vehicle body frame 107 in the vehicle left-right direction to be lined up.

The V2X communication antenna-mounted leaning vehicle 101 includes the leaning vehicle body frame 107, a V2X communication device 30, and a V2X communication antenna 131. The vehicle 101 turns by leaning the leaning vehicle body frame 107 in the vehicle leftward direction or in the vehicle rightward direction relative to the vehicle up-down direction. The leaning vehicle body frame 107 leans in the vehicle rightward direction when turning right and leans in the vehicle leftward direction when turning left. In FIG. 14 to FIG. 17, an arrow FF indicates a forward direction from the leaning vehicle body frame 107. An arrow FB indicates a rearward direction from the leaning vehicle body frame 107. An arrow FU indicates an upward direction from the leaning vehicle body frame 107. An arrow FD indicates a downward direction from the leaning vehicle body frame 107. An arrow FR indicates a rightward direction from the leaning vehicle body frame 107. An arrow FL indicates a leftward direction from the leaning vehicle body frame 107. In FIG. 14 to FIG. 17, an up-down direction (UFDF direction) of the leaning vehicle body frame 107 is in parallel to the axial direction of a head pipe 104 of the leaning vehicle body frame 107. A left-right direction (LFRF direction) of the leaning vehicle body frame 107 is orthogonal to a plane which passes the center in the width direction of the leaning vehicle body frame 107. A front-rear direction (FFBF direction) of the leaning vehicle body frame 107 is orthogonal to both the up-down direction (UFDF direction) of the leaning vehicle body frame 107 and the left-right direction (LFRF direction) of the leaning vehicle body frame 107. In FIG. 14 to FIG. 16, the leaning vehicle body frame 107 of the motor tricycle 101 is in an upright state on a horizontal road surface. The left-right direction of the vehicle motor tricycle 101 is therefore identical with the left-right direction of the leaning vehicle body frame 107.

As shown in FIG. 14, the motor tricycle 101 includes a front wheel unit 102, a rear wheel unit 103, a link mechanism 105, and a steering mechanism 106. The link mechanism 105 connects later-described two front wheels 102L and 102R with each other. The link mechanism 105 and the steering mechanism 106 are made of metal.

As two front wheels, the front wheel unit 102 includes a left front wheel 102L and a right front wheel 102R. The rear wheel unit 103 includes one rear wheel 103a. The front wheel unit 102 is provided at a front portion of the motor tricycle 101 in the vehicle front-rear direction. The front wheel unit 102 is provided forward of a later-described seat 108 in the vehicle front-rear direction. The rear wheel unit 103 is provided at a rear portion of the motor tricycle 101 in the vehicle front-rear direction. The rear wheel unit 103 is provided partially rearward of the later-described seat 108 in the vehicle front-rear direction. The two front wheels 102L and 102R include tires 102L1 and 102R1 and wheels 102L2 and 102R2. The rear wheel 103a includes a tire 103a1 and a wheel 103a2. The wheels 102L2 and 102R2 of the two front wheels 102L and 102R and the wheel 103a2 of the rear wheel 103a are made of metal.

The motor tricycle 101 includes the leaning vehicle body frame 107, a vehicle body cover 120, the seat 108, a rear arm 125, and a power unit 126.

A head pipe 104 is provided at a front portion of the leaning vehicle body frame 107. When the leaning vehicle body frame 107 is viewed in the left-right direction, an upper portion in the vehicle up-down direction of the head pipe 104 is located rearward of a lower portion in the vehicle up-down direction of the head pipe 104 in the front-rear direction of the leaning vehicle body frame 107. The leaning vehicle body frame 107 supports the seat 108, the rear arm 125, and the power unit 126.

The power unit 126 includes a power source such as an engine, an electric motor, or a battery and a transmission mechanism such as a transmission. Driving force generated by the power source is transmitted to the rear wheel unit 103 via the transmission mechanism. A front-end portion of the rear arm 125 is supported by the leaning vehicle body frame 107 to be swingable. A rear end portion of the rear arm 125 is supported by the rear wheel unit 103.

The vehicle body cover 120 covers members such as the leaning vehicle body frame 107 of the motor tricycle 101. The vehicle body cover 120 includes a front cover 121, two front fenders 122, a rear fender 123, and a leg shield 124.

The front cover 121 is provided forward of the seat 108 in the leaning vehicle body frame 107. The front cover 121 at least partially covers the link mechanism 105 and the steering mechanism 106. An front cover 121 is provided not to be able to be displaced with respect to the leaning vehicle body frame 107. A headlight unit 113 is attached to the front cover 121. The headlight unit 113 is supported by the later-described link mechanism 105. The headlight unit 113 is provided forward of the link mechanism 105 in the vehicle front-rear direction. The headlight unit 113 is, for example, a halogen lamp or a semiconductor light source. The headlight unit 113 emits light in the vehicle forward direction from the vehicle 101.

The two front fenders 122 are at least partially provided directly below the front cover 121 in the vehicle up-down direction. The two front fenders 122 are at least partially provided above the front wheel unit 102 in the vehicle up-down direction.

A screen 112 is provided at an upper portion of the front cover 121. The screen 112 is provided in front of a handle unit 140 in the vehicle front-rear direction. An upper portion of the front cover 121 is overlapped with the screen 112 when viewed in the vehicle forward direction or in the vehicle rearward direction. The part of the upper portion of the front cover 121, which overlaps the screen 112, is located rearward of the screen 112 in the vehicle front-rear direction. The screen 112 is made of, for example, transparent resin.

In the up-down direction of the leaning vehicle body frame 107, the front wheel unit 102 is provided below the head pipe 104. At least part of the front wheel unit 102 is provided directly below the front cover 121 in the up-down direction of the leaning vehicle body frame 107.

At least part of the rear wheel unit 103 is provided below the seat 108 in the up-down direction of the leaning vehicle body frame 107. At least part of the rear wheel unit 103 is provided directly below the rear fender 123 in the up-down direction of the leaning vehicle body frame 107.

The leg shield 124 is provided rearward of the front wheel unit 102 and forward of the seat 108 in the front-rear direction of the leaning vehicle body frame 107. The leg shield 124 is positioned to cover at least part of a leg portion of the driver 133 seated on the seat 108, when the vehicle 101 is viewed in the vehicle rearward direction.

The seat 108 includes a main seat 108a and a rear-portion seat 108b. The rear-portion seat 108b is provided behind the main seat 108a in the vehicle front-rear direction. An upper surface of the rear-portion seat 108b is located above an upper surface of the main seat 108a in the vehicle up-down direction. The driver 133 is seated on the main seat 108a. A passenger (not illustrated) is seated on the rear-portion seat 108b.

As shown in FIG. 15, the front wheel unit 102 includes the left front wheel 102L and the right front wheel 102R. The left front wheel 102L is provided leftward of the leaning vehicle body frame 107 as compared to the head pipe 104 which is part of the leaning vehicle body frame 107. The right front wheel 102R is provided rightward of the head pipe 104 in the left-right direction of the leaning vehicle body frame 107. The left front wheel 102L and the right front wheel 102R are provided to be lined up in the left-right direction of the leaning vehicle body frame 107.

The two front fenders 122 include a left fender 122L and a right fender 122R. The left fender 122L at least partially covers the top surface of the left front wheel 102L. The right fender 122R at least partially covers the top surface of the right front wheel 102R.

As shown in FIG. 14 and FIG. 15, mirror stays 111La and 111Ra are provided at a front portion in the vehicle front-rear direction of the motor tricycle 101. The mirror stays 111La and 111Ra are provided at an upper left portion and an upper right portion of the front cover 121, respectively, in the vehicle left-right direction. The mirror stays 111La and 111Ra are fixed to the front cover 121 at one ends. In the vehicle left-right direction, the mirror stays 111La and 111Ra are symmetrical about the center in the vehicle left-right direction of the vehicle 101. The mirror stays 111La and 111Ra are provided in the vicinity of left and right ends of the screen 112, respectively. The mirror stays 111La and 111Ra are made of metal or resin. Back mirrors 111L and 111R are attached to the other ends of the mirror stays 111La and 111Ra, respectively. The back mirrors 111L and 111R are provided at an upper left portion and an upper right portion of the front cover 121, respectively, in the vehicle left-right direction.

The steering mechanism 106 includes a left front fork 161, a right front fork 162, a left bracket 163, and a right bracket 164.

The left front fork 161 is fixed to an axle shaft 161b at its lower end portion. The left front wheel 102L is rotatably attached to the axle shaft 161b. The left front fork 161 is fixed to the left bracket 163 at its upper end portion. In other words, the left front fork 161 and the left bracket 163 support the left front wheel 102L via the axle shaft 161b. The left front fork 161 is a so-called telescopic cushioning mechanism. The left front fork 161 includes a front suspension 161a which is configured to absorb impact in the expansion/contraction direction. The expansion/contraction direction is identical with the up-down direction of the leaning vehicle body frame 107.

The right front fork 162 is fixed to the axle shaft 162b at its lower end portion. The right front wheel 102R is rotatably attached to the axle shaft 162b. The right front fork 162 is fixed to the right bracket 164 at its upper end portion. In other words, the right front fork 162 and the right bracket 164 support the right front wheel 102R via the axle shaft 162b. The right front fork 162 is a so-called telescopic cushioning mechanism. The right front fork 162 includes a front suspension 162a which is configured to absorb impact in the expansion/contraction direction. The expansion/contraction direction is identical with the up-down direction of the leaning vehicle body frame 107.

The steering mechanism 106 includes the handle unit 140. The handle unit 140 includes a handlebar 148 and a steering shaft 104a. The handlebar 148 is attached to an upper portion of the steering shaft 104a. The steering shaft 104a is inserted into the head pipe 104 to be rotatable about a central steering axial line which is the central axis of the steering shaft 104a. The steering shaft 104a is rotated in accordance with an operation of the handlebar 148 by the driver 133.

The link mechanism 105 is a link mechanism of a parallel four-node link (parallelogram link) type. In the up-down direction of the leaning vehicle body frame 107, the link mechanism 105 is provided below the handlebar 148. In the up-down direction of the leaning vehicle body frame 107, the link mechanism 105 is provided above the front wheel unit 102. The link mechanism 105 includes an upper cross portion 151, a lower cross portion 152, a left front wheel supporting portion 153, and a right front wheel supporting portion 154.

The upper cross portion 151 includes an upper middle connection shaft 151a. An intermediate portion in the vehicle left-right direction of the upper cross portion 151 is connected to the head pipe 104 by the upper middle connection shaft 151a. The upper cross portion 151 is rotatable about the central axial line of the upper middle connection shaft 151a with respect to the head pipe 104. The central axial line of the upper middle connection shaft 151a extends in a direction along the frame front-rear direction.

The left front wheel supporting portion 153 includes an upper left connection shaft 153a. A left end portion of the upper cross portion 151 is connected to the left front wheel supporting portion 153 by the upper left connection shaft 153a. The upper cross portion 151 is rotatable about the central axial line of the upper left connection shaft 153a with respect to the left front wheel supporting portion 153. The central axial line of the upper left connection shaft 153a extends in a direction parallel to the central axial line of the upper middle connection shaft 151a.

The right front wheel supporting portion 154 includes an upper right connection shaft 154a. A right end portion of the upper cross portion 151 is connected to the right front wheel supporting portion 154 by the upper right connection shaft 154a. The upper cross portion 151 is rotatable about the central axial line of the upper right connection shaft 154a with respect to the right front wheel supporting portion 154. The central axial line of the upper right connection shaft 154a extends in a direction parallel to the central axial line of the upper middle connection shaft 151a.

The lower cross portion 152 is provided below the upper cross portion 151 in the frame up-down direction. The lower cross portion 152 includes a lower middle connection shaft 152a. An intermediate portion of the lower cross portion 152 is connected to the head pipe 104 by the lower middle connection shaft 152a. The lower cross portion 152 is rotatable about the central axial line of the lower middle connection shaft 152a with respect to the head pipe 104. The central axial line of the lower middle connection shaft 152a extends in a direction parallel to the central axial line of the upper middle connection shaft 151a.

The left front wheel supporting portion 153 includes a lower left connection shaft 153b. A left end portion of the lower cross portion 152 is connected to the left front wheel supporting portion 153 by the lower left connection shaft 153b. The lower cross portion 152 is rotatable about the central axial line of the lower left connection shaft 153b with respect to the left front wheel supporting portion 153. The central axial line of the lower left connection shaft 153b extends in a direction parallel to the central axial line of the upper middle connection shaft 151a.

The right front wheel supporting portion 154 includes a lower right connection shaft 154b. A right end portion of the lower cross portion 152 is connected to the right front wheel supporting portion 154 by the lower right connection shaft 154b. The lower cross portion 152 is rotatable about the central axial line of the lower right connection shaft 154b with respect to the right front wheel supporting portion 154. The central axial line of the lower right connection shaft 154b extends in a direction parallel to the central axial line of the upper middle connection shaft 151a.

A lower end portion of the left front wheel supporting portion 153 is connected to an upper end portion of the left front fork 161 by the left bracket 163. An upper end portion of the left front fork 161 is fixed to the left bracket 163 so as not to be relatively rotatable. A lower end portion of the right front wheel supporting portion 154 is connected to an upper end portion of the right front fork 162 by the right bracket 164. An upper end portion of the right front fork 162 is fixed to the right bracket 164 so as not to be relatively rotatable.

When the vehicle 101 in which the leaning vehicle body frame 107 is in the upright state and stands on a horizontal road surface is viewed in the vehicle rearward direction, the upper middle connection shaft 151a and the lower middle connection shaft 152a are on linear lines parallel to the frame up-down direction and the vehicle up-down direction. When the vehicle 101 in which the leaning vehicle body frame 107 is in the upright state and stands on a horizontal road surface is viewed in the vehicle rearward direction, the upper left connection shaft 153a and the lower left connection shaft 153b are on linear lines parallel to the frame up-down direction and the vehicle up-down direction. When the vehicle 101 in which the leaning vehicle body frame 107 is in the upright state and stands on a horizontal road surface is viewed in the vehicle rearward direction, the upper right connection shaft 154a and the lower right connection shaft 154b are on linear lines parallel to the frame up-down direction and the vehicle up-down direction.

When the vehicle 101 in which the leaning vehicle body frame 107 is in the upright state and stands on a horizontal road surface is viewed in the vehicle rearward direction, the front end of the upper middle connection shaft 151a, the front end of the upper left connection shaft 153a, and the front end of the upper right connection shaft 154a are on linear lines parallel to the frame left-right direction and the vehicle left-right direction. When the vehicle 101 in which the leaning vehicle body frame 107 is in the upright state and stands on a horizontal road surface is viewed in the vehicle rearward direction, the front end of the lower middle connection shaft 152a, the front end of the lower left connection shaft 153b, and the front end of the lower right connection shaft 154b are on linear lines parallel to the frame left-right direction and the vehicle left-right direction.

The upper cross portion 151 and the lower cross portion 152 are supported by the leaning vehicle body frame 107 to be parallel to each other in posture. The left front wheel supporting portion 153 and the right front wheel supporting portion 154 are supported by the leaning vehicle body frame 107 to be parallel to each other in posture.

The left front fork 161 and the left bracket 163 support the left front wheel 102L. The right front fork 162 and the right bracket 164 support the right front wheel 102R. The upper cross portion 151, the lower cross portion 152, the left front wheel supporting portion 153, and the right front wheel supporting portion 154, which are the link mechanism 105, connect the left front wheel 102L with the right front wheel 102R. In other words, the two front wheels 102L and 102R are connected to each other by the link mechanism 105.

As shown in FIG. 15 and FIG. 16, the link mechanism 105 includes a steering force transmission rod 166. The steering force transmission rod 166 transmits steering force of the handlebar 148 operated by the driver 133 to the left bracket 163 and the right bracket 164. The steering force transmission rod 166 is provided below the lower cross portion 152 in the frame up-down direction. An intermediate portion in the frame left-right direction of the steering force transmission rod 166 is connected to a lower portion of the steering shaft 104a via an intermediate bracket 165. The intermediate bracket 165 is rotatable about a central steering shaft axis parallel to the frame up-down direction, relative to the steering shaft 104a. The steering force transmission rod 166 is rotatable together with the steering shaft 104a. The intermediate portion in the frame left-right direction of the steering force transmission rod 166 is connected to the intermediate bracket 165 via two axis components. The two axis components are an axis component having the central axial line extending in a direction along the frame up-down direction and an axis component having the central axial line extending in a direction along the frame front-rear direction. The steering force transmission rod 166 is rotatable relative to the intermediate bracket 165 about an axial line along the frame up-down direction and an axial line along the frame front-rear direction, on account of the two axis components each having the central axis at an intermediate portion in the frame left-right direction.

A left end portion of the steering force transmission rod 166 is connected to the left front wheel supporting portion 153 via the left bracket 163. The left bracket 163 is rotatable relative to the left front wheel supporting portion 153 about a left steering axial line which is parallel to the frame up-down direction. A left end portion of the steering force transmission rod 166 is connected to the left bracket 163 via two axis components. The two axis components are an axis component having the central axial line extending in a direction along the frame up-down direction and an axis component having the central axial line extending in a direction along the frame front-rear direction. The steering force transmission rod 166 is rotatable relative to the left bracket 163 about an axial line along the frame up-down direction and an axial line along the frame front-rear direction, on account of the two axis components.

A right end portion of the steering force transmission rod 166 is connected to the right front wheel supporting portion 154 via the right bracket 164. The right bracket 164 is rotatable relative to the right front wheel supporting portion 154 about a right steering axial line which is parallel to the frame up-down direction. The right end portion of the steering force transmission rod 166 is connected to the right bracket 164 via two axis components. The two axis components are an axis component having the central axial line extending in a direction along the frame up-down direction and an axis component having the central axial line extending in a direction along the frame front-rear direction. The steering force transmission rod 166 is rotatable relative to the right bracket 164 about an axial line along the frame up-down direction and an axial line along the frame front-rear direction, on account of the two axis components.

As the driver 133 rotates the steering shaft 104a about the central steering shaft axis by operating the handlebar 148, the intermediate bracket 165 rotates together with the steering shaft 104a. As a result, the steering force transmission rod 166 moves in the frame leftward direction or in the frame rightward direction. Due to this, the left bracket 163 rotates about the left steering axial line relative to the left front wheel supporting portion 153. At the same time, the right bracket 164 rotates about the right steering axial line relative to the right front wheel supporting portion 154. Due to this, the left front fork 161 rotates about the left steering axial line, and at the same time, the right front fork 161 rotates about the right steering axial line. As a result, the left front wheel 102L rotates about the left steering axial line and the right front wheel 102R rotates about the right steering axial line. In other words, the steering force transmission rod 166 is arranged to synchronize the rotation about the central steering axial line, the rotation about the left steering axial line, and the rotation about the right steering axial line with one another. Furthermore, the steering force transmission rod 166 is arranged to connect the left front wheel supporting portion 153 with the right front wheel supporting portion 154, and rotate the left front wheel 102L about the left steering axial line and rotate the right front wheel 102R about the right steering axial line at the same time, in accordance with the rotation of the handlebar 148 about the central steering axial line.

FIG. 17 shows the motor tricycle 101 when the driver 133 leans the leaning vehicle body frame 107 in the vehicle leftward direction. In the front view, the frame up-down direction is not a direction parallel to the plane of the drawing. An up-down direction (UFDF direction) of the leaning vehicle body frame 107 shown in FIG. 17 indicates an up-down direction of the leaning vehicle body frame 107 viewed in the vehicle front-rear direction. When the leaning vehicle body frame 107 leans in the vehicle leftward direction on a horizontal road surface, the head pipe 104 leans in the vehicle leftward direction relative to the vehicle up-down direction. When the head pipe 104 leans, the upper cross portion 151 rotates counterclockwise relative to the head pipe 104 about the upper middle connection shaft 151a, when the vehicle 101 is viewed in the vehicle rearward direction. At the same time, the lower cross portion 152 rotates counterclockwise relative to the head pipe 104 about the lower middle connection shaft 152*a*, when the vehicle 101 is viewed in the vehicle rearward direction. At the same time, the steering force transmission rod 166 rotates counterclockwise relative to the head pipe 104 about the intermediate bracket 165, when the vehicle 101 is viewed in the vehicle rearward direction. In other words, when the leaning vehicle body frame 107 leans in the vehicle leftward direction, the upper cross portion 151, the lower cross portion 152, and the steering force transmission rod 166 rotate counterclockwise relative to the head pipe 104, when the vehicle 101 is viewed in the vehicle rearward direction. The upper cross portion 151 therefore moves in the frame leftward direction relative to the lower cross portion 152.

As a result of this movement, the upper cross portion 151 rotates counterclockwise relative to the left front wheel supporting portion 153 and the right front wheel supporting portion 154 about the upper left connection shaft 153*a* and the upper right connection shaft 154*a*, respectively, when the vehicle 101 is viewed in the vehicle rearward direction. At the same time, the lower cross portion 152 rotates counterclockwise relative to the left front wheel supporting portion 153 and the right front wheel supporting portion 154 about the lower left connection shaft 153*b* and the lower right connection shaft 154*b*, respectively, when the vehicle 101 is viewed in the vehicle rearward direction. Consequently, the left front wheel supporting portion 153 and the right front wheel supporting portion 154 lean in the vehicle leftward direction relative to the vehicle up-down direction, while keeping the posture parallel to the head pipe 104.

The lower cross portion 152 moves in the frame leftward direction relative to the steering force transmission rod 166. Because of this movement, the steering force transmission rod 166 rotates counterclockwise by the two axis components of the intermediate bracket 165, when the vehicle 101 is viewed in the vehicle rearward direction. The steering force transmission rod 166 therefore keeps the posture parallel to the upper cross portion 151 and the lower cross portion 152.

As the left front wheel supporting portion 153 leans in the vehicle leftward direction, the left bracket 163 supported by the left front wheel supporting portion 153 leans in the vehicle leftward direction. As a result of this leaning, the left front fork 161 supported by the left bracket 163 leans in the vehicle leftward direction, too. Consequently, the left front wheel 102L supported by the left front fork 161 leans in the vehicle leftward direction while keeping the posture parallel to the head pipe 104.

As the right front wheel supporting portion 154 leans in the vehicle leftward direction, the right bracket 164 supported by the right front wheel supporting portion 154 leans in the vehicle leftward direction. As a result of this leaning, the right front fork 162 supported by the right bracket 164 leans in the vehicle leftward direction, too. Consequently, the right front wheel 102R supported by the right front fork 162 leans in the vehicle leftward direction while keeping the posture parallel to the head pipe 104.

In this way, the upper cross portion 151, the lower cross portion 152, and the steering force transmission rod 166 move leftward and downward in the vehicle left-right direction and in the vehicle up-down direction, without leaning in the vehicle leftward direction or the vehicle rightward direction. At the same time, the left front wheel supporting portion 153 and the right front wheel supporting portion 154 lean in the vehicle leftward direction by the same angle as the leaning vehicle body frame 107. For this reason, the leaning vehicle body frame 107 leans in the vehicle leftward direction while both of the front wheel 102L and the front wheel 102R are in contact with the road surface.

When the leaning vehicle body frame 107 leans in the vehicle rightward direction on a horizontal road surface, the movement of the motor tricycle 101 is symmetrical in the left-right direction with the above-described movement of the motor tricycle 101 when the leaning vehicle body frame 107 leans in the vehicle leftward direction on the horizontal road surface. In FIG. 17, the relative positions of the upper cross portion 151R and the steering force transmission rod 166R when the leaning vehicle body frame 107 leans in the vehicle rightward direction on the horizontal road surface are indicated by dotted lines. In the up-down direction of the leaning vehicle body frame 107, the upper cross portion 151 of the link mechanism 105 is included in an upper end portion of the link mechanism 105. In the up-down direction of the leaning vehicle body frame 107, the steering force transmission rod 166 of the link mechanism 105 is included in a lower end portion of the link mechanism 105. When the vehicle 101 is viewed in the vehicle rearward direction, a range above the link mechanism 105 in the leaning vehicle body frame 107 is above a linear line L1 indicated by one-dot chain line in FIG. 17. In other words, the range above the link mechanism 105 in the leaning vehicle body frame 107 is above the movable range of the upper cross portion 151 included in the upper end portion of the link mechanism 105 in the leaning vehicle body frame 107. When the vehicle 101 is viewed in the vehicle rearward direction, a range below the link mechanism 105 in the leaning vehicle body frame 107 is below a linear line L2 indicated by a one-dot chain line in FIG. 17 in the leaning vehicle body frame 107. In other words, the range below the link mechanism 105 in the leaning vehicle body frame 107 is below the movable range of the steering force transmission rod 166 included in the lower end portion of the link mechanism 105 in the leaning vehicle body frame 107.

(V2X Communication Device)

The V2X communication device 30 is electrically connected to the V2X communication antenna 131. The V2X communication device 30 performs the V2X communication while the leaning vehicle body frame 107 is turning left and leans in the vehicle leftward direction and while the leaning vehicle body frame 107 is turning right and leans in the vehicle rightward direction. The V2X communication device 30 performs the V2X communication while the leaning vehicle body frame 107 is in the upright state, too.

(Location of Directional V2X Communication Antenna 131)

As shown in FIGS. 14 to 17, the directional V2X communication antenna 131 is provided forward of the front end of the body 133*a* of the driver 133 seated on the seat 108, in the vehicle front-rear direction. In FIG. 14, a plane Dr11 passing through the front end of the body 133*a* of the driver 133 and being perpendicular to the vehicle front-rear direction is indicated by a linear line. The directional V2X communication antenna 131 is provided forward of the plane Dr11 in the vehicle front-rear direction. The directional V2X communication antenna 131 is provided rearward of the front cover 121 in the vehicle front-rear direction. To be more specific, the directional V2X communication antenna is attached to a stay 113*a* via a fixing tool. The stay 113*a* is used for fixing, to the head pipe 104, the headlight unit 113 attached to the front cover 121. When the vehicle 101 is viewed in the vehicle upward direction or in the vehicle downward direction, the directional V2X communication antenna 131 is provided substantially at the center in the vehicle left-right direction of the vehicle 101. Furthermore, the directional V2X communication antenna 131 is provided above the wheels 102L2 and 102R2 of the front wheels 102L and 102R in the vehicle up-down direction. The directional V2X communication antenna 131 is provided at an upper portion of the vehicle 101. The directional V2X communication antenna 131 is provided forward of the head pipe 104, the link mechanism 105, and the steering mechanism 106 which are made of metal, in the vehicle front-rear direction. In other words, the directional V2X communication antenna 131 is provided rearward of the vehicle body cover 120 in the vehicle front-rear direction. The directional V2X communication antenna 131 is provided between the inner surface of the vehicle body cover 120 and the link mechanism 105 which is provided inside the vehicle body cover 120 and made of metal. To be more specific, when the directional V2X communication antenna 131 is in the posture of being mounted on the motor tricycle 101 in which the leaning vehicle body frame 107 is in the upright state, the directional V2X communication antenna 131 is provided in front of the link mechanism 105 on the vehicle-mounted horizontal plane Pah, in the vehicle front-rear direction. Furthermore, when the directional V2X communication antenna 131 is in the posture of being mounted on the motor tricycle 101 in which the leaning vehicle body frame 107 is in the upright state, the directional V2X communication antenna 131 is provided on the vehicle-mounted horizontal plane Pah so that the antenna metal distance W11 which is the distance between the link mechanism 105 and the directional V2X communication antenna 131 is at least twice as long as the wavelength of an electromagnetic wave. The antenna metal distance W11 is a distance which is long enough so that the link mechanism 105 does not affect the radiation characteristics of the directional V2X communication antenna 131. When the leaning vehicle body frame 107 is in the upright state or the lean state, the directional V2X communication antenna 131 is provided above the link mechanism 105 in the up-down direction of the leaning vehicle body frame 107. In other words, when viewed in the front-rear direction of the leaning vehicle body frame 107, the directional V2X communication antenna 131 is provided in the range above the linear line L1 in the up-down direction of the leaning vehicle body frame 107.

The directional V2X communication antenna 131 is not explained because it is substantially identical with the directional V2X communication antenna 31.

Because the motor tricycle 101 of Specific Example 2 is arranged as described above, the following effects are exerted in addition to the effects of the motorcycle 1 of the embodiment described above and the effects of the motorcycle 1 of Specific Example 1.

The V2X communication antenna-mounted leaning vehicle 101 includes the link mechanism 105. The link mechanism 105 is supported by the leaning vehicle body frame 107 and connects at least two front wheels with each other. The link mechanism 105 may be made of metal. Metal reflects electromagnetic waves from the antenna. For this reason, when the link mechanism 105 is made of metal, the link mechanism 105 affects the radiation characteristics of an antenna. The directional V2X communication antenna 131 is provided above the link mechanism 105 in the leaning vehicle body frame 107, when the V2X communication antenna-mounted leaning vehicle 101 in which the leaning vehicle body frame 107 is in the upright state or in the lean state is viewed in the vehicle forward direction or in the vehicle rearward direction. Furthermore, when the directional V2X communication antenna 131 provided in the front portion of the vehicle 101 is in the posture of being mounted on the motor tricycle 101 in which the leaning vehicle body frame 107 is in the upright state, the directional V2X communication antenna 131 is provided forward of the link mechanism 105 on the vehicle-mounted horizontal plane Pah1, in the vehicle front-rear direction. The directional V2X communication antenna 131 is therefore provided at a location where the radiation characteristics of the antenna 131 is less likely to be affected by the link mechanism 105. On this account, the V2X communication antenna-mounted leaning vehicle 101 is able to further suppress a difference in transmission and reception performances of V2X communication between the straight-traveling state and the turning state of the leaning vehicle 101, while further suppressing a difference in transmission and reception performances of V2X communication due to different mounting locations of the V2X communication antenna 131.

When the directional V2X communication antenna 131 provided in the front portion of the vehicle 101 is in the posture of being mounted on the motor tricycle 101 in which the leaning vehicle body frame 107 is in the upright state, the directional V2X communication antenna 131 is provided forward of the link mechanism 105 and distanced from the link mechanism 105 by the antenna metal distance W11 on the vehicle-mounted horizontal plane Pah1, in the vehicle front-rear direction. The antenna metal distance W11 is a distance which is long enough so that the link mechanism 105 does not affect the radiation characteristics of the directional V2X communication antenna 131. The antenna metal distance may be, for example, a distance with which the 3 dB beam width of the directional V2X communication antenna 131 is not changed between a case where the link mechanism 105 is provided and a case where the link mechanism 105 is not provided. On this account, the V2X communication antenna-mounted leaning vehicle 101 is able to further suppress a difference in transmission and reception performances of V2X communication between the straight-traveling state and the turning state of the leaning vehicle 101, while further suppressing a difference in transmission and reception performances of V2X communication due to different mounting locations of the V2X communication antenna 131.

Preferred embodiments of the present teaching have been described above. However, the present teaching is not limited to the above-described embodiments, and various changes can be made within the scope of the claims. Further, modifications described below may be used in combination as needed.

Figure 18:
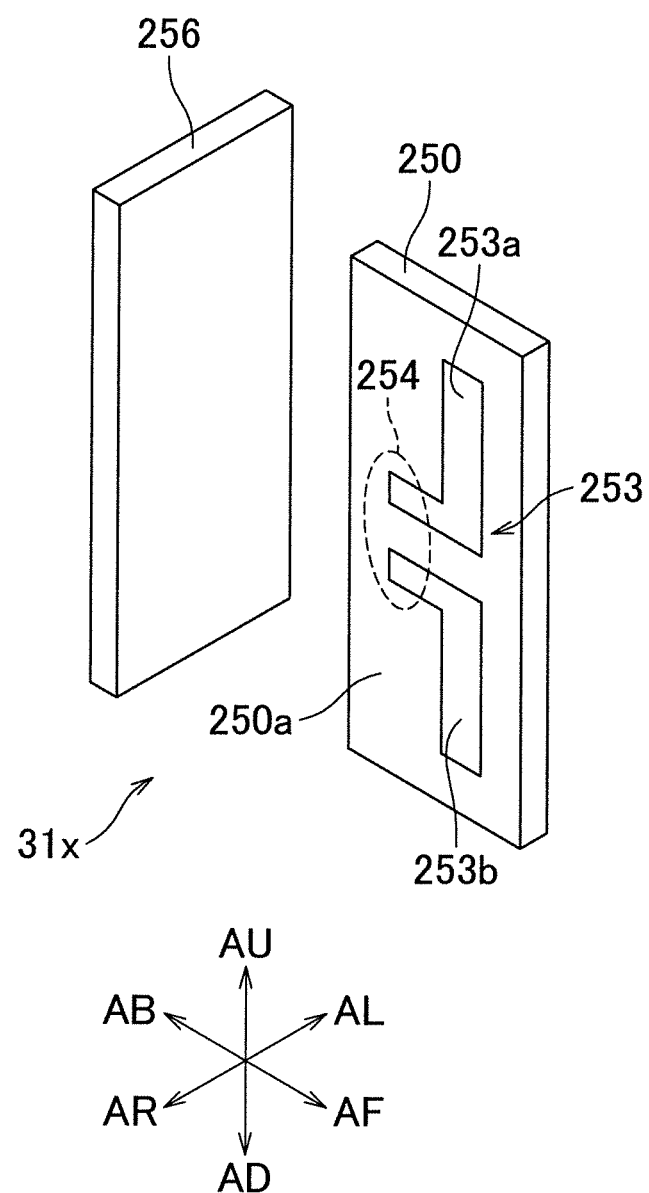
FIG. 18 is a perspective view showing a directional V2X communication antenna mounted on a V2X communication antenna-mounted leaning vehicle of a modification.

The directional V2X communication antenna 31 may not be arranged as shown in FIG. 12. The directional V2X communication antenna 31 may be differently arranged as long as it has the above-described features (I) to (III). The following will describe a directional V2X communication antenna 31x which is another example of the directional V2X communication antenna 31, with reference to FIG. 18. An arrow AU, an arrow AD, an arrow AF, an arrow AB, an arrow AL, and an arrow AR in FIG. 18 are identical with the arrows AU, AD, AF, AB, and AL shown in FIG. 12, and are not explained here. The directional V2X communication antenna 31x is provided so that, when the leaning vehicle body frame 7 is in the upright state, the antenna left-right direction is along the vehicle left-right direction, the antenna front-rear direction is along the vehicle front-rear direction, and the antenna up-down direction is along the vehicle up-down direction. The directional V2X communication antenna 31x is provided so that, when the leaning vehicle body frame 7 is in the upright state, the antenna leftward direction is identical with the vehicle leftward direction and the antenna rightward direction is identical with the vehicle rightward direction. The directional V2X communication antenna 31x is provided so that, when the V2X communication antenna-mounted leaning vehicle 1 in which the leaning vehicle body frame 7 is in the upright state is viewed in the vehicle leftward direction or in the vehicle rightward direction, an upper end of a substrate constituting the directional V2X communication antenna 31x is at the same position as a lower end of the substrate constituting the directional V2X communication antenna 31x in the vehicle front-rear direction. The directional V2X communication antenna 31x may be provided so that, when the V2X communication antenna-mounted leaning vehicle 1 in which the leaning vehicle body frame 7 is in the upright state is viewed in the vehicle leftward direction or in the vehicle rightward direction, the upper end of the substrate constituting the directional V2X communication antenna 31x is rearward of the lower end of the substrate constituting the directional V2X communication antenna 31x in the vehicle front-rear direction.

A directional V2X communication antenna 32 provided at a rear portion of the vehicle 1 may be structurally identical with the directional V2X communication antenna 31x shown in FIG. 18. In this case, the directional V2X communication antenna 32 (31x) is provided so that, when the leaning vehicle body frame 7 is in the upright state, the antenna left-right direction is along the vehicle left-right direction, the antenna front-rear direction is along the vehicle front-rear direction, and the antenna up-down direction is along the vehicle up-down direction. The directional V2X communication antenna 32(31x) is provided so that, when the leaning vehicle body frame 7 is in the upright state, the antenna leftward direction is identical with the vehicle leftward direction and the antenna rightward direction is identical with the vehicle rightward direction. The directional V2X communication antenna 32 (31x) is provided so that, when the V2X communication antenna-mounted leaning vehicle 1 in which the leaning vehicle body frame 7 is in the upright state is viewed in the vehicle leftward direction or in the vehicle rightward direction, an upper end of a substrate constituting the directional V2X communication antenna 32 (31x) is at the same position as a lower end of the substrate constituting the directional V2X communication antenna 32 (31x). The directional V2X communication antenna 32 (31x) may be provided so that, when the V2X communication antenna-mounted leaning vehicle 1 in which the leaning vehicle body frame 7 is in the upright state is viewed in the vehicle leftward direction or in the vehicle rightward direction, the upper end of the substrate constituting the directional V2X communication antenna 32 (31x) is forward of the lower end of the substrate constituting the directional V2X communication antenna 32 (31x) in the vehicle front-rear direction.

As shown in FIG. 18, the directional V2X communication antenna 31x includes one power-supply radiating element 253 and a metal plate 256 which is provided behind the one power-supply radiating element 253 in the antenna front-rear direction. The directional V2X communication antenna 31 include a substrate 250. The substrate 250 is provided to extend along the antenna up-down direction. The substrate 250 is rectangular in shape and is elongated in the antenna up-down direction. At least one side of the rectangular substrate 250 extends along the antenna up-down direction. The substrate 250 is arranged such that a direction which orthogonally intersects with a top surface 250a and a bottom surface (not illustrated) corresponds to the vehicle left-right direction. On the top surface 250a and the bottom surface (not illustrated) of the substrate 250, the power-supply radiating element 253 is provided to extend along the substrate 250. The power-supply radiating element 253 is a patch antenna formed of a pair of power-supply radiating elements 253a and 253b. The power-supply radiating elements 253a and 253b are provided at an upper portion and a lower portion of the substrate 250, respectively. Each of the power-supply radiating elements 253a and 253b is L-shaped and extends along the antenna front-rear direction and the antenna up-down direction. Each of the power-supply radiating elements 253a and 253b is L-shaped so that a part extending along the antenna up-down direction is longer than a part extending along the antenna front-rear direction. The paired power-supply radiating elements 253a and 253b are provided to be line-symmetrical with respect to a linear line which passes through the center in the antenna up-down direction of the substrate 250 and is parallel to the antenna front-rear direction. Power is supplied to the power-supply radiating elements 253a and 253b from a power-supplying unit 254. The power-supply radiating element 253 is excited by the power supplied from the power-supplying unit 254. The power-supply radiating element 253 functions as an antenna. The substrate 250 is disposed so that the antenna up-down direction is perpendicular to the vehicle-mounted horizontal plane.

A metal plate 256 is provided rearward of the power-supply radiating element 253 in the antenna front-rear direction. The metal plate 256 is independent from the substrate 250. The metal plate 256 is arranged such that a direction orthogonal to the top surface (front surface) corresponds to the antenna front-rear direction. The metal plate 256 is provided so that its top surface (front surface) is orthogonal to the top surface 250a and the bottom surface of the substrate 250. The top surface (front surface) of the metal plate 256 may be a flat surface, a curved surface, or a flat surface and a curved surface. The metal plate 256 reflects electromagnetic waves. The metal plate 256 prevents an electromagnetic wave of the power-supply radiating element 253 from being radiated in the antenna rearward direction. With this arrangement, the directional V2X communication antenna 31x suppresses radiation of an electromagnetic wave in the antenna rearward direction, and radiates electromagnetic waves in the antenna forward direction, the antenna leftward direction, and the antenna rightward direction. The metal plate 256 may not be independent from the substrate 250. The metal plate 256 may be provided at a rear end portion in the antenna front-rear direction of the substrate 250 and integrated with the substrate 250. The metal plate 256 is disposed so that the antenna up-down direction is perpendicular to the vehicle-mounted horizontal plane.

A result of simulation of radiation characteristics of the directional V2X communication antenna 31x with different sizes of the metal plate 256 relative to the power-supply radiating element 253 will be described with reference to FIG. 19 to FIG. 22. V2X communication antennas 31xa to 31xd shown in FIG. 19A to FIG. 22A are examples of the V2X communication antenna 31x. Each of FIG. 19A to FIG. 22A shows one power-supply radiating element 253 and one metal plate 256 when each of the V2X communication antennas 31xa to 31xd is viewed in the antenna rearward direction. FIG. 19B to FIG. 22B show the radiation characteristics of the V2X communication antennas 31x on the vehicle-mounted horizontal plane. In FIG. 19B to FIG. 22B, on the vehicle-mounted horizontal plane, the vehicle forward direction corresponds to 0 degree, the vehicle leftward direction corresponds to 90 degrees, the vehicle rearward direction corresponds to 180 degrees, and the vehicle rightward direction corresponds to −90 degrees. In other words, the vehicle left region on the vehicle-mounted horizontal plane shown in FIG. 19B to FIG. 22B is a range including 90 degrees and directions between 0 degree and 180 degrees. Meanwhile, the vehicle right region on the vehicle-mounted horizontal plane is a range including −90 degrees and directions between 0 degree and 180 degrees. FIG. 19B to FIG. 22C show the radiation characteristics of the V2X communication antennas 31xa to 31xd on the vehicle-mounted horizontal plane and the vehicle-mounted vertical plane. In FIG. 19C to FIG. 22C, the vehicle upward direction is indicated by an arrow U, the vehicle leftward direction is indicated by an arrow L, and the vehicle forward direction is indicated by an arrow F. FIG. 19C to FIG. 22C show the 3 dB beam width in a spherical coordinate system of the directional V2X communication antenna 31. In FIG. 19C to FIG. 22C, a vehicle horizontal plane is indicated as Theta in the spherical coordinate system and a vehicle vertical plane is indicated as Phi in the spherical coordinate system. It is noted that color density is not related to the magnitude of radiation gain in FIG. 19C to FIG. 22C.

Figure 19A:
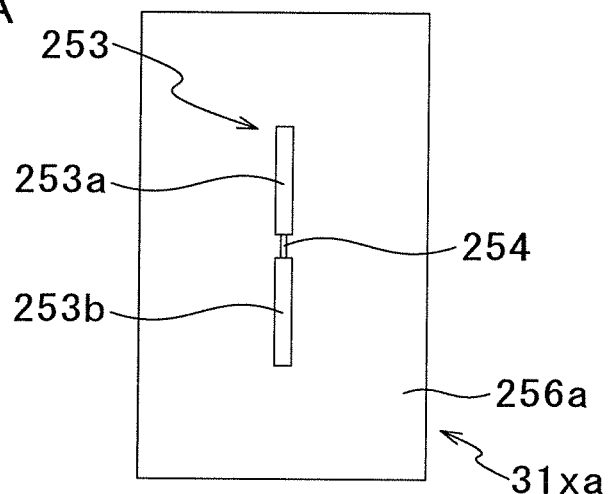
FIGS. 19A to 19C show a first example in which the size of a metal plate of the directional V2X communication antenna shown in FIG. 18 is changed.
Figure 19B:
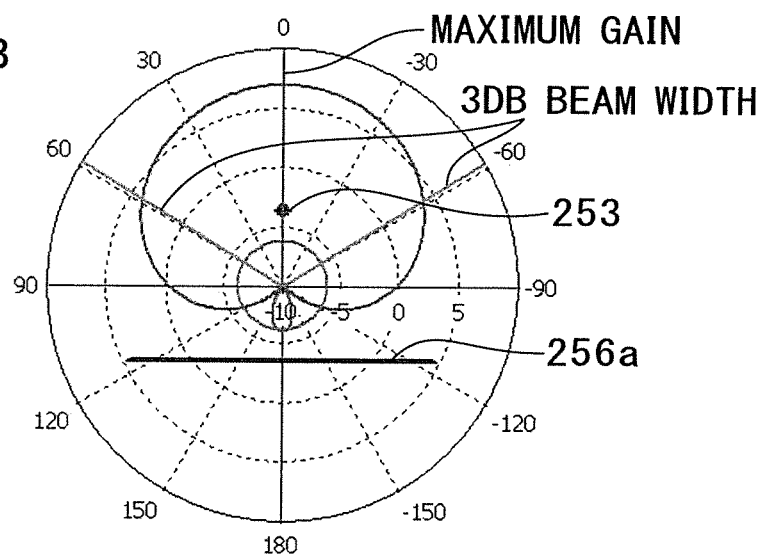
Figure 19C:
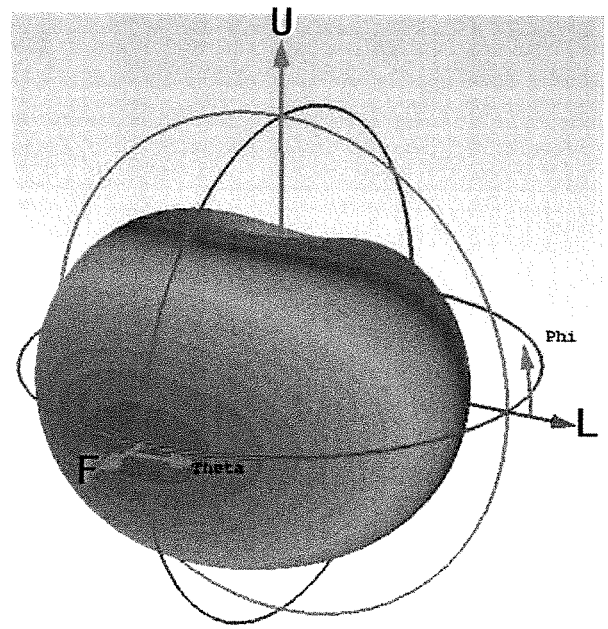

As shown in FIG. 19A and FIG. 19B, when the V2X communication antenna 31xa is viewed in the antenna rearward direction, the V2X communication antenna 31xa is arranged so that the power-supply radiating element 253 overlaps the metal plate 256a. Furthermore, when the V2X communication antenna 31xa is viewed in the antenna rearward direction, the V2X communication antenna 31xa is arranged so that the area of the metal plate 256a is large as compared to the area of one power-supply radiating element 253. As shown in FIG. 19B, the 3 dB beam width of the V2X communication antenna 31xa on the vehicle-mounted horizontal plane is about 60 degrees to −60 degrees. On the vehicle-mounted horizontal plane, the maximum gain of the V2X communication antenna 31xa is obtained at 0 degree. As shown in FIG. 19B, the 3 dB beam width on the vehicle-mounted horizontal plane of the V2X communication antenna 31xa exists both in the vehicle left region and in the vehicle right region. As shown in FIG. 19C, the 3 dB beam width on the vehicle-mounted horizontal plane of the directional V2X communication antenna 31xa is larger than the 3 dB beam width on the vehicle-mounted vertical plane of the directional V2X communication antenna 31xa. Furthermore, the 3 dB beam width on the vehicle-mounted vertical plane of the directional V2X communication antenna 31xa exists both in the vehicle upper region and in the vehicle lower region.

Figure 20A:
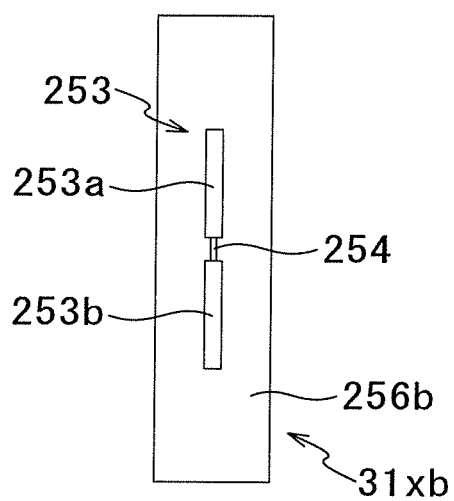
FIGS. 20A to 20C show a second example in which the size of the metal plate of the directional V2X communication antenna shown in FIG. 18 is changed.
Figure 20B:
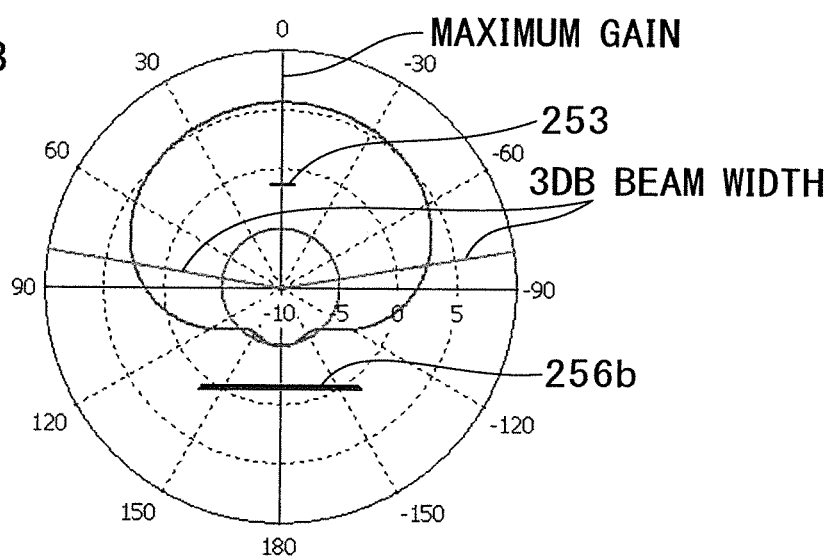
Figure 20C:
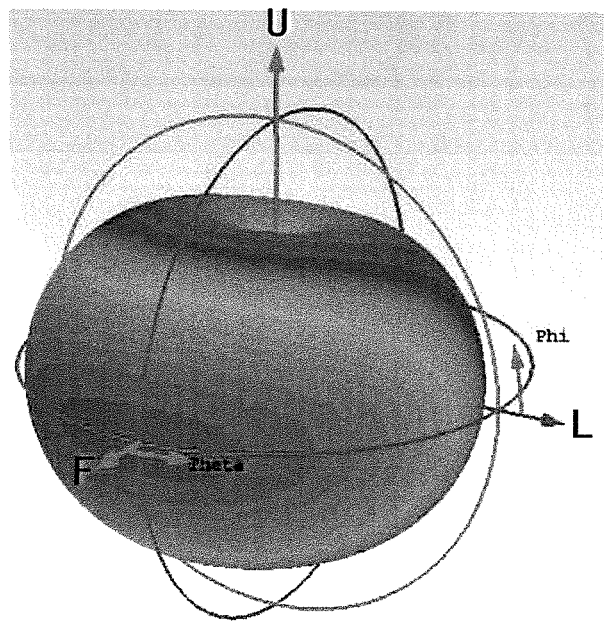

As shown in FIG. 20A and FIG. 20B, when the V2X communication antenna 31xb is viewed in the antenna rearward direction, the V2X communication antenna 31xb is arranged so that the power-supply radiating element 253 overlaps the metal plate 256b. Furthermore, when the V2X communication antenna 31xb is viewed in the antenna rearward direction, the V2X communication antenna 31xb is arranged so that the area of the metal plate 256b is large as compared to the area of one power-supply radiating element 253. The metal plate 256 shown in FIG. 20A, however, is smaller than the metal plate 256a shown in FIG. 19A. As shown in FIG. 20B, the 3 dB beam width of the V2X communication antenna 31xb on the vehicle-mounted horizontal plane is about 80 degrees to −80 degrees. On the vehicle-mounted horizontal plane, the maximum gain of the V2X communication antenna 31xb is obtained at 0 degree. As shown in FIG. 20B, the 3 dB beam width on the vehicle-mounted horizontal plane of the V2X communication antenna 31xb exists both in the vehicle left region and in the vehicle right region. As shown in FIG. 20C, the 3 dB beam width on the vehicle-mounted horizontal plane of the directional V2X communication antenna 31xb is larger than the 3 dB beam width on the vehicle-mounted vertical plane of the directional V2X communication antenna 31xb. Furthermore, the 3 dB beam width on the vehicle-mounted vertical plane of the directional V2X communication antenna 31xb exists both in the vehicle upper region and in the vehicle lower region.

Figure 21A:
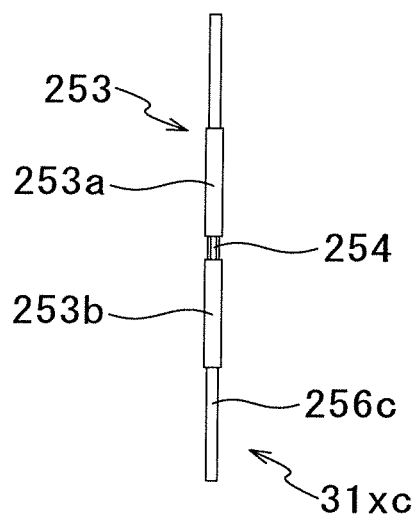
FIGS. 21A to 21C show a third example in which the size of the metal plate of the directional V2X communication antenna shown in FIG. 18 is changed.
Figure 21B:
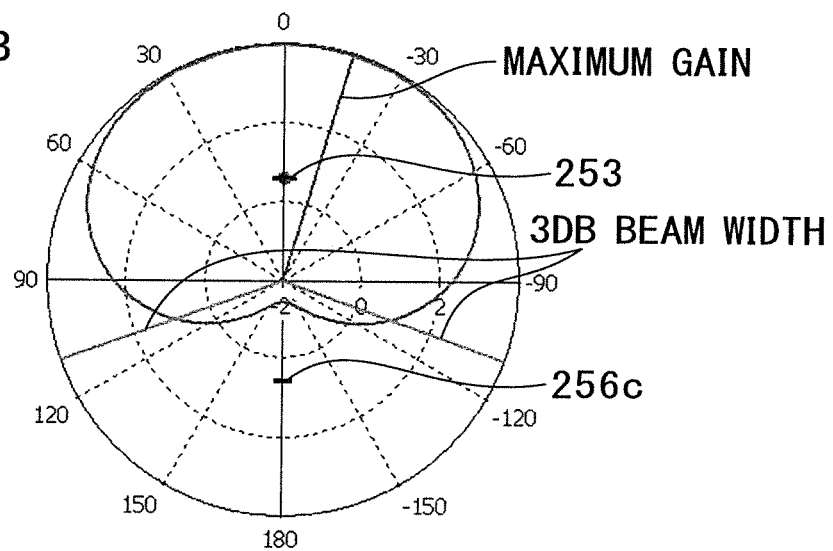
Figure 21C:
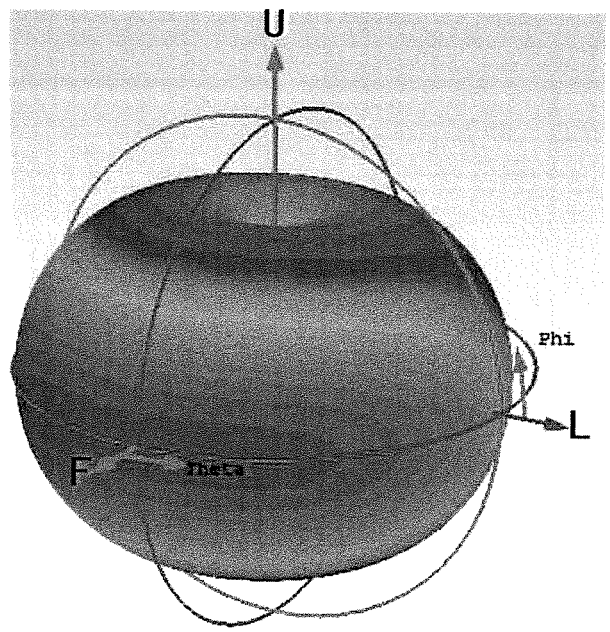

As shown in FIG. 21A and FIG. 21B, when the V2X communication antenna 31xc is viewed in the antenna rearward direction, the V2X communication antenna 31xc is arranged so that the power-supply radiating element 253 partially overlaps the metal plate 256c. Furthermore, when the V2X communication antenna 31xc is viewed in the antenna rearward direction, the V2X communication antenna 31xc is arranged so that the area of the metal plate 256c is more or less identical with the area of one power-supply radiating element 253. As shown in FIG. 21B, the 3 dB beam width of the V2X communication antenna 31xc on the vehicle-mounted horizontal plane is about 110 degrees to −110 degrees. On the vehicle-mounted horizontal plane, the maximum gain of the V2X communication antenna 31xc is obtained at 15 degrees. As shown in FIG. 21B, the 3 dB beam width on the vehicle-mounted horizontal plane of the V2X communication antenna 31xc exists both in the vehicle left region and in the vehicle right region. As shown in FIG. 21C, the 3 dB beam width on the vehicle-mounted horizontal plane of the directional V2X communication antenna 31xc is larger than the 3 dB beam width on the vehicle-mounted vertical plane of the directional V2X communication antenna 31xc. Furthermore, the 3 dB beam width on the vehicle-mounted vertical plane of the directional V2X communication antenna 31xc exists both in the vehicle upper region and in the vehicle lower region.

Figure 22A:
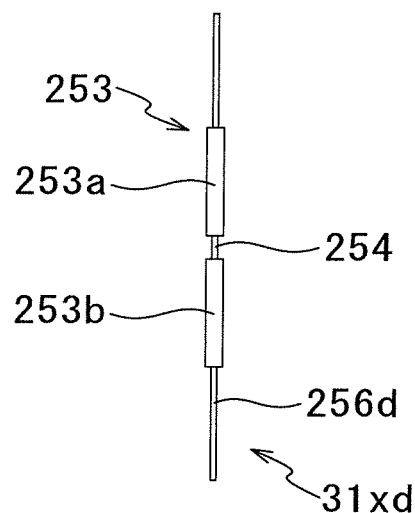
FIGS. 22A to 22C show a fourth example in which the size of the metal plate of the directional V2X communication antenna shown in FIG. 18 is changed.
Figure 22B:
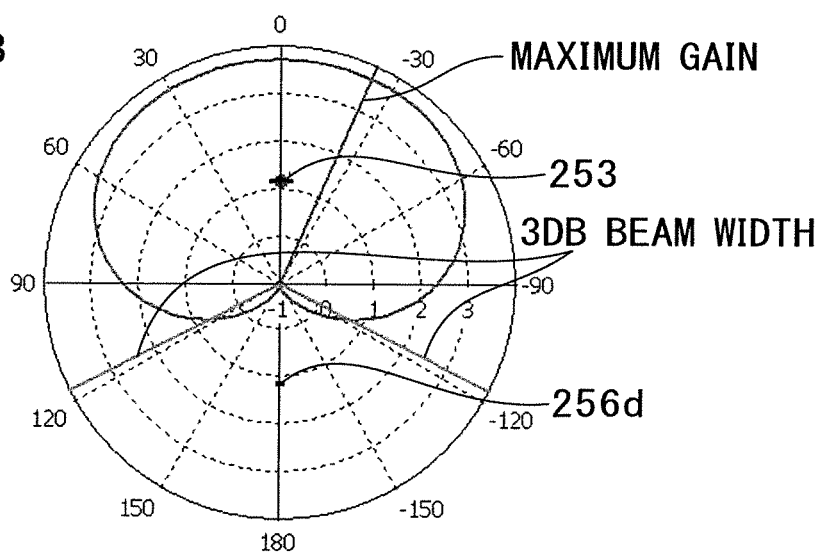
Figure 22C:
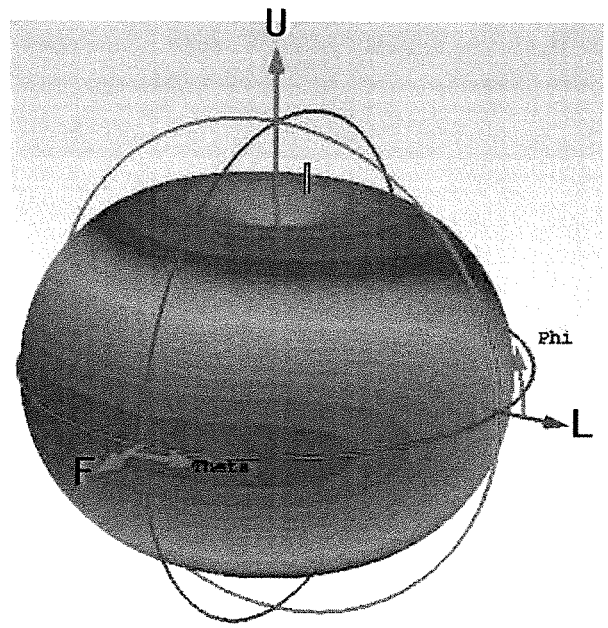

As shown in FIG. 22A and FIG. 22B, when the V2X communication antenna 31xd is viewed in the antenna rearward direction, the V2X communication antenna 31xd is arranged so that the power-supply radiating element 253 partially overlaps the metal plate 256d. Furthermore, when the V2X communication antenna 31xd is viewed in the antenna rearward direction, the V2X communication antenna 31xd is arranged so that the area of the metal plate 256d is small as compared to the area of one power-supply radiating element 253. As shown in FIG. 22B, the 3 dB beam width of the V2X communication antenna 31xd on the vehicle-mounted horizontal plane is about 115 degrees to −115 degrees. On the vehicle-mounted horizontal plane, the maximum gain of the V2X communication antenna 31xc is obtained at −20 degrees. As shown in FIG. 22B, the 3 dB beam width on the vehicle-mounted horizontal plane of the V2X communication antenna 31xd exists both in the vehicle left region and in the vehicle right region. As shown in FIG. 22C, the 3 dB beam width on the vehicle-mounted horizontal plane of the directional V2X communication antenna 31xd is larger than the 3 dB beam width on the vehicle-mounted vertical plane of the directional V2X communication antenna 31xd. Furthermore, the 3 dB beam width on the vehicle-mounted vertical plane of the directional V2X communication antenna 31xd exists both in the vehicle upper region and in the vehicle lower region.

The directional V2X communication antenna 31x shown in FIG. 18 includes one power-supply radiating element 253 and the metal plate 256 which is provided behind the one power-supply radiating element 253 in the antenna front-rear direction. The disclosure, however, is not limited to this arrangement. The V2X communication antenna mounted on the V2X communication antenna-mounted leaning vehicle of the present teaching may include plural power-supply radiating elements lined up in the antenna up-down direction and a metal plate provided behind the power-supply radiating elements in the vehicle front-rear direction.

<Modifications of Directional V2X Communication Antenna>

The V2X communication antenna-mounted leaning vehicle 1 of First and Second Embodiments includes the directional V2X communication antenna 31 provided at the front portion of the vehicle 1. The V2X communication antenna-mounted leaning vehicle 1 of First and Second Embodiments may include the directional V2X communication antenna 32 provided at the rear portion of the vehicle 1. The V2X communication antenna-mounted leaning vehicle of the present teaching may not include the directional V2X communication antenna 32 provided on the rear portion of the vehicle 1, and may include only the directional V2X communication antenna 31 provided on the front portion of the vehicle 1. The V2X communication antenna-mounted leaning vehicle 1 of the present teaching may include both the directional V2X communication antenna 31 provided on the front portion of the vehicle 1 and the directional V2X communication antenna 32 provided on the rear portion of the vehicle 1. The V2X communication antenna-mounted leaning vehicle of the present teaching may not include the directional V2X communication antenna 31 provided on the front portion of the vehicle 1, and may include only the directional V2X communication antenna 32 provided on the rear portion of the vehicle 1.

When the V2X communication antenna mounted on the V2X communication antenna-mounted leaning vehicle 1 is only the directional V2X communication antenna 31 on the front portion of the vehicle 1, the V2X communication antenna-mounted leaning vehicle 1 exerts the following effects. For another V2X communication device in front of the V2X communication antenna-mounted leaning vehicle 1 in the vehicle front-rear direction, the V2X communication antenna-mounted leaning vehicle 1 is able to suppress a difference in transmission and reception performances of V2X communication between a straight-traveling state and a turning state of the leaning vehicle 1, while suppressing a difference in transmission and reception performances of V2X communication due to different mounting locations of the V2X communication antenna.

When the V2X communication antenna mounted on the V2X communication antenna-mounted leaning vehicle 1 is only the directional V2X communication antenna 32 on the rear portion of the vehicle 1, the V2X communication antenna-mounted leaning vehicle 1 exerts the following effects. For another V2X communication device behind the V2X communication antenna-mounted leaning vehicle 1 in the vehicle front-rear direction, the V2X communication antenna-mounted leaning vehicle 1 is able to suppress a difference in transmission and reception performances of V2X communication between a straight-traveling state and a turning state of the leaning vehicle 1, while suppressing a difference in transmission and reception performances of V2X communication due to different mounting locations of the V2X communication antenna.

When the V2X communication antenna mounted on the V2X communication antenna-mounted leaning vehicle 1 is both the directional V2X communication antenna 31 on the front portion of the vehicle 1 and the directional V2X communication antenna 32 on the rear portion of the vehicle 1, the V2X communication antenna-mounted leaning vehicle 1 exerts the following effects. For another V2X communication device in front of the V2X communication antenna-mounted leaning vehicle 1 in the vehicle front-rear direction and another V2X communication device behind the V2X communication antenna-mounted leaning vehicle 1 in the vehicle front-rear direction, the V2X communication antenna-mounted leaning vehicle 1 is able to suppress a difference in transmission and reception performances of V2X communication between a straight-traveling state and a turning state of the leaning vehicle 1, while suppressing a difference in transmission and reception performances of V2X communication due to different mounting locations of the V2X communication antenna.

<Modifications of Beam Width of V2X Communication Antenna>

The V2X communication antenna-mounted leaning vehicle 1 of Second Embodiment has the above-described features (IV), (V), and (VI). The V2X communication antenna-mounted leaning vehicle 1 of the present teaching, however, may have none of the above-described features (IV), (V), and (VI). The V2X communication antenna-mounted leaning vehicle 1 of the present teaching may have at least one of the above-described features (IV), (V), and (VI).

<Modifications of Link Mechanism>

The V2X communication antenna-mounted leaning vehicle 101 of Specific Example 2 includes the link mechanism 105 which is supported by the leaning vehicle body frame 107 and connects at least two front wheels. Alternatively, the V2X communication antenna-mounted leaning vehicle of the present teaching may be supported by the leaning vehicle body frame and include a link mechanism connecting at least two rear wheels. The V2X communication antenna-mounted leaning vehicle 101 includes, as the V2X communication antenna, only the directional V2X communication antenna 131 which is provided at the front portion of the vehicle 101. Alternatively, the V2X communication antenna-mounted leaning vehicle 101 may include both the directional V2X communication antenna 131 provided on the front portion of the vehicle 101 and the directional V2X communication antenna provided on the rear portion of the vehicle 101, as the V2X communication antenna. Alternatively, the V2X communication antenna-mounted leaning vehicle 101 may include, as the V2X communication antenna, only the directional V2X communication antenna which is provided at the rear portion of the vehicle 101.

When a link mechanism connects at least two rear wheels, a directional V2X communication antenna provided at a rear portion of the vehicle is provided rearward of the link mechanism in the vehicle front-rear direction, on a vehicle-mounted horizontal plane when the antenna is mounted on a V2X communication antenna-mounted leaning vehicle in which a leaning vehicle body frame is in the upright state. The directional V2X communication antenna provided at the rear portion of the vehicle is preferably provided rearward of the link mechanism in the vehicle front-rear direction and is separated from the link mechanism by an antenna metal distance, on the vehicle-mounted horizontal plane when the antenna is mounted on the V2X communication antenna-mounted leaning vehicle in which the leaning vehicle body frame is in the upright state.

<Modifications of Leaning Vehicle>

In Specific Examples 1 and 2, the motorcycle 1 shown in FIG. 8 to FIG. 11 and the motor tricycle 101 shown in FIG. 14 to FIG. 17 are taken as examples of the V2X communication antenna-mounted leaning vehicle of the present teaching. The disclosure, however, is not limited to these examples. The V2X communication antenna-mounted leaning vehicle of the present teaching may be a leaning vehicle of any type, as long as the vehicle includes a leaning vehicle body frame which leans in the vehicle leftward direction when turning left and leans in the vehicle rightward direction when turning right.

<Modifications of Antenna Metal Distance>

In Specific Example 1 described above, the directional V2X communication antenna 31 is provided at a position where the antenna metal distances W1, W2 which are the distance between the directional V2X communication antenna 31 and the leaning vehicle body frame 7 are at least twice as long as the wavelength of an electromagnetic wave. Alternatively, the directional V2X communication antenna of the present teaching may be provided at a position where the distance between the directional V2X communication antenna and the leaning vehicle body frame is less than twice as long as the wavelength of an electromagnetic wave. Furthermore, in Specific Example 2 of the embodiment above, the directional V2X communication antenna 131 is positioned so that the antenna metal distance W11 which is the distance between the link mechanism 105 and the directional V2X communication antenna 131 is at least twice as long as the wavelength of an electromagnetic wave. Alternatively, the directional V2X communication antenna of the present teaching may be provided at a position where the distance between the directional V2X communication antenna and the link mechanism is less than twice as long as the wavelength of an electromagnetic wave.

<Modifications of V2X Communication Antenna-Mounted Leaning Vehicle>

The V2X communication antenna-mounted leaning vehicle 1 of Specific Example 1 includes the directional V2X communication antenna 31 provided on the front portion of the vehicle 1 and the directional V2X communication antenna 32 provided on the rear portion of the vehicle 1. Alternatively, the V2X communication antenna-mounted leaning vehicle of the present teaching may include the directional V2X communication antenna 31 provided on the front portion of the vehicle and a nondirectional V2X communication antenna provided on the rear portion of the vehicle. The nondirectional V2X communication antenna radiates electromagnetic waves having nondirectional radiation characteristics, which are uniform in all directions on the vehicle-mounted horizontal plane. The directivity of the nondirectional V2X communication antenna in the vehicle-mounted vertical direction is disregarded. The nondirectional V2X communication antenna is, for example, a nondirectional linear antenna. The nondirectional linear antenna is, to be more specific, a monopole antenna, a whip antenna, a colinear antenna, a Brown antenna, a dipole antenna, etc. The V2X communication antenna-mounted leaning vehicle of the present teaching may include the directional V2X communication antenna 32 provided on the rear portion of the vehicle and a nondirectional V2X communication antenna provided on the front portion of the vehicle.

The V2X communication antenna-mounted leaning vehicle of the present teaching may include the directional V2X communication antenna 31 provided at the front portion of the vehicle 1 and a directional V2X communication antenna which is provided at the rear portion of the vehicle and has radiation characteristics different from those of the directional V2X communication antennas 31 and 32 of First Embodiment. The directional V2X communication antenna having radiation characteristics different from those of the directional V2X communication antenna 31 of First Embodiment is a directional V2X communication antenna which does not have at least one of the above-described features (I) to (III). For example, the directional V2X communication antenna does not have the above-described feature (I), as the 3 dB beam width on a vehicle-mounted horizontal plane which is a horizontal plane passing through the V2X communication antenna when the V2X communication antenna is in a posture of being mounted on a V2X communication antenna-mounted leaning vehicle in which a leaning vehicle body frame is in the upright state is identical with or smaller than the 3 dB beam width on a vehicle-mounted vertical plane when the V2X communication antenna is in the posture of being mounted on the V2X communication antenna-mounted leaning vehicle in which the leaning vehicle body frame is in the upright state. Alternatively, for example, the directional V2X communication antenna does not have the above-described feature (II), as the 3 dB beam width on the vehicle-mounted vertical plane exists only in the vehicle upper region or in the vehicle lower region. Alternatively, for example, the directional V2X communication antenna does not have the above-described feature (III), as the 3 dB beam width on the vehicle-mounted horizontal plane exists only in the vehicle left region or in the vehicle right region. The V2X communication antenna-mounted leaning vehicle of the present teaching may include the directional V2X communication antenna 32 provided at the rear portion of the vehicle and a directional V2X communication antenna which is provided at the front portion of the vehicle and has radiation characteristics different from those of the directional V2X communication antennas 31 and 32 of First Embodiment.

The V2X communication antenna-mounted leaning vehicle of the present embodiment is arranged so that the directional V2X communication antenna of the present embodiment is mounted on the front portion. The V2X communication antenna-mounted leaning vehicle may be arranged so that, as a single antenna, a nondirectional V2X communication antenna having no directivity on the vehicle-mounted horizontal plane is mounted on the front portion of the vehicle. The single antenna is an only one V2X communication antenna mounted on the vehicle. This single nondirectional V2X communication antenna is provided forward of the front end of the body of the driver seated on the seat on the V2X communication antenna-mounted leaning vehicle in the vehicle front-rear direction. The single nondirectional V2X communication antenna is positioned so that, for example, when the driver is seated on the seat, the 3 dB beam width on the vehicle-mounted horizontal plane is larger than the 3 dB beam width on the vehicle-mounted vertical plane. Furthermore, the single nondirectional V2X communication antenna is positioned so that, for example, when the driver is seated on the seat, the 3 dB beam width on the vehicle-mounted horizontal plane is equal to or larger than 100 degrees. Preferably, the single nondirectional V2X communication antenna is positioned so that, for example, when the driver is seated on the seat, the 3 dB beam width on the vehicle-mounted horizontal plane is equal to or larger than 120 degrees. Further preferably, the single nondirectional V2X communication antenna is positioned so that, for example, when the driver is seated on the seat, the 3 dB beam width on the vehicle-mounted horizontal plane is equal to or larger than 180 degrees. The single nondirectional V2X communication antenna may be positioned so that, for example, when the driver is seated on the seat, the 3 dB beam width on the vehicle-mounted horizontal plane is smaller than 100 degrees.

The V2X communication antenna-mounted leaning vehicle of the present teaching may include a nondirectional V2X communication antenna provided on the front portion of the vehicle and a nondirectional V2X communication antenna provided on the rear portion of the vehicle. In this case, the front nondirectional V2X communication antenna on the front portion of the vehicle is positioned so that, when the driver is seated on the seat, the 3 dB beam width on the vehicle-mounted horizontal plane is larger than the 3 dB beam width on the vehicle-mounted vertical plane. The rear nondirectional V2X communication antenna on the rear portion of the vehicle is positioned so that, when the driver is seated on the seat, the 3 dB beam width on the vehicle-mounted horizontal plane is larger than the 3 dB beam width on the vehicle-mounted vertical plane. Furthermore, for example, the antennas are positioned so that, when the driver is seated on the seat, the 3 dB beam width on the vehicle-mounted horizontal plane of the front nondirectional V2X communication antenna is equal to or larger than 100 degrees, and the total of the 3 dB beam width on the vehicle-mounted horizontal plane of the front nondirectional V2X communication antenna and the 3 dB beam width on the vehicle-mounted horizontal plane of the rear nondirectional V2X communication antenna is equal to or smaller than 360 degrees. Alternatively, the antennas may be positioned so that, when the driver is seated on the seat, the 3 dB beam width on the vehicle-mounted horizontal plane of the front nondirectional V2X communication antenna is equal to or larger than 100 degrees, and the total of the 3 dB beam width on the vehicle-mounted horizontal plane of the front nondirectional V2X communication antenna and the 3 dB beam width on the vehicle-mounted horizontal plane of the rear nondirectional V2X communication antenna is larger than 360 degrees. Furthermore, for example, the antennas are positioned so that, when the driver is seated on the seat, the 3 dB beam width on the vehicle-mounted horizontal plane of the rear nondirectional V2X communication antenna is equal to or larger than 100 degrees, and the total of the 3 dB beam width on the vehicle-mounted horizontal plane of the front nondirectional V2X communication antenna and the 3 dB beam width on the vehicle-mounted horizontal plane of the rear nondirectional V2X communication antenna is equal to or smaller than 360 degrees. Alternatively, the antennas may be positioned so that, when the driver is seated on the seat, the 3 dB beam width on the vehicle-mounted horizontal plane of the rear nondirectional V2X communication antenna is equal to or larger than 100 degrees, and the total of the 3 dB beam width on the vehicle-mounted horizontal plane of the front nondirectional V2X communication antenna and the 3 dB beam width on the vehicle-mounted horizontal plane of the rear nondirectional V2X communication antenna is larger than 360 degrees.

<Modifications of V2X Communication Antenna>

In the present teaching, the V2X communication antenna is an antenna for performing V2X communication. In the present teaching, the V2X communication antenna may an antenna for performing only Vehicle-to Vehicle-communication, Vehicle-to-Infrastructure communication, or Vehicle-to-Pedestrian communication. The V2X communication antenna of the present teaching may an antenna for performing at least two of Vehicle-to-Vehicle communication, Vehicle-to-Infrastructure communication, and Vehicle-to-Pedestrian communication.

REFERENCE SIGNS LIST 1, 101: V2X communication antenna-mounted leaning vehicle
2, 102: front wheel unit
2a, 102L, 102R: front wheel
2a1, 102L1, 102R1: tire
2a2, 102L2, 102R2: wheel
3, 103: rear wheel unit
3a, 103a: rear wheel
7, 107: leaning vehicle body frame
30: V2X communication device
31, 31A, 31x, 31xa, 31xb, 31xc, 31xd, 32, 32A, 131: directional V2X communication antenna
31u, 31Au, 32u, 32Au: upper end of substrate constituting directional V2X communication antenna
31d, 31Ad, 32d, 32Ad: lower end of substrate constituting directional V2X communication antenna
105: link mechanism
502: vehicle on which another V2X communication device is mounted
Al: vehicle left region
Ar: vehicle right region
Afl: vehicle forward leftward region
Afr: vehicle forward rightward region
Au: vehicle upper region
Ad: vehicle lower region
Pah, Pah1, Pah2: vehicle-mounted horizontal plane
Pav, Pav1, Pav2: vehicle-mounted vertical plane
Eph, Eph1, Eph2: 3 dB beam width on vehicle-mounted horizontal plane
Epv, Epv1, Epv2: 3 dB beam width on vehicle-mounted vertical plane

The invention claimed is:

1. A leaning vehicle, comprising:
a body frame, which leans in a vehicle leftward direction when the leaning vehicle turns left and leans in a vehicle rightward direction when the leaning vehicle turns right;
a vehicle-to-everything (V2X) communication device which is configured to perform V2X communication; and
a V2X communication antenna which is mounted on the leaning vehicle at a mounting location, and is electrically connected to the V2X communication device, the V2X communication antenna leaning in the vehicle leftward direction or in the vehicle rightward direction together with the body frame, and being an antenna having directivity, wherein
the leaning vehicle has
a horizontal mounting plane, which is a horizontal plane passing through the mounting location when the body frame is upright,
a vertical mounting plane, which is a vertical plane passing through the mounting location when the body frame is upright, the vertical mounting plane being perpendicular to the horizontal mounting plane, and being parallel to a vehicle front-rear direction,
a vehicle upper region which is a region above the horizontal mounting plane in a vehicle up-down direction,
a vehicle lower region which is a region below the horizontal mounting plane in the vehicle up-down direction,
a vehicle left region which is a region leftward of the vertical mounting plane in a vehicle left-right direction, and
a vehicle right region which is a region rightward of the vertical mounting plane in the vehicle left-right direction; and the V2X communication antenna has such a radiation pattern that, when the V2X communication antenna is not mounted on the leaning vehicle, a 3 dB beam width of the radiation pattern in a horizontal plane thereof is larger than the 3 dB beam width in a vertical plane thereof, the 3 dB beam width in the vertical plane existing both in an upper region and in a lower region, the 3 dB beam width in the horizontal plane existing both in a left region and in a right region, and the radiation pattern thereof in the vertical plane having a larger 3 dB beam width in the upper region than in the lower region, wherein
  the horizontal plane, the vertical plane, the upper region, the lower region, the left region and the right region are so positioned as to, when the V2X communication antenna is mounted on the leaning vehicle, coincide respectively with the horizontal mounting plane, the vertical mounting plane, the vehicle upper region, the vehicle lower region, the vehicle left region and the vehicle right region; and
the V2X communication device performs the V2X communication with another V2X communication device, at least when the leaning vehicle turns left and the body frame leans in the vehicle leftward direction, or when the leaning vehicle turns right and the body frame leans in the vehicle rightward direction.

2. The leaning vehicle according to claim 1, wherein the 3 dB beam width in the horizontal plane is larger than 120 degrees.

3. The leaning vehicle according to claim 1, wherein, the leaning vehicle has
  a left maximum bank angle that is an angle between the vehicle up-down direction and an up-down direction of the body frame when the body frame maximally leans in the vehicle leftward direction when the leaning vehicle turns left,
  a right maximum bank angle that is an angle between the vehicle up-down direction and the up-down direction of the body frame when the body frame maximally leans in the vehicle rightward direction when the leaning vehicle turns right, and
  a total maximum bank angle that is a sum of the left maximum bank angle and the right maximum bank angle; and
the V2X communication antenna has such a radiation pattern that, when the V2X communication antenna is not mounted on the leaning vehicle, the 3 dB beam width in the horizontal plane is larger than the total maximum bank angle when the V2X communication antenna is viewed in a forward direction or in a rearward direction, wherein
the forward and rearward directions coincide respectively with a vehicle forward direction and a vehicle rearward direction when the V2X communication antenna is mounted on the leaning vehicle.

4. The leaning vehicle according to claim 1, wherein, the leaning vehicle has
  a left maximum bank angle that is an angle between the vehicle up-down direction and an up-down direction of the body frame when the body frame maximally leans in the vehicle leftward direction when the leaning vehicle turns left,
  a right maximum bank angle that is an angle between the vehicle up-down direction and the up-down direction of the body frame when the body frame maximally leans in the vehicle rightward direction when the leaning vehicle turns right, and
  a total maximum bank angle that is a sum of the left maximum bank angle and the right maximum bank angle; and
the V2X communication antenna has such a radiation pattern that, when the V2X communication antenna is not mounted on the leaning vehicle, the 3 dB beam width in the vertical plane is larger than a half of the total maximum bank angle when the V2X communication antenna is viewed in a forward direction or in a rearward direction, wherein
the forward and rearward directions coincide respectively with a vehicle forward direction and a vehicle rearward direction when the V2X communication antenna is mounted on the leaning vehicle.

5. The leaning vehicle according to claim 1, wherein, when the body frame is upright and the leaning vehicle is viewed in the vehicle leftward direction or in the vehicle rightward direction,
  when the V2X communication antenna is provided at a front portion of the leaning vehicle, an upper end of a substrate constituting the V2X communication antenna is rearward of a lower end of the substrate constituting the V2X communication antenna in the vehicle front-rear direction, and
  when the V2X communication antenna is provided at a rear portion of the leaning vehicle, the upper end of the substrate constituting the V2X communication antenna is forward of the lower end of the substrate constituting the V2X communication antenna in the vehicle front-rear direction.

6. The leaning vehicle according to claim 1, wherein, when the body frame is upright and the leaning vehicle is viewed in the vehicle leftward direction or in the vehicle rightward direction, an upper end of a substrate constituting the V2X communication antenna is identical in position to a lower end of the substrate constituting the V2X communication antenna in the vehicle front-rear direction.

7. The leaning vehicle according to claim 1, wherein, the V2X communication antenna is provided at least at a front portion of the vehicle or at a rear portion of the leaning vehicle.

8. The leaning vehicle according to claim 1, wherein, the V2X communication antenna is provided at one of a front portion and a rear portion of the leaning vehicle, and
a nondirectional V2X communication antenna is provided at the other of the front portion and the rear portion of the leaning vehicle.

9. The leaning vehicle according to claim 1, wherein, the V2X communication antenna is provided at one of a front portion and a rear portion of the leaning vehicle, and
another directional V2X communication antenna, which is different from the V2X communication antenna in radiation characteristics, is provided at the other of the front portion and the rear portion of the leaning vehicle.

10. The leaning vehicle according to claim 1, wherein, the V2X communication antenna is provided at an upper portion of the leaning vehicle.

11. The leaning vehicle according to claim 1, further comprising:
  at least one front wheel and at least one rear wheel, each of which is supported by the body frame and includes a tire and a wheel, wherein
  the V2X communication antenna is provided above the wheel in the vehicle up-down direction when the body frame is upright.

12. The leaning vehicle according to claim 1, further comprising:
- at least two front wheels or at least two rear wheels, and
- a link mechanism which is supported by the body frame and connects the at least two front wheels or the at least two rear wheels, wherein
- when the leaning vehicle is viewed in the vehicle forward direction or in the vehicle rearward direction,
    (i) the V2X communication antenna is provided above or below the link mechanism in an up-down direction of the body frame,
    (ii) when the V2X communication antenna is provided at a front portion of the leaning vehicle, the V2X communication antenna is provided forward of the link mechanism in the vehicle front-rear direction, in the horizontal mounting plane when the body frame is upright, or
    (iii) when the V2X communication antenna is provided at a rear portion of the leaning vehicle, the V2X communication antenna is provided rearward of the link mechanism in the vehicle front-rear direction, in the horizontal mounting plane when the body frame is upright.

13. The leaning vehicle according to claim 12, wherein, the V2X communication antenna is separated from the link mechanism by a distance in the vehicle front-rear direction.

14. The leaning vehicle according to claim 13, wherein, the distance is at least twice as long as a wavelength of an electromagnetic wave transmittable by the V2X communication antenna.

15. The leaning vehicle according to claim 12, wherein,
- when the V2X communication antenna is provided at the front portion of the leaning vehicle, the V2X communication antenna is forward of the body frame and is separated from the body frame by a distance in the vehicle front-rear direction, and
- when the V2X communication antenna is provided at the rear portion of the leaning vehicle, the V2X communication antenna is rearward of the body frame and is separated from the body frame by the distance in the vehicle front-rear direction.

16. The leaning vehicle according to claim 15, wherein the distance is at least twice as long as a wavelength of an electromagnetic wave transmittable by the V2X communication antenna.

* * * * *